US006760324B1

(12) United States Patent
Scott et al.

(10) Patent No.: US 6,760,324 B1
(45) Date of Patent: Jul. 6, 2004

(54) METHOD, SYSTEM, AND COMPUTER PROGRAM PRODUCT FOR PROVIDING VOICE OVER THE INTERNET COMMUNICATION

(75) Inventors: Mark Scott, Ashburn, VA (US); Anita Cheng, Ashburn, VA (US); Simon Ho, Ashburn, VA (US); George Irimescu, Etobicoke (CA); Dorel Voineag, Toronto (CA); William Wong, Richmond Hill (CA); Min Yao, Falls Church, VA (US); Row J. Zadeh, Anchorage, KY (US)

(73) Assignee: Array Telecom Corporation, Herndon, VA (US)

( * ) Notice: Subject to any disclaimer, the term of this patent is extended or adjusted under 35 U.S.C. 154(b) by 0 days.

(21) Appl. No.: 09/393,658

(22) Filed: Sep. 10, 1999

(51) Int. Cl.[7] .............................................. H04L 12/66
(52) U.S. Cl. .................... 370/352; 370/401; 379/121.04
(58) Field of Search ................................ 370/352, 354, 370/356, 389, 395.52, 493, 400, 401, 399, 409, 410, 402, 395.61; 709/229, 223, 203, 204, 227, 248, 220, 230; 707/204, 501; 379/93.02, 133, 93.03, 93.01, 112.01, 114.01, 121.06, 121.04; 713/184; 714/4, 16, 3, 48, 13

(56) References Cited

U.S. PATENT DOCUMENTS

| | | | |
|---|---|---|---|
| 5,621,727 A | 4/1997 | Vaudreuil | 370/60 |
| 5,742,596 A | 4/1998 | Baratz et al. | 370/356 |
| 5,757,871 A | 5/1998 | Furukawa et al. | 375/372 |
| 5,790,538 A | 8/1998 | Sugar | 370/352 |
| 5,790,543 A | 8/1998 | Cloutier | 370/395 |
| 5,805,602 A | 9/1998 | Cloutier et al. | 370/516 |
| 5,812,840 A | 9/1998 | Shwartz | 395/604 |
| 5,870,464 A | 2/1999 | Brewster et al. | 379/219 |
| 5,892,822 A | 4/1999 | Gottlieb et al. | 379/220 |
| 5,897,613 A | 4/1999 | Chan | 704/210 |
| 5,900,000 A | 5/1999 | Korenshtein | 707/200 |
| 5,940,479 A | 8/1999 | Guy et al. | 379/93.01 |

(List continued on next page.)

FOREIGN PATENT DOCUMENTS

| | | | |
|---|---|---|---|
| WO | WO 97/14238 A1 | 4/1997 | H04L/12/46 |
| WO | WO 97/23078 A1 | 6/1997 | H04L/12/56 |
| WO | WO 97/27692 A1 | 7/1997 | H04L/12/56 |
| WO | WO 97/28628 A1 | 8/1997 | H04L/12/56 |

OTHER PUBLICATIONS

Held, G., *Voice Over Data Networks*, McGraw–Hill Series, Copyright 1998.

(List continued on next page.)

*Primary Examiner*—Steven H.D Nguyen
*Assistant Examiner*—Phuongchau Ba Nguyen
(74) *Attorney, Agent, or Firm*—Sterne, Kessler, Goldstein & Fox P.L.L.C.

(57) ABSTRACT

A method, system, and computer program product that provides voice over the Internet communication. A Voice over the Internet (VoIP) system includes a gateway server that handles calls received from a public switched telephone network and a packet-switched network, a routing server, and a database server. Messages can be sent between the gateway server, routing server, and database server over the packet-switched network. A provisioning system is coupled to the database server. A management system is also coupled to the gateway server, routing server, database server, and management system over the packet-switched network. A network manager automatically queries a client database to determine an update, and sends a message representative of the update to at least one of the gateway server, routing server, database server, and management system over the packet-switched network. A licensing server supports licensing of the VoIP system.

6 Claims, 7 Drawing Sheets

U.S. PATENT DOCUMENTS

| | | | | |
|---|---|---|---|---|
| 5,940,827 | A | | 8/1999 | Hapner et al. .................. 707/8 |
| 5,940,829 | A | | 8/1999 | Tsuiki et al. ................... 707/10 |
| 5,940,832 | A | | 8/1999 | Hamada et al. ............. 707/100 |
| 5,953,405 | A | | 9/1999 | Miloslavsky ................ 379/265 |
| 6,233,618 | B1 | * | 5/2001 | Shannon ..................... 709/229 |
| 6,374,295 | B2 | * | 4/2002 | Farrow et al. .............. 709/223 |
| 6,426,955 | B1 | * | 7/2002 | Gossett Dalton et al. ... 370/401 |

OTHER PUBLICATIONS

McConnell, B., *How to Build an Internet PBX* (Apr. 1997), <http://www.hellodirect.net/tutorial/ip-phone.htm, 10 pages.

Prosise, J., *Programming Windows 95 with MFC, Part VII: The Document/View Architecture*, 40 pages, Copyright 1995.

Sheldon, T., *Encyclopedia of Networking*, McGraw-Hill, 1998, Table of Contents, pp. 503–543, 959–968 and 1047–1050.

Anquetil, L-P. et al., "Media Gateway Control Protocol And Voice Over IP Gateways," *Alcatel Telecommunications Review*, pp. 151–157 (Apr.–Jun. 1999).

*Array Series 3000 Users Manual*, Array Telecom Corp, Entire Manual (Aug. 27, 1999).

*ctvoice IP Telephony*, Product Brochure, Comdial, 6 Pages (Copy obtained Aug. 1999).

*ctvoice System User's Manual*, Comdial, Entire Manual (Jun. 1998).

Yang, C., *INETPhone: Telephone Services and Servers on Internet*, at http://www.ds.internic.net/rfc/rfc.1789.txt, 6 pages, (Apr. 1995).

* cited by examiner

METHOD, SYSTEM, AND COMPUTER PROGRAM PRODUCT FOR PROVIDING VOICE OVER THE INTERNET COMMUNICATION

BACKGROUND OF THE INVENTION

1. Field of the Invention

The present invention pertains to voice over the Internet technology.

2. Related Art a. Voice over the Internet

Worldwide deregulation and packet-switched technology have brought dramatic changes to the telecommunications industry. Voice communication over packet-switched networks, such as, the Internet, is now in demand. Voice Over the Internet technology is now available which integrates a public switched telephone network (PSTN) and the Internet. Voice over the Internet technology is also referred to as, Voice over Internet Protocol (VoIP), Voice over Network (VON), Internet Telephony, and Telephony over the Internet. See, e.g., G. Held, *Voice over Data Networks*, Mc-Graw-Hill Series on Computer Communications (McGraw-Hill Publ.: 1998), entire book; and T. Sheldon, *Encyclopedia of Networking*, Electronic Edition, (Mcgraw-Hill Publ.: 1998), pp. 1047–1050. Both of these references are incorporated in their entirety herein by reference. A PSTN is also referred to as a plain old telephone system (POTS). A PSTN can include transmission components (links), switching components (nodes), and billing facilities. See, e.g., Held, chapter 4, "Understanding Voice" and chapter 5, "Telephone Operations," and Sheldon at pp. 959–968. The Internet can be any network or combination of networks that support packet-switching. Such a network can include, but is not limited to, a network supporting the Internet Protocol (IP) and related protocols. See, e.g., Held, chapter 2, "IP and Related Protocols," and Sheldon, pp. 503–543.

VoIP systems allow a call originating from a PSTN to be carried over the Internet. In this way, voice traffic can be carried over the Internet bypassing more expensive long-distance carriers. For example, Toll Bypass Carrier services, multi-site corporations, and other users use VoIP systems to reduce the cost of long distance telephone calls to a fraction of one cent per minute.

Vendors provide a product or family of products to support VoIP. For example, Array Telecom Corp. of Herndon, Va., a wholly-owned subsidiary of Comdial Company, has provided an early generation of products that provide a multi-location, turn-key solution to VoIP (Array Tel Series 1000 and 2000, also called versions 1 and 2). See also B. McConnell, *How to Build an Internet PBX*, http://www.hellodirect.net/tutorial/ip-phone.htm, downloaded Aug. 16, 1999.

b. How Voice over IP Telephony Works

A VoIP system typically relies on gateways to provide an interface between PSTN and IP networks. FIGS. 1A and 1B illustrate how a call is placed over the Internet. As shown in FIG. 1A, a user calls picks up a telephone 100 and dials a phone number of a phone 140. The called party at phone 140 answers. A connection is then established through gateways 110 and 130 over IP network 120. Voice, fax, and data transmission is then carried out between phones 110 and 140 through this connection. In this way, an expensive long-distance carrier on a PSTN can be bypassed.

FIG. 1B shows the operation of a conventional VoIP system in greater detail. A local PBX (private branch exchange) system 105 places a call originating from phone 100 over a PSTN to a local originating gateway 110. Note gateways 110 and 130 are referred to herein as originating and destination gateways for convenience only. In practice, full-duplex communication is carried out and either phone can originate or receive a call. Also, PBX system 105 is programmed to automatically (and selectively) route certain calls from phone 100 to gateway 110. In this way, a user can dial the destination phone number directly in one step. Alternatively, if no PBX or other special preconfiguration at a local exchange carrier (LEC) is performed, a two step process is used where a user calls gateway 110 directly and then in response to a prompt from gateway 110 enters the destination phone number of phone 140.

Next, gateway 110 contacts destination gateway 130 over IP network 120. Destination gateway 130 dials the destination phone number over a PSTN line to the destination phone 140. Gateway 110 then packetizes the voice stream from the PSTN and routes it over IP network 120 to gateway 130. Destination gateway 130 converts the data packets into a voice stream and sends it over a PSTN line to the called party at phone 140. By strategically locating gateways, such as gateways 110 and 130, in desired calling areas long-distance costs are substantially reduced. Indeed, a long-distance call is essentially replaced by two local phone calls and a low cost IP connection.

c. Shortcomings

Even though VoIP has created an enormous enthusiasm, the implementation and success of VoIP networks has been hindered due to at least following four (4) major shortcomings:

voice jitter caused by unpredictable bottlenecks of the Internet;

unacceptable voice quality due to poor compression techniques;

absence of advanced applications to offer services such as prepaid calling or carrier class global call routing; and absence of switching functions such as trunk-to-trunk connections and PBX interfaces.

SUMMARY OF THE INVENTION

A method, system, and computer program product that provides voice over the Internet communication. In one embodiment, the present invention is a VoIP system that includes a gateway server, a routing server, and a database server. The gateway server handles calls received from a public switched telephone network and a packet-switched network. Messages can be sent between the gateway server, routing server, and database server over the packet-switched network.

In addition, a provisioning system is coupled to the database server. A management system is also coupled to the gateway server, routing server, and database server, over the packet-switched network.

According to one feature, a network manager automatically queries a client database to determine an update, and sends a message representative of the update to at least one of the gateway server, routing server, database server, and management system over the packet-switched network.

According to another feature of the present invention, a licensing server is used to support licensing of the VoIP system.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings.

Figure 1A:
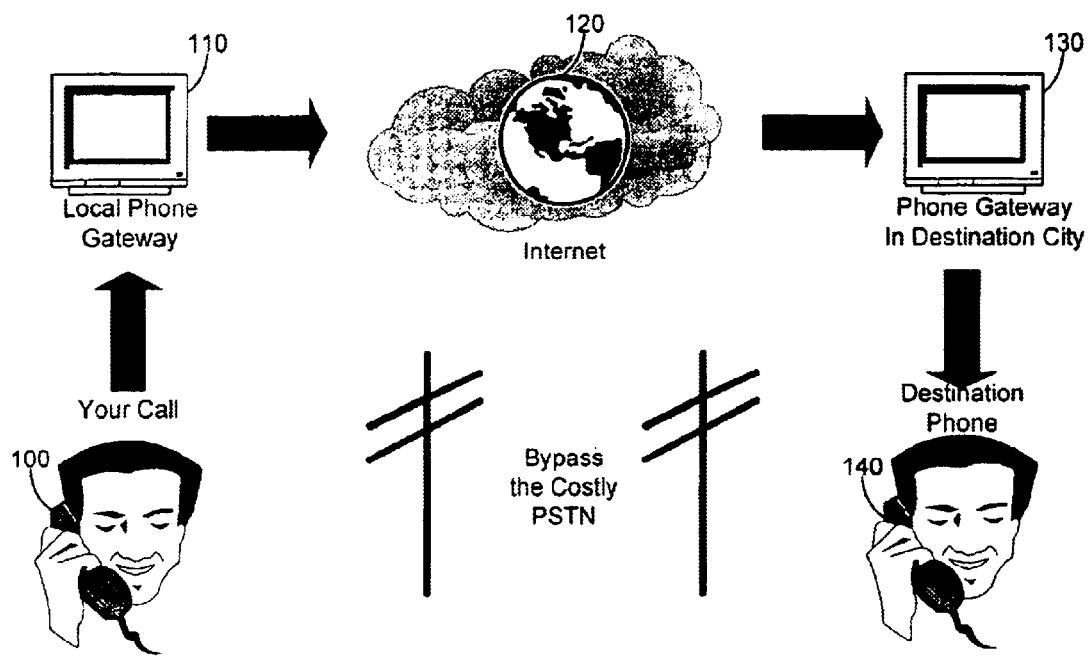
FIGS. 1A and 1B illustrate how a call is generally placed over a VoIP system.
Figure 1B:
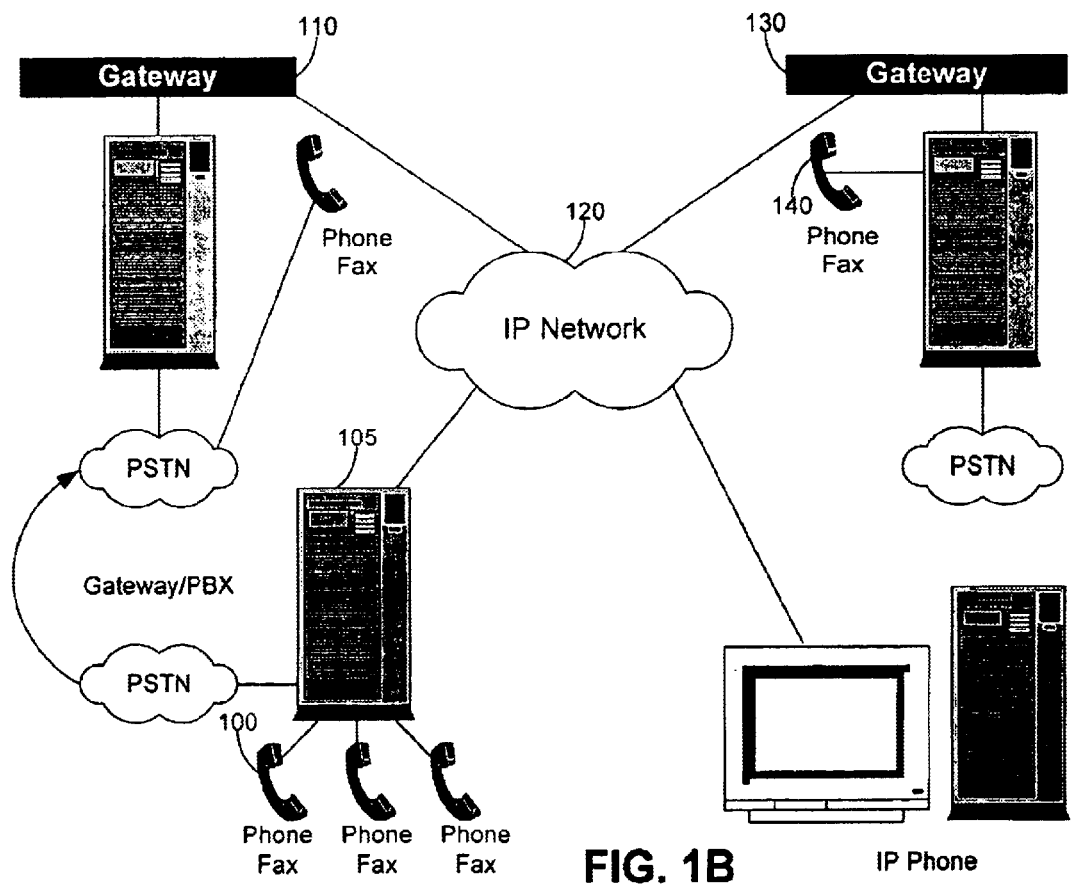

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

I. Overview and Discussion
  A. Open Standards
  B. Scalability
  C. Voice quality
  D. Central or Distributed Implementation
  E. Built in Debiting Function
  F. Multi Lingual Prompts
  G. Trunk-to-Trunk Connections
  H. Universal Connectivity
II. Terminology
III. Voice over the Internet System
IV. Example Implementation
I. Overview and Discussion The present invention provides a method, system, and computer program product for providing voice communication over the Internet. For convenience, this method, system, and/or computer program product according to the present invention is also referred to herein as simply a "product" or "family of products."

The present invention overcomes the above problems in conventional VoIP systems. In one embodiment, there are five basic components:

Gateway Server
  Routing Server
  Database Server
  Management System
  Provisioning System These components provide a VoIP system which has a modular architecture and a scalable configuration. This modular design creates an efficient environment for fast and effective evolution. New capabilities can be added to the system in a fraction of the normal time. This scalable, platform accommodates future growth in the number of users and other system demands.

In one example, the present invention provides all of the necessary tools to build and operate a large distributed carrier network. The gateway and database servers (Ledger and Register) coordinate to perform calling operations. The routing server facilitates/coordinates interaction between the gateway servers. The management system is used to manage and configure the other components. Smaller networks can operate with a minimum configuration of only the management and gateway servers—the remaining components are not required to run such a gateway alone.

All five servers can run on the same personal computer (PC) or on physically separate machines. For example, a network could typically include a central management server running on the administrator's PC, a number of gateway servers running in various locations and a centralized database server shared between them. The servers/PCs running the various components do not have to be on the same local area network (LAN) as long as they are connected via an IP network.

A. Open Standards

The present invention is compatible in an open architecture. For example, industrial grade IBM-compatible workstations and servers can be used as a hardware platform. Microsoft Windows NT can be the operating software. Dialogic voice boards that are globally recognized as the leading products can be used. The availability of Dialogic voice boards for the majority of countries around the world allows an embodiment of the present invention to be distributed on a global basis to customers. Lucent SX-7300P can be used as a CODEC (voice coders and decoders). Its acceptability industry-wide combined with high-quality and low-bandwidth usage makes it a superior choice. Current interoperability voice communication standards: H.323 v2.0 and the voice coders (G.723.1) associated with the standard are also used.

This implementation is not intended to limit the present invention, however, as other types of platforms, operating software, voice boards, CODECs, voice communication standards, and voice coders can be used, as would be apparent to a person skilled in the art given this description. Propriety components can also be used instead of or in addition to the open standards described herein.

B. Scalability

The present invention further has a scalable architecture. This allows the system to grow with no limitations to thousands of ports regardless of a monolithic or distributed implementation. Growth is modular. In one example implementation, each gateway server module provides up to 4 or more digital boards of T1, T1 PRI, or E1 PRI for easy expansion. This advanced design offers 100% availability as modules are enabled to share the traffic in an unlikely event of a failure of a component. Redundancy of services and back up facilities can be built into the design to provide a high level of reliance for mission critical applications.

C. Voice Quality

One shortfall of VoIP in the early 1990s was the poor quality of voice (jittery voice) and the unacceptable latency caused by the fluctuating, and at times less than adequate bandwidth available through the Internet.

According to a further feature of the present invention, dynamic jitter buffering (DJB) is used to resolve the quality of voice over the unpredictable and some time limited bandwidth of the Internet. This capability dynamically adjusts the size of the voice buffer and eliminates the jitter. In addition, the present invention utilizes the resources of DSP to support verity of voice improvements. A level of quality at or near toll quality is achieved.

D. Central or Distributed Implementation

In one example of the present invention, the VoIP system is mostly implemented in a distributed fashion to enable low cost long distance calling. As a result the organizations using the present invention can form business structures and organizations that are just as innovative and distributed as the VoIP system. While the business needs of customers are different and every changing, they all require systems that are infinitely flexible. For this reason, the present invention in one example is developed with maximum flexibility in mind. The architecture of the system allows for the services such as routing, database, and management servers to reside on one system location or be distributed to several locations. These servers, if connected to the same packet network, will operate as if they are all in the same location.

E. Built in Debiting Function

Many of the early adoptions of Carrier Class VoIP technology were in the area of prepaid long distance. Service providers were often forced to purchase three (3) major components in order to operate their prepaid services. These components were:

a telephone switch to receive and terminate calls on a trunk to trunk basis;

a prepaid application server to conduct registry, PIN number generation and validation and account debiting functions; and a limited voice over IP gateway to benefit from the cost savings that this technology offers.

The present invention can support all of the above prepaid functions in a gateway architecture and offer them to users (such as customers) at no additional charge.

F. Multi Lingual Prompts

When the present invention is deployed as a network of gateways around the globe, some of the applications (and servers) can be centralized in one location for ease of operation and savings. Alternatively, the applications (and servers) may be distributes throughout a network. Either way this allocation of servers is effected by end users which come from many different backgrounds and nationalities. In order to provide the best customer service possible, one embodiment of the present invention uses a full Interactive Voice Response (IVR) system in gateways with multi-language prompts. This enables the VoIP system of the present invention to speak the language of its users and therefore generate more business or traffic.

G. Trunk-to-Trunk Connections

According to a further feature, the VoIP system of the present invention provides VoIP technology even to users (such as businesses) who do not have cost effective and reliable Internet connections available to them at this time but wish to start a prepaid application and move to IP transport later. Prior to the present invention, operators of a start-up VoIP business (e.g., a prepaid service provider) were unable to use any VoIP Gateway to start their prepaid business. The present invention provides PSTN trunk to PSTN trunk connection (no Internet connections) in the same manner as a PSTN switch and offers prepaid services at a fraction of cost. This provides an opportunity for prepaid service providers to establish their business with 80% cost savings.

H. Universal Connectivity

The present invention provides a variety of PSTN and Packet Network connections including, but not limited to, internet, analog PSTN lines, frame relay, PBX extension lines, ATM, digital T1 and T1 PRI, private leased lines, and digital E1 PRI.

The present invention is described in terms of this example environment. Description in these terms is provided for convenience only. It is not intended that the invention be limited to application in these example environments. In fact, after reading the following description, it will become apparent to a person skilled in the relevant art how to implement the invention in alternative environments known now or developed in the future.

II. Terminology

To more clearly delineate the present invention, an effort is made throughout the specification to adhere to the following term definitions as consistently as possible.

The terms "packet-switched network" and "Internet" are used interchangeably to refer to any network that performs packet switching including, but not limited to, a network that supports a Transmission Control Protocol (TCP) and/or an Internet Protocol (IP). The terms "packet-switched network" and "Internet" are not intended to limit the size of a network, and can include, but are not limited to, a wide area network (WAN), middle-areaor campus wide network, or local area network (LAN), or combinations of networks.

The term "traffic" refers to voice, facsimile, video, multimedia, digital information, or other data that can be sent between telephony terminal equipment and/or network terminal equipment.

III. Voice Over the Internet System

Figure 2:
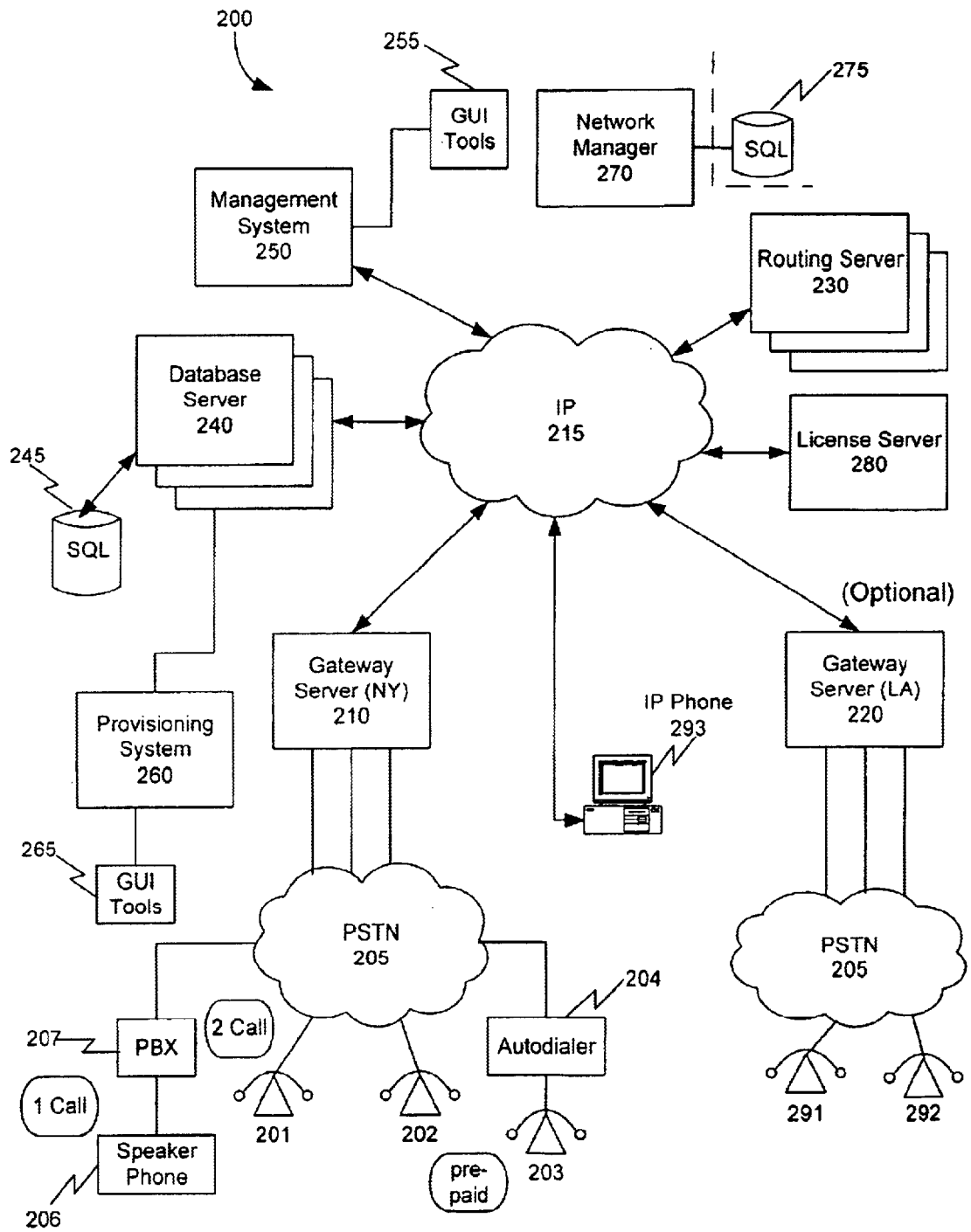
FIG. 2 is a diagram of a VoIP system according to one embodiment of the present invention.

FIG. 2 is a diagram of a VoIP system 200 according to an embodiment of the present invention. VoIP system 200, among other things, allows traffic (e.g., voice or fax data) originating on a circuit-switched network to be carried over a packet-switched network. In particular, VoIP system 200 acts as a bridge between a public switch telephone network 205 and an IP network 215.

Such voice and data traffic can originate at any type of terminal equipment at PSTN 205. For example, a call can be placed on an ordinary telephone 201 or 202. A call can be placed from an ordinary telephone 203 using a prepaid service and autodialer 204. Calls can also originate from a speaker or conference-type phone 206 through a private branch exchange (PBX) 207. Such calls can terminate at an IP phone 293 or an ordinary telephone 291, 292. These examples are not intended to limit the present invention. As will be apparent to a person skilled in the art given this description, any type of computer or telephone equipment can be used to originate and terminate voice calls over the VoIP system 200.

VoIP system 200 includes gateway servers 210, 220, database server(s) 240, routing server(s) 230, management system 250, provisional system 260, network manager 270, and license server 280. Each of these components can be interconnected over the IP network 215, as shown in FIG. 2. In one embodiment, provisional system 260 is coupled to database server 240. Provisional system 260 is controlled by graphical user interface (GUI) tools 265. Similarly, management system 250 is controlled by graphical user interface tools 255. A relational database such as a SQL database 245 is further coupled to database server 240.

VoIP system 200 is designed to allow voice and fax traffic to be carried over IP network 215. Voice and fax traffic received from PSTN 205 is coupled through gateway servers 210 and 220 over IP network 215. In addition to providing simple call termination, VoIP system 200 provides a host of enhanced features that enable IP telephony capabilities to be used in a number of different applications. For example, since IP telephony typically results in much lower telecommunications costs, and can be used between two branch offices to reduce costs. This reduced cost can instead be used to resell long-distance service to end-users. Another application is to enable IP telephony terminals, such as multimedia PCs running Microsoft NetMeeting software, to access traditional services, such as a call center. By combining IP telephony with other technologies, such as the World Wide Web (WWW), integrated WWW call centers are possible. VoIP system 200 makes these applications possible by acting as a "gateway" between traditional telecommunication networks (PSTN 205) and systems, and a packet switch network (IP network 215) and systems.

In one example implementation, there are two main parts to VoIP system 200: a software part and a hardware platform.

An overview of each of the components of VoIP system 200 is now provided. Further descriptions with respect to an example implementation is provided below in Section IV. Gateway server 210 (and gateway server 220) are coupled between PSTN 205 and IP network 215. Gateway server 210 can be coupled to any number of telephone lines 362 and network lines 364.

Figure 3A:
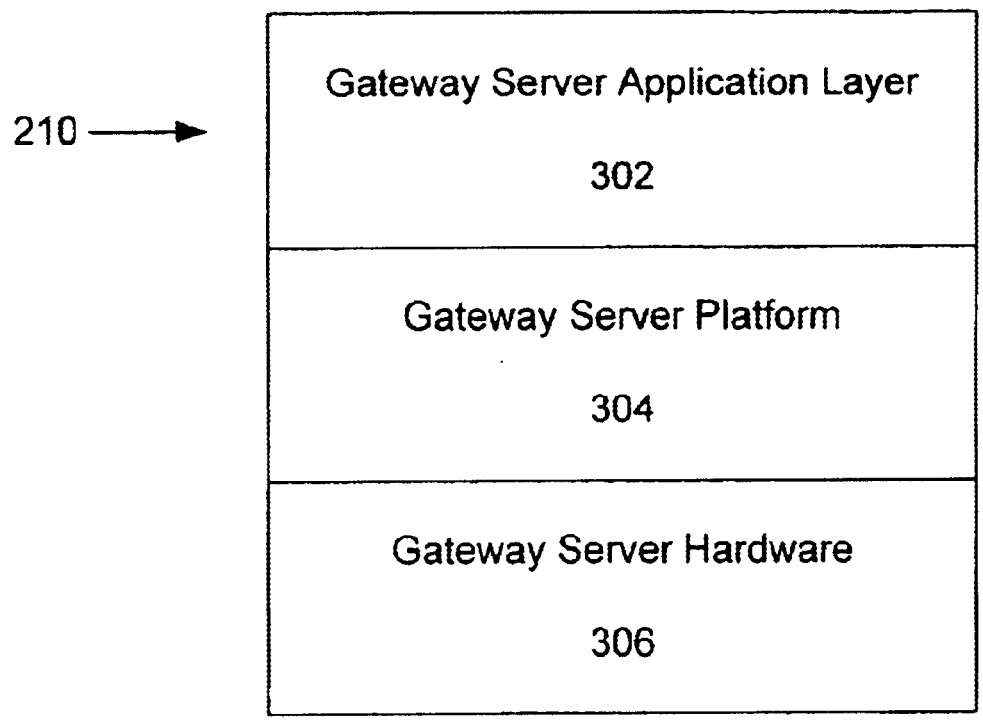
FIGS. 3A, 3B, and 3C are diagrams illustrating a gateway server used in the VoIP system of FIG. 2 according to the present invention.
Figure 3B:
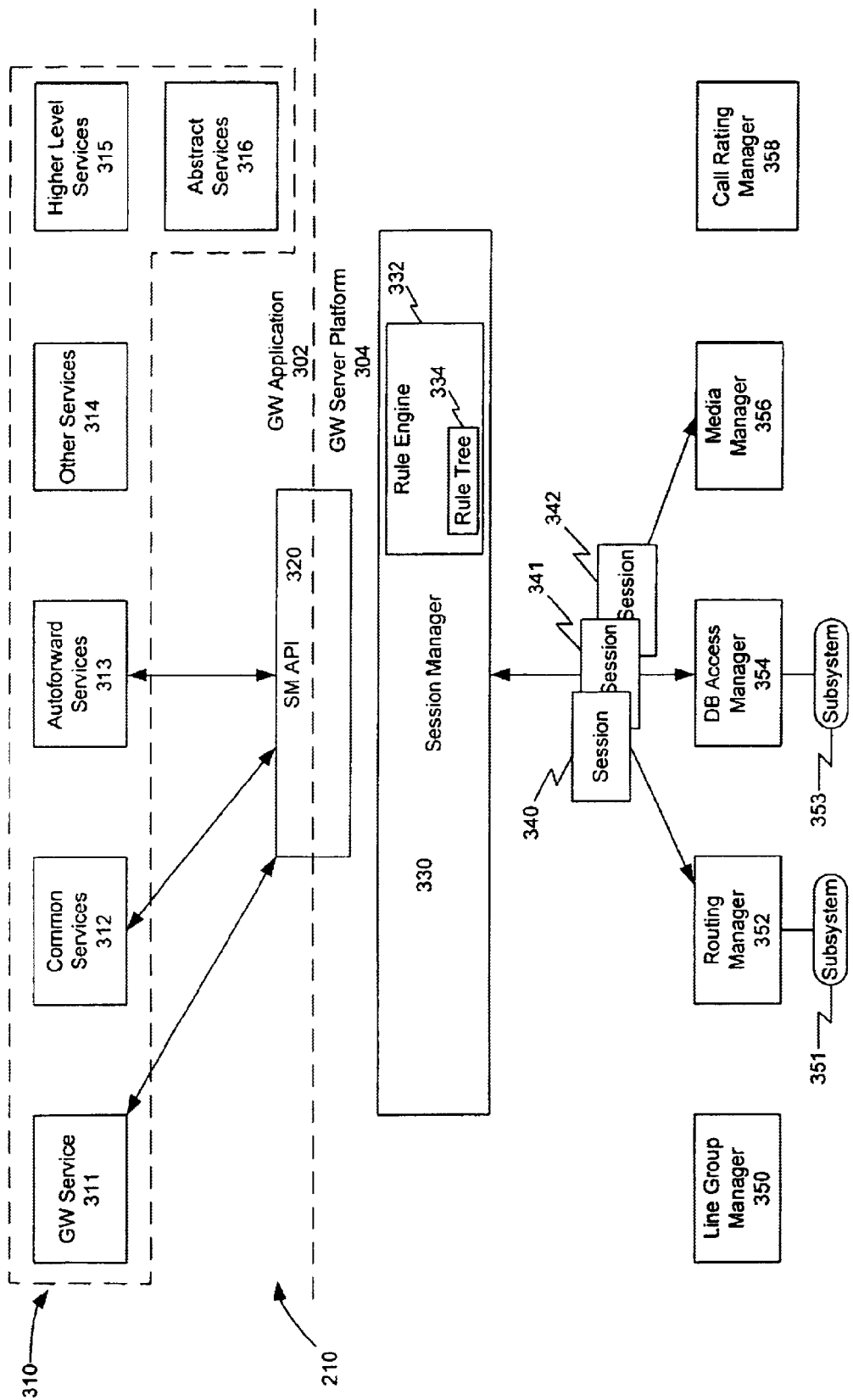
Figure 3C:
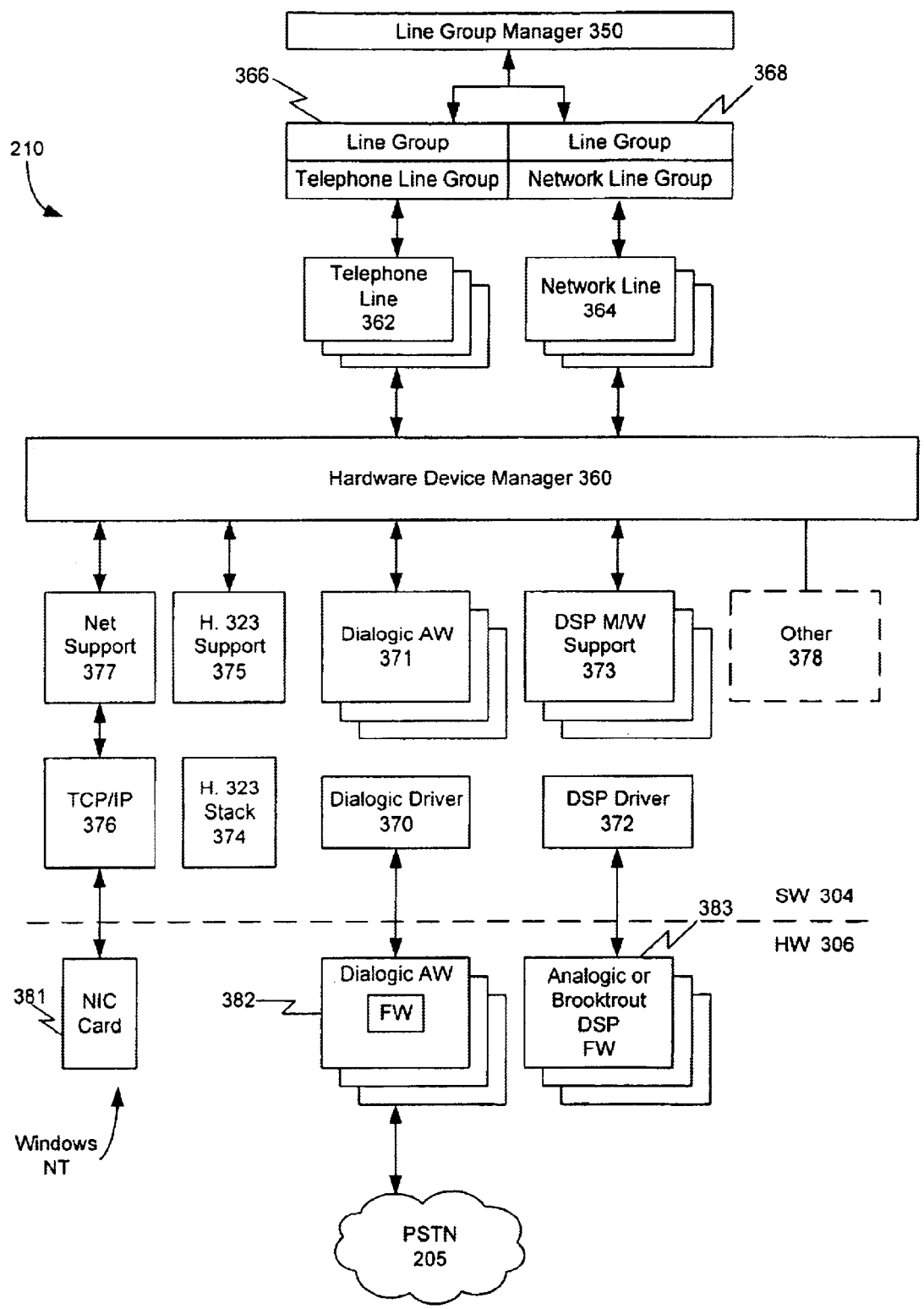

Gateway server 210 includes, in one embodiment, both software and hardware components. For example, as shown in FIGS. 3a–3c, gateway server 210 includes a gateway server application layer 302, gateway server platform 304 (software), and gateway server hardware 306. Gateway application layer 302 includes higher level application services 310. For example, these application layer services can include gateway service 311, common services 312, autoforward services 313, other services 314, higher level services 315, and abstract services 316. In one example implementation where the software is written in an object-oriented program language such as C++, each of the higher application layer services 310 accesses lower-level modules (also called objects) through a session manager application programming interface (API) 320.

Gateway server platform 304 includes session manager 330. Session manager 330 includes rule engine 332. Session manager 330 creates and manages sessions 340, 341, 342. In general, any number of sessions can be managed, depending on the resources of the gateway server 210. Each session corresponds to a voice call carried over gateway server 210. Information in a session 340, 341 or 342 can be further handled by lower level line group manager 350, routing manager 352, database access manager 354, media manager 356, and call rating manager 358. Routing manager 352 is further coupled to a subsystem 351. Database access manager 354 is also coupled to a subsystem 353. For example, subsystem 351 can be any cache memory or other storage device for storing routing information. Subsystem 353 can be a relational or nonrelational database.

Line group manager 350 coordinates communication between the telephone line side and network line side of gateway server 210 for a particular session or call. In this way, the higher application layer services 310 and session manager API 320 can be transparent to any particular protocols required by a telephone line or a network line.

Conversion module 367 then converts a telephone line group to a line group. Conversion module 368 converts a network line group to a line group. In this way, line group manager 350 manages line groups without regard to whether a line group is a particular telephone line or network line. That is, the type of line is transparent to the line group manager 350 and any other higher-level application services.

Hardware device manager 360 is the module or object responsible for managing the connectivity of gateway server 210 to traditional telecommunication devices and to conventional internet-related networking components. Thus, hardware device manager 360 coordinates with different respective modules or drivers to control telephony and network components. For example, as shown in FIG. 3c, gateway server hardware 306 can include a NIC card 381 as part of a Windows NT compatible platform. NIC card 381 is further supported by gateway server software 304 components to coordinate information sent to hardware device manager 360. In particular, a TCP/IP stack 376, net support module 377, H.323 stack 374, and H.323 support module 375, are used to couple NIC card 381 and hardware device manager 360. Similarly, for telephony components, gateway server 210 includes a Dialogic telephony board(s) 382 that can be coupled to phone lines over PSTN 205. Gateway server hardware 306 can further include an analogic Brooktrout digital signal processor (DSP) 383. Dialogic telephony board(s) 382 are supported by respective Dialogic drivers 370 and Dialogic middleware 371. Similarly, Analogic Brooktrout DSP(s) 383 are supported by a DSP driver 372 and a respective DSP middleware support module 373. This example including the specific vendor products are illustrative. Other software and hardware modules supporting internet and telephony services can be provided in gateway server 210, as will be apparent to a person skilled in the art given this description.

The operation of gateway server 210 is described further below with respect to an example implementation.

Figure 4:
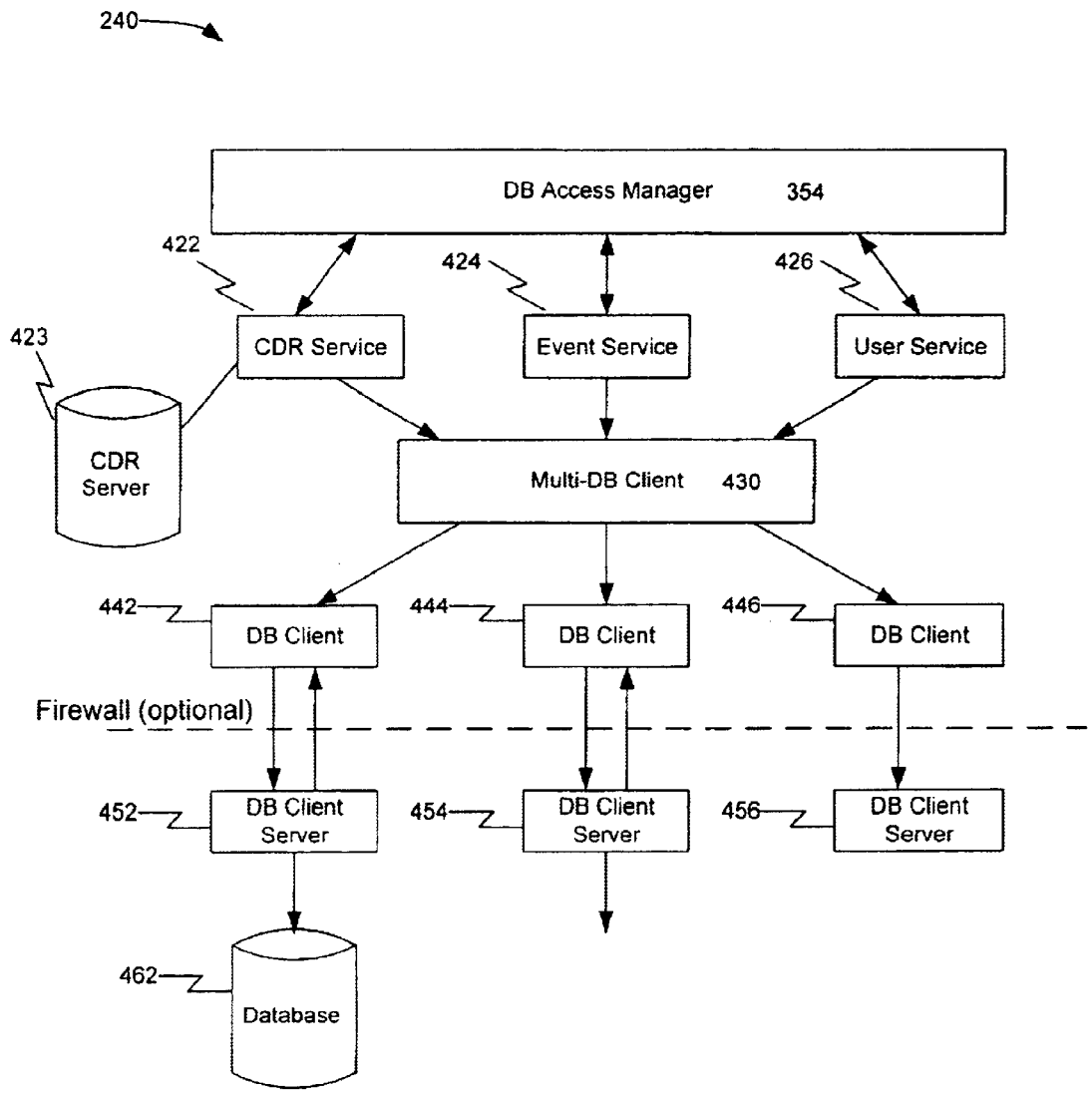
FIG. 4 is a diagram illustrating a database server used in the VoIP system of FIG. 2 according to the present invention.

FIG. 4 is a diagram of an example database server 240 according to the present invention. Database server 240 includes database access manager 410. Database access manager 410 further coordinates and operates higher-level services including: a call detail reporting service 422, event service 424, and user service 426. Each of these services further coordinate with a multi-database client manager 430. Multi-database client manager 430 is coupled to three database clients 442, 444, and 446. Each of these database clients 442, 444, 446 is further coupled to communicate with respective database servers 452, 454, 456. Database server 452, for example, can access a relational database (SQL) 462. Database servers 454 and 456 likewise can access respective relational or nonrelational databases (not shown).

Gateway server 210 manages the specialized telephony hardware that is used for interconnection to telecommunications equipment, and performs bridging of calls between the traditional telecommunications network and an IP network to which gateway server 210 is connected. The key responsibilities of gateway server 210 are: handling calls received on either IP network 215 or PSTN 205, bridging calls between the two different kinds of networks (circuit switched and packet switched). Such bridging can include, but is not limited to, voice compression, echo cancellation, control protocol transformation, and numerous other complex operations, interacting with telephone users using DTMF digits (and other methods of telephony signaling) in order to collect information such as a target destination number, user identification, password and more.

Gateway server 210 is also responsible for interfacing with a routing system (described below) in order to translate numbers and routing those numbers to the correct destination gateway, IP address, or telephone number, depending on the number dialed. Gateway server 210 interfaces with database server 240 in order to validate user accounts, apply charges, and keep records of all calls.

Routing server 230 is used to route calls across IP network 215, and possibly to a final destination on the telephone network. Routing server 230 is optional in that gateway server 210 can route a call based on local information maintained on gateway server 210 only. However, routing server 230, according to a further feature of the invention, can facilitate the automatic exchange of routes between different gateway servers 210, 220. This in general can make the administration configuration of call routing much easier.

In this way, routing server(s) 230 have the following functions. They can look up routes to a particular number. They can allow gateway server 210, 220 to export local routes for the use of other gateways in the system. Routing server 230 can further provide gateway servers 210, 220 with routes that are specifically intended for that respective gateway server. This allows all routes to be configured on the routing server 230 only, but automatically distributed to the appropriate gateways. Routing server 230 can also distribute E.164 translation data. This facilitates the exchange of such data, eliminating the need to configure it on each gateway server 210, 220 individually.

According to a further feature, in an enlarged deployment, and for reliability, it is possible to configure multiple routing servers 230 in the same network. Multiple servers can provide both load-balancing across multiple machines and redundancy to protect against the failure of any particular routing server 230.

Database server 240 manages the users of VoIP system 200. Database server 240 supports the restriction of calling privileges to users with valid user accounts. In addition, database server 240 allows billing for VoIP services to be done in either a postpaid or in a real-time manner. Alternatively, gateway servers 210,220 can be connected directly to a database such as database 245. Preferably, however, database server 240 is provided so that VoIP system 200 can be scalable. As described with respect to FIG. 4, database server 240 can scale to accommodate any number of databases depending on the number of users and/or services provided by VoIP system 200.

In one example, database server 240 provides middleware that interfaces with numerous gateway servers 210, 220 but uses only a small number of available connections to the underlying database. This allows even very large numbers of gateway servers 210, 220 to have access to data contained in a shared database or databases. Multiple database servers 240 can be used as shown to provide redundancy and protection against failure.

Management system 250 is a GUI tool that is used to perform configuration administration of software components for the VoIP system 200. Management system 250 can connect to gateway servers 210, 220, routing server 230, and database server(s) 240 remotely over IP network 215. In this way, management system 250 can monitor the current state of these servers and make changes to the configuration of these components. This architecture allows all of the gateway, routing and database servers 210–240 in the network to be configured from a single point.

Provisioning system 260 is a tool that allows access to the data managed by database server 240. Management system 250 provides access to the database server 240, and allows database server 240 to be configured, but it is the role of provisioning system 260 to actually allow interaction with data contained in databases 245. In one embodiment, provisioning system 260 performs the following tasks using GUI tools 265. First, provisioning system 260 allows accounts of system users to be added, removed or modified. Second, provisioning system 260 enables a user to configure and maintain group records of users, and account records of users. Provisioning system 260 also enables call detail records stored by the gateway servers 210,220 to be reviewed. Like management system 250, provisioning system 260 operates remotely over IP network 215, and can be used to administer multiple database servers 240.

Network manager 270 is a separate application that allows VoIP system 200 to be configured or modified in response to specific client requests. For example, a client request made in the form of a change at a client database 275 is automatically recognized by network manager 270. Network manager 270 then formulates and propagates appropriate control signals to configure VoIP system 200 accordingly. In this way, specific client requests and needs are automatically made to VoIP system 200.

Licensing server 280, according to a further feature of the present invention, allows licensing of VoIP system technology according to license keys. A license key is an encoded string that contains information regarding a particular license. License server 280 is an essentialized license server that manages licensing for all components in VoIP system 200. When a component first starts up, it will contact license server 280 to receive necessary license. With this configuration, all license keys are configured on a single machine, and only one hardware key is required.

IV. Example Implementation

Contents

PART I—Basics of the Present Invention
  A. Introduction
  B. System Overview
    1. What is the Present invention?
    2. Present invention Components
      a) Gateway Server
      b) Routing Server
      c) Database Server
      d) Management System
      e) Provisioning System
      f) Utility Components
    3. Other Implementation Details
      a) Components and Nodes
      b) Operational vs. Administrative Components
      c) Configuration
      d) Identification and Authentication
      e) Access Control
      f) Management
      g) Licensing
  C. Installation and Setup
    1. Hardware Installation and Setup
      a) Installing Dialogic Telephony Boards
      b) Installing DSP Boards
      c) Installing the SCbus cable
      d) Installing the Dialogic Drivers
      e) Installing Analogic Drivers
      f) Installing the Brooktrout Drivers
    2. Software Installation
    3. Express Configuration
      a) Running Express Configuration
      b) Common Setup Information
      c) Gateway Server Setup
      d) Routing Server
      e) Database Server
    4. Database Table Setup
    5. Additional Setup Issues
      a) Screen Savers
      b) Find Fast/Virus Scanners
  D. Getting Up and Running
    1. Starting the Software
    2. The Array Control Panel
    3. Using the Management System
      a) Initial Configuration
      b) Remote System List
      c) Connecting and Administering
    4. Service Control and Logging
      a) Service State Control 5. Security Domain Configuration
  a) Memberlist Domains
6. Management Access
7. Licensing
  a) Standalone Mode
  b) Client/Server Mode
8. Using the Provisioning System
9. Troubleshooting Service Startup
  a) Gateway Service
  b) Routing Service
  c) Database Service

PART II—OPERATION

A. Gateway Server Capabilities
  1. Hardware Support
    a) Gatenet 3 vs. DSP Compression
    b) Dialogic D/21H
    C) Dialogic D/41ESC
    d) Dialogic D/160SC-LS
    e) Dialogic D/240SC-T1 (Robbed Bit T-1)
    f) Dialogic ISDN
    g) Dialogic MSI/SC
    h) Mibridge DSP
    i) Network H.323
    j) Network Proprietary
  2. Lines and Line Groups
    a) Lines
    b) Line Groups
    c) Telephony Lines and Line Groups
    d) Network Lines and Line Groups
  3. Services
    a) Service Selection
    b) Service Level Line Group Settings
    c) Gateway Service
    d) Autoforward Service
    e) Internal Services
  4. Call Rating
  5. Voice Prompt Management
B. The Gateway Application
  1. Principles of Operation
  2. Gateway Application Configuration
  3. Supplementary Application Configuration
    a) User Identification Application
    b) User Authentication Application
  4. Session Bindings
  5. Routing and Number Translation
    a) Number Translation
    b) E.164 Parser
    c) Prioritization and Examples
    d) Alternative Configurations
    e) E.164 Parser Data Synchronization
  6. Routes and Route Information
    a) Addressing Information
    b) Ordering Information
    c) Timing Information
    d) Access Control Information
  7. Routing Models
    a) Locally Defined Routes
    b) Static Global Routes
    c) Disseminated Routes
    d) Dynamic Routes
    e) Dynamic Caching
    f) Summary
  8. Routing Manager
    a) Local Route Configuration
    b) Dynamic Cached Routes
    c) Routing Server Settings
  9. Routing Servers
    a) Routing Clients
    b) Routing Groups
    c) Exported Routes
    d) Static Routes
    e) Disseminated Routes
C. Database Basics
  1. Gateway Access to Database Servers
  2. Database Server General Setup
  3. Database Server Access Control
D. User Management
  1. User Management Concepts
    a) User Records
    b) Group Records
    c) Account Records
    d) Remote Gateways and User Management
  2. Gateway Server Access to Users
  3. Managing User Records
    a) User Record Queries
    b) User Record Information
  4. Managing Group Records
    a) Group Record Queries
    b) Group Record Information
  5. Managing Account Records
    a) Account Record Queries
    b) Account Record Information
E. CDR Collection
  1. Querying CDRs on a Database Server
  2. Information in a CDR
  3. Gateway Server Collection of CDRs
  4. Database Server Failure Handling
F. License Server PART III—Technical Information A. Database Table Descriptions
  1. ACCOUNT_RECORD Table
    a) Table Definition
    b) Additional Notes
  2. AUTHENTICATE_ID Table
    a) Table Definition
    b) Additional Notes
  3. CALL_RECORD Table
    a) Table Definition
    b) Additional Notes
  4. CREDIT_RECORD Table
  5. DEBIT_RECORD Table
    a) Table Definition
    b) Additional Notes
  6. EVENT_LOG Table
    a) Table Definition
    b) Additional Notes
  7. GROUP_RECORD Table
    a) Table Definition
    b) Additional Notes
  8. USER_PROFILE Table
  9. USER_RECORD Table
    a) Table Definition
    b) Additional Notes
B. Network Design Information
  1. Present invention Components—Network Requirements
    a) Gateway Server
    b) Routing Server
    c) Database Server
    d) Management System
    e) Provisioning System
  2. Traffic Prioritization Part I—Basics of the Present Invention
Introduction This section provides an introduction to the present invention.

There are three main parts as follows.

Part 1—Basics of the present invention, provides basic information that applies to all of the components of the present invention. This part contains four sections:

Introduction—This section.

System Overview—Provides an overview of the present invention, describing the key components of the present invention, and how these components interact to provide flexible IP Telephony services. This section also discusses common concepts that are helpful in order to understand the interaction between present invention components. These concepts include identification, security, configuration management, services, and management.

Installation and Setup—Describes how to install and configure the present invention. This section discusses hardware board installation, hardware driver installation and setup, as well as the installation and basic configuration of the present invention software. Only basic setup is covered in this section; later sections provide full details on how to configure the present invention.

Getting up and Running—Completes the introduction to basic functionality by demonstrating how to get a basic system up and running after it has been installed and set up. Shows how the Management System is used to configure operational components, how services can be started and stopped, and how common functionality (such as identification and security) can be set up.

Part 2—Operation discusses how to use the functionality provided by the present invention in detail. There are four sections in this section, each discussing a specific aspect of functionality provided by the system. The sections are as follows:

Gateway Server Capabilities—Provides a detailed description of the Gateway Server capabilities. This section discusses how to control the interaction of the end users with the system, and how to configure items like voice prompts, services, and numerous others.

The Gateway Application—Introduces the main application that runs on the Gateway Server, the Gateway application, which provides the main service offered by the present invention. Discusses the configuration and operation of the Gateway application in detail.

Routing and Number Translation—The present invention provides numerous ways to translate digits dialed by the user and to route calls across a network of Gateways. This section describes the routing process, and explains how this process can be optimally configured for a particular environment and network structure.

Database Basics—Provides an introduction to the Database Server, and describes how the Gateway Server makes use of the Database Server. This section introduces some of the basic information, as a prerequisite to discussion features of which the database server is an integral part, in the following sections.

User Management—An important requirement, particularly for telecommunications service providers, is the management of the end users of the system, and the maintenance of their accounts. This section discusses user management, explains the various information maintained for each user of the system, and shows how this information can be used to customize the service provided to the end user.

CDR Collection—In order to bill for, and have a record of calls, the present invention is capable of collecting a Call Detail Record (CDR) for each call. This section explains the CDR collection process, and how it can be customized for a particular environment.

License Server—In some environments, a license server can facilitate the network-wide licensing of present invention software. This section provides details on how to set up a license server for the purpose of simplifying license administration.

Part 3—Technical Information provides detailed technical information about the present invention. This information is useful for optimizing the performance or quality of an present invention installation, or for integrating external applications with the present invention. There are two appendices in this section:

Database Table Descriptions—The structure of database tables used by the Database Server is described in this appendix. This information is useful in developing customized applications that interface directly with the data stored in the database.

Designing a Network—The quality of any IP Telephony system is heavily dependent on the quality of the underlying IP network used to transport the IP traffic. This section provides a detailed description of the network factors that affect the overall performance of the system, and provides information on bandwidth and port numbers necessary to design a network that will deliver maximal quality.

System Overview

This section provides an overview of an example implementation of the present invention. It describes the components that make up the present invention, and how these components co-operate in order to deliver IP Telephony services. It describes the basic concepts that are common to all components of the present invention.

There are three main sections in this section. They are as follows:

What Is The present invention? This section describes, at a very high level, what the present invention is, and what it provides the capability to do.

Present invention Components. This section introduces the components of the present invention. It describes the purpose of each of the components, as well as the interaction between those components.

Key Concepts. The key concepts that are common to all components of the present invention are described in this section. The concepts covered include identification, security, configuration, management, and licensing. The basic principles of operation, such as starting and stopping services, are also described in this section.

What is the present invention?

The present invention is designed to allow voice and fax traffic to be carried over an IP network. This is more commonly referred to as "IP Telephony". In addition to providing simple call termination, the present invention provides a host of enhanced features that enable IP Telephony capabilities to be used in a number of different applications. Since IP Telephony typically results in much lower telecommunications costs, it can be used to reduce telecommunications costs between two branch offices. The reduced communication costs could instead be used to resell long distance calling to end users. A further application is enabling IP Telephony equipped terminals, such as multimedia PCs running Microsoft NetMeeting software, to access traditional services, such as a call center. By combining IP Telephony with other technologies, such as the World Wide Web, integrated WWW call centers are possible. The present invention makes these applications possible by acting as a "Gateway" between traditional telecommunications networks and systems, and IP systems.

There are two main parts to each member of the present invention:

Software. This is a suite of software components, running for example on Microsoft Windows NT, which provide IP Telephony services across an IP network. Each of the components of the present invention software is described in detail in the next section of this section.

Hardware Platform. In order to achieve connectivity with traditional telecommunications systems and networks, such as legacy phone systems (PBXs) and the public switched telephone network (PSTN), a specialized hardware platform, according to the present invention, is necessary. This hardware platform is used to run the present invention software components of the present invention that handle connectivity to traditional telecommunications devices, and consists of a PC running Microsoft Windows NT, containing one or more specialized telephony hardware devices. In addition, standard PCs running Microsoft Windows NT can be used to run other software components of the present invention that do not require a direct connection to the traditional telecommunications equipment.

Each member of the present invention consists of a hardware platform with specific traditional telecommunications equipment connection capabilities, as well as software configured for that connection. The present invention supports, but is not limited to, the following kinds of connections:

Analog loop start (FXO, standard analog telephone lines)
Analog station interface (FXS)
T-1 robbed bit signalling
ISDN PRI (T-1 and E-1)

In addition to the different types of connectivity supported, different members of the present invention provide different connection sizes, ranging from two line systems up to multiple T-1/E-1 systems. It is also possible to license the present invention's software independently of the hardware platform, as well as to customize hardware platforms to achieve specific capabilities.

The main focus of this section is to explain the present invention in an example software implementation, and how it is used to deliver the desired IP Telephony services to the end user.

Present Invention Components

The present invention software is comprised of a number of independent software components, each of which provides some part of the overall functionality provided by the present invention. These components communicate with each other over the IP network that connects them. The different types of components are each discussed below. It is important to note that numerous instances of each type of component may be running simultaneously in different locations.

Each component of the present invention software is an independent Microsoft Windows NT application. Once installed, these applications can be executed in the same manner as any other Microsoft Windows NT application. Directions on interacting with the individual components are provided in the sections later in this document, with an overview of the interaction. Each of the components that comprise the present invention software is described in the subsections below.

Gateway Server

The present invention Gateway Server 210, 220 is the core of the present invention software. The Gateway Server manages the specialized telephony hardware that is used for interconnection to the telecommunications equipment, and performs all bridging of calls between the traditional telecommunications network and the IP network to which the Gateway is connected.

The key responsibilities of the Gateway Server are as follows:

Handling calls received on either the IP or traditional telephony networks;

Bridging calls between the two different kinds of networks. This involves voice compression, echo cancellation, control protocol transformation, and numerous other complex operations;

Interacting with telephone users using DTMF digits (and other methods of telephony signaling) in order to collect information such as the target number, user identification, password, and more;

Interfacing with the routing system (described below) in order to translate numbers and routing those numbers to the correct destination Gateway, IP address, or telephone number (depending on the number dialed);

Interfacing with the database system in order to validate user accounts, apply charges, and keep records of all calls.

With multiple Gateway Servers, it is possible to do long distance PSTN switching over an IP network. This requires two gateway servers, one in the originating PSTN zone, and one in the terminating PSTN zone.

Of course, more than two Gateways (i.e., gateway servers) could be connected via the IP network, resulting in a wider range of calling areas. Furthermore, it is not necessary to restrict calling to the local PSTN zone in which each Gateway is located. For example, a single Gateway in New York could handle all calls for North America. If the other Gateways in the network were located outside of the United States and Canada, then this would still represent significant cost savings over the direct dialed long distance rate from the international location.

Routing Server

The Routing Server 230 is an optional component in the system that is used to route calls across the IP network, and possibly to a final destination on the telephone network. It is not a required component in order to be able to route calls; a Gateway Server can route a call based on local information maintained on the Gateway Server only. However, the use of a Routing Server can facilitate the automatic exchange of routes between different Gateway Servers, and can in general make the administration and configuration of call routing much easier.

The following are the key roles of the Routing Server:

Providing Gateway Servers with the ability to look up routes to a particular number. For example, a Gateway Server could ask a Routing Server for routes to a number such as +1(703)555-1234. The Routing Server, if it has a route, would return it to the Gateway, which would then use the route to complete the call. For example, the Routing Server might indicate that there is a Gateway Server located at IP address 1.2.3.4 that can complete the call to +1(703)555-1234;

Allowing Gateway Servers to export their local routes for the use of other Gateways in the system;

Provide Gateway Servers with routes that are specifically intended for that Gateway Server. This allows all routes to be configured on the server only, but automatically distributed to the appropriate Gateways;

Distribute E.164 translation data. An important process is how a string of digits entered by the user is translated into a standard, E.164-style address (e.g. 00117035551234 (+1(703)555-1234). The routing server facilitates the exchange of this data, eliminating the need to configure it on each Gateway Server.

In a large deployment, and for reliability, it is possible to configure multiple Routing Severs in the same network. The use of multiple Routing Servers can provide both load balancing across multiple machines, and redundancy to protect against the failure of any particular Routing Server.

Database Server

The present invention software may, in many applications, need to manage the users of the system. When Gateway Servers are connected to the PSTN, and accessible by the general public, it is generally necessary to restrict calling privileges to those users with valid user accounts. In addition, it is often desirable to bill for services, either post-paid or in real-time. Although the Gateway Servers could connect directly to a centralized database using Open Database Connectivity (ODBC) this approach would not be scalable as conventional database packages support only a relatively small number of concurrent connections to the actual database. Furthermore, it would not be secure, particular if the IP network connecting the Gateway Servers to the database is the Internet. In this environment, the actual database would need to be exposed to the Internet at large in order to provide access to Gateways, instead of being protected behind a firewall.

The Database Server 240 component of the present invention in software addresses these problems by providing middleware that interfaces with numerous Gateways, but uses only the small number of available connections to the underlying database. This allows even very large numbers of Gateway Servers to have access to the data contained in the shared database. The present invention Database Server presently supports underlying databases in Microsoft Access format, as well as Microsoft SQL Server 6.5 or 7.0. The use of a standard underlying database package facilitates integration of external applications with the data that drives the present invention.

Even though only a small number of connections exist between the Database Server and the underlying database package, a License Agreement may require a separate license for each Gateway Server that either directly or indirectly uses the services of the database package.

More complex configurations are possible. As with the Routing Server, it is possible to use multiple Database Servers in a particular network. This is usually done to provide redundancy and protection against the failure of the main Database Server.

Management System

The Management System 250 is a GUI tool that is used to perform configuration and administration of the above present invention software components. It connects to the Gateway, Routing, and Database Servers remotely via the IP network, and can be used to monitor the current state of those components, as well as to make changes to the configuration of those components. This architecture allows all of the Gateway, Routing, and Database Servers in the network to be configured from a single point. This is critical in environments where the actual servers may not be directly accessible. Furthermore, multiple instances of the Management System can be run on different machines, allowing several administrators to jointly manage the network. More details behind how the Management System operates are provided below in the Key Concepts section.

Provisioning System

The Provisioning System 260 is a tool that allows access to the data managed by the Database Server component of the present invention. The Management System provides access to the Database Server, and allows the Database Server to be configured, but it is the role of the Provisioning System to actually allow interaction with the data contained in the databases. The following are the main tasks that the Provisioning System is used for:

Adding, removing, or modifying the accounts of system users;

Configuring and maintaining group records for users, and account records for users;

Reviewing call detail records stored by the Gateway Servers.

Like the Management System, the Provisioning System operates remotely, and can be used to administer multiple Database Servers. In some applications, the Provisioning System may not be required, since external applications can directly modify the data contained in the underlying database. The Provisioning System is provided as a tool for those users who don't require the flexibility of a custom external application.

Utility Components

The present invention includes a number of utility components that are useful for the initial configuration as well as diagnosis of present invention software components. These components do not necessarily play a large role in the day to day operation of the system. These components are as follows:

Installation Program. This program will install the present invention software components that one can choose on to a particular machine. One normally need only run this once, and only if one purchased the software independently of the hardware platform.

Express Configuration. The Express Configuration (or ExpressConfig) program is designed to allow one to set up a basic configuration for present invention software components in a short period of time. The most common values for advanced features are automatically configured; other features are automatically configured based on a simplified set of information that one provide during Express Configuration. After the process is complete, the configuration of the system can be fine tuned using the Management System.

Control Panel. The control panel is a simple Windows application that allows one to monitor, start, and stop the Gateway, Routing, and/or Database Server running on the same machine as the Array Control Panel utility. It is useful for diagnostic purposes, but it has no capability to change any configuration parameters.

Other Implementation Details

Components and Nodes

As explained in the previous section, there are a number of different types of components in the present invention software. In addition, it was also explained that there may be many instances of the same type of component, running on different machines. Using the Gateway Server example, there might be one Gateway Server in New York, and another Gateway Server in Los Angeles. These two Gateway Servers might switch calls over an IP network connecting them, allowing inexpensive long distance between New York and Los Angeles.

In this manual, the term "node" will often be used to describe an instance of a particular type of component. For example, both of the Gateway Servers in the previous example are distinct nodes, even though they are both components of the same type.

It is also possible to run instances of different components on the same machine. In this case, each different component is in effect a different node. There is actually no difference in operation regardless of whether components run on the same machine, or on different machines, except for the utility components which only operate on the local machine. Therefore, when nodes are discussed in this document, it will be assumed that they could always be running on the same machine. However, it is not possible in some cases to run two or more instances of the same component on the same machine. As an example, a Gateway Server and a Database Server could run on the same machine. However, in some cases two Routing Servers could not run on the same machine.

Operational vs. Administrative Components

The present invention software consists of three types of components:

Operational Components. This refers to the Gateway Server, Routing Server, and Database Server. These software components provide IP Telephony services to the end user, and are not interacted with directly by the administrator of the system. Operational components are always running, and run in the background with no user interface. Operational components are similar to Windows NT services; they can be started or stopped at any time, and only provide their services while started. Operational components do not, however, run as Windows NT services—they are Windows NT applications that run in the background. Operational components can be administered at any time, even while stopped, as long as they are running.

Administrative Components. This refers to the Management System, and Provisioning System. These components are GUI-based Windows NT applications that can be used to interact with the operational components. The Management System interacts with all three operational components in order to perform configuration changes; the Provisioning System interacts only with the Database Server in order to manipulate data in the database.

Utility Components. This category of components was defined previously, and provides programs that operate directly on the local machine.

Configuration

All present invention software components manage configuration in the same way. The configuration is stored in the Microsoft Windows NT registry, under a key. Each individual product component will store configuration in subkeys of this key. When a present invention software component first starts, it will read its configuration from the registry. After startup has been completed, components will not in general re-read the registry. If one makes configuration changes to the present invention software directly by editing the registry, one will in general need to restart the component for which one is editing the configuration in order for the configuration change to take effect.

In general, one will not need to interact directly with the configuration data stored in the registry. The main purpose for providing this information is to allow one to locate the configuration data so that one can ensure that it is backed up with the rest of an installation.

Identification and Authentication

The security model employed in the present invention employs two main ideas. The first is the idea of identification and authentication, and the second is that of access control. Identification and authentication, described in this section, describes how one component of the present invention, usually a server of some sort, determines the identity of another component that is requesting some service or data. Once the requesting component has been identified and authenticated, access control is then used to determine if the component with that identity should indeed be granted access to the requested data or service.

Identification and authentication are performed through the concept of a security domain. This concept is central in trying to configure the security subsystem of any present invention component. Stated simply, a security domain is just a collection of members that are part of that domain. Each member has a unique name within that domain, and has some authenticating information that can be used by other members in the domain to verify that it is indeed a valid and legitimate member of the domain. The domain will also have a unique name. When displaying the full name of a member, the DOMAIN:MEMBER syntax will be used, where DOMAIN is the name of the security domain, and MEMBER is the name of the member within that domain.

Note: An present invention security domain should not be confused with a Microsoft Windows NT domain. The two types of domains are not related in any way. Making two present invention components part of the same security domain does not make them part of the same Microsoft Windows NT domain.

Each instance of an present invention software component, previously defined as a "node", must be a member of at least one security domain. This is always required, since all components of the present invention either connect to some node to administer and manage them (which must of course pass identification and security checks), or else they are connected to by administration/management components (in which case the connecting component must be identified).

It is possible for a component to be a member of multiple domains. However, there are not many situations in which this capability would be necessary.

Also, recall that two nodes running on the same machine (for example, a Gateway Server and a Database Server) are not considered to be the same node. Therefore, despite running on the same machine, the two components could be given independent, different identities.

Lastly, it should be noted that two distinct nodes can be given the same identification. Typically, this is used to simplify administration by assigning all components running on a given machine a common identity. However, it is generally recommended that different components of the present invention be given identities even if they run on the same machine.

Access Control

As described in the previous section, the security model in the present invention is comprised both of identification and security, and access control. Identification and authentication are a prerequisite to access control. The role of access control is to determine what level of access should be provided to a remote node. For example, just because a Gateway Server can determine the identity of a Management System, it does not imply that the Gateway Server should automatically allow that Management System to administer it.

Access control is required in numerous places in the system. The main places where access controls is required are as follows:

The Gateway, Routing, and Database Servers need to determine whether a particular Management System should be allowed to perform administrative operations.

The Database Server needs to determine whether a particular Provisioning System should be allowed to modify the data in the database.

The Routing Server needs to determine whether a Gateway Server should be allowed to retrieve call routing data.

The Database Server needs to determine whether a Gateway Server should be able to query the user database, or insert CDRs.

Although there are access control features between Gateways, they are handled using a different mechanism to allow additional features (such as billing of the remote Gateway) which are not possible using the access control system applied in other areas of the present invention.

Access control in the system is accomplished through an access control list associated with the particular service or resource that can be accessed. This access control list specifies the identifiers (such as DOMAIN1:MEMBERA) of the members that are permitted to access the service or resource with which the access control list is associated. Each entry in the access control list contains not only the identities of the members that should be associated with that entry, but also information concerning the level of access that the identified members should have. For example, the Routing Server allows control over whether or not a Gateway Server can export routes for the use of other Gateways.

Management

The Management System component is used to perform the management and administration of the Gateway, Routing, and Database Servers, as described previously. This administration and management is fully remote, and can be performed from anywhere in the network providing that there is an IP network connection to the node being administered.

Having explained the security model employed by the present invention components, it is now possible to explain the basic mechanism by which the Management System functions. Each operational component has a "Management Server"—it allows management operations to be performed by a remote "Management Client". The client in this case is the present invention Management System. In order to manage a remote system, the Management System first establishes a connection to the operational component. After this connection is established, the Management System provides identification and authentication information. The operational component checks the information provided by the Management System, and uses this information to determine whether or not the connecting Management System should be granted to access to administer it. If the connecting Management System cannot be identified and authenticated, or it does not have a matching entry in the Management access control list on the target operational component, the connection will be terminated.

Once the connection is successful, the Management System can be used to administer the operational component. How to use the Management System to perform this administration is described in detail below.

Licensing

In order to use an present invention software component, a software license for the component being used must be available. This license can be provided upon the purchase of the software.

According to the present invention, licensing is performed via license keys. A license key is an encoded string that contains information regarding a particular license. Each license key provides a fixed number of licenses to a particular component of the present invention software. License keys are only valid for use by the customer to which they were issued. Furthermore, license keys are dependent on a hardware key, also supplied at the time of purchase. This prevents one's license key from being illegally used by others that may somehow obtain access to this license key. The hardware key attaches to the parallel port of one's computer, and allows the license key to be interpreted correctly.

In one example, license keys are required only for the Gateway Server component of the software. One Gateway Server license must be acquired for each line in the system. (However, a single license key may contain 10,100, or more licenses, so a separate license key is not required for each line). Since multiple license keys may be used simultaneously, it is possible to expand a system (providing that adequate hardware is installed) simply by purchasing additional license keys. This provides the flexibility of acquiring a small number of licenses to begin with, and scaling up the number of licenses as traffic requires.

There are two main modes of licensing that can be used. These licensing modes are as follows:

Standalone Mode. In standalone mode, each Gateway Server is required to have its own hardware dongle. A license key is required for each Gateway Server, and must contain sufficient licenses for the use of that Gateway Server. This model is simple to implement, and allows complete independence between Gateways.

Server Mode. In server mode, a centralized license server manages licensing for all components in the network. When a component first starts up, it will contact the license server to receive the necessary licenses. With this configuration, all license keys are configured on a single machine, and only one hardware key is required.

Time-limited, demonstration license keys are also be available to facilitate evaluation of the licensing.

Installation and Setup

This section describes an example installation and setup of the present invention . This section is divided into three main sections:

Hardware Installation and Setup. This section details how to install the hardware used by the Gateway Server to interface with the telephone network, and how to configure the drivers for that hardware.

Software Installation. This section describes how to install the various present invention software components.

Express Configuration. This section describes the Express Configuration program, and how it can be used to configure a default, initial configuration for the present invention.

Note: In one example, the present invention is a turnkey systems. The hardware, driver software, and software of the present invention installed and pre-configured for a particular environment. Alternatively, software can be sold separately. The information in this section pertains only if the present invention software was acquired separately, or if the software needs to be re-installed.

Hardware Installation and Setup

This section discusses the installation and setup of hardware devices used by the Gateway Server to interface with the telephone network. Telephony hardware devices are not required in order to operate the Routing Server, Database Server, or any of the other components of the present invention software.

There are two main types of hardware devices that are used by the Gateway Server. These hardware devices are:

Telephony interface hardware devices. These hardware devices are used to connect the PC on which a Gateway Server operates to a telephone network. A wide variety of such boards are supported, in order to enable connectivity to a variety of hardware devices. Dialogic Corporation manufactures the telephony boards used by the Gateway Server. The following models of Dialogic hardware are supported:

D/21H and D/41ESC in Gatenet 3 mode (2 line analog loop start)

D/41ESC in normal mode (4 line analog loop start)

D/160SC-LS (16 line analog loop start)

D/240SC-TI (24 channel T-1 robbed bit, 23 channel ISDN PRI)

D/300SC-E1 (30 channel ISDN PRI)

MSI/SC-R (8, 16, 24 channel analog station interface)

It is possible to use multiple boards to achieve higher numbers of supported lines within a single chassis. It is also possible, in some cases, to mix boards of different types.

DSP devices. These devices perform digital signal processing (DSP) on telephone signals using high performance, embedded DSP chips. These devices are required in configurations where a large number of lines need to be handled by the system. Boards from two hardware vendors are supported: Analogic Corporation, and Brooktrout Technology. The following boards are supported:

Analogic TAP-801 (for backwards compatibility only)

Analogic TAP-802 (22/33-port DSP board)

Analogic TAP-804 (24/36-port DSP board)

Brooktrout TR-2001 (24–60 port DSP board)

Installing Dialogic Telephony Boards

Before installing the Dialogic Telephony boards, make sure that switches on the board are set correctly. Switches vary from board to board, follow the instructions (if any) corresponding to the board being installed listed below.

On a D/41ESC, set/push both switches on SW2 to the bottom level.

On a D/160SC-LS, ensure the board is "on-hook" (see SW4 on Quick Install Card).

On a D/240SC-T1 board, set "loopback" off—push switch down (see SW500 on Quick Install Card).

All Dialogic telephony boards that are to be installed in the system should be inserted into the machine as per the Quick Install Guide shipped with the boards. The boards must be firmly placed in to the slot. Because the Dialogic boards (with the exception of the D/21H) are full length boards, it is important to ensure that there are no obstructions when inserting the board, or else the board might become loose at a later time.

Once the boards have been inserted, one must next confirm that each Dialogic board has a unique ID. The ID for each board is set by way of a rotary switch located on the top of the board, near the front of the machine into which the board is inserted.

Installing DSP Boards

If one has DSP boards, they should be installed into the PC in the same manner as the Dialogic Telephony boards, and following the directions in the users guide supplied with the DSP board. One will also need to following certain board-specific directions when installing DSP boards:

For the Analogic TAP-801/802, check the rotary switches at the bottom of the board near where the board plugs into the ISA bus. There are two small rotary switches that control the I/O address of the board. By default, this I/O address is 0x240, which is specified using a '2' on the first dial, and a '4' on the second dial. If one is installing multiple boards, he or she must ensure that each board has a unique I/O address. 0x250 usually works for the second I/O address.

For the Analogic TAP-804, no jumper/switch settings are necessary.

For the Brooktrout TR-2001, no jumper/switch settings are necessary.

Installing the SCbus Cable

If one is installing DSP boards, he or she will also need to install an SCbus cable in order for the system to operate correctly. If one is not using SCbus (i.e. using Gatenet 3), then the SCbus cable is not required. One will need an SCbus cable that has at least one drop for each board that is installed in the system. There are several important notes regarding SCbus cables below:

Even if one has a Dialogic board in the system that is not planned to be used, one must still connect the SCbus cable. Failing to do so may prevent the Dialogic service from initializing.

Some Analogic TAP-802 boards have a notched SCbus connector that is backwards. In no event should one twist the SCbus cable to fit into this notch! If a SCbus cable is in fact notched (meaning that one is unable to normally insert it into the connector on the Analogic TAP-802), then a user must either acquire a non-notched SCbus cable, or remove the notch.

The SCbus cable should run flat across the connectors of all ISA boards in the system. If one is using a PCI DSP board, then one will require a longer SCbus cable. However, the cable should still be flat—there should be no twists in the cable.

Symptoms of an incorrectly connected SCbus cable include not being able to initialize the Dialogic boards even though they are correctly detected, and not hearing any audio even though the Gateway Server answers successfully.

Installing the Dialogic Drivers

After the hardware boards have been installed and the PC has been restarted, it is necessary to install the Dialogic DNA3 drivers in order to verify that the boards are correctly installed and to enable the Gateway Server to make use of the boards. The following procedure is used to install the Dialogic drivers. Note: The Gateway Server operates preferably with Dialogic DNA3, but is not limited to Dialogic DNA3. Previous versions of the Dialogic drivers (DNA, DNA2, 98.02, 97.08, or others) can be used. The Streams environment is not required in order to install the DNA3 drivers.

Step 1: Obtaining the Dialogic Drivers

First, it is necessary to obtain the Dialogic DNA3 drivers. There are several sources from which the Dialogic DNA3 drivers may be obtained:

A CD may be purchased provided with a purchase of the present invention. The Dialogic driver diskette may have accompanied boards, if one purchases the hardware separately.

Array Telecom Corp's FTP site at ftp://ftp.arraytel.com. The Dialogic DNA3 drivers can be found in the directory/Version3/Drivers/DNA3, and is supplied under the filename DNA3.zip.

Dialogic Corporation's WWW support site at http://support.dialogic.com. One will need to follow the links on the web page, and provide some information in order to be able to download the DNA3 drivers from the Dialogic web site.

If one downloaded the Dialogic software either from Dialogic, one will need to uncompress it into a directory from which one can install it.

After one obtains the Dialogic drivers, one will need to run the installation program. If running the installation program manually, run SETUP.EXE from the directory containing the Dialogic drivers. If installing from an original Dialogic DNA3 CD, the setup program may be started automatically when the Dialogic DNA3 CD is inserted into a CD-ROM drive.

A welcome screen should appear once the setup program runs.

The user information screen will appear next. One enters name and company in order to proceed.

The setup options screen will allow one to select which components should be installed. Four options will be available; typical, complete, compact, or custom. One selects "typical" unless he or she has special requirements, or unless one wishes to select ISDN, in which case custom must be selected.

If one selected custom and selected ISDN, one will be prompted to see if ISDN should be installed. If one selected custom, one will also need to indicate whether the ISDN Package should be installed. One should answer yes to this question if using the Dialogic D/240SC-T1 or Dialogic D/300SC-E1 in ISDN mode to connect to telephony equipment, or intends to make use of ISDN in the near future, and does not wish to reinstall the drivers later. (Installing ISDN drivers if ISDN is not in use will not cause problems).

If one chooses to install ISDN, he or she will be prompted to specify which ISDN protocols should be installed. One should select the protocol that corresponds to the ISDN switch to which he or she will be connecting.

Tip: If installing ISDN, and connecting to a device that is normally connected to a DMS 100, AT&T 4ESS, or AT&T 5ESS switch, select the NT1 protocol. This protocol emulates the network side of an ISDN connection.

Next, one will be prompted to enter the location to which the Dialogic drivers will be installed. It is recommended that one use the default options for the installation location. A user can click on Next to install to a location other than the default.

A user will then be provided with an opportunity to confirm that the selections made match particular requirements. Once the information provided in the display is checked, click Next to begin installing the actual files.

Once the installation completes successfully, a user will be given the option of viewing the release notes, and/or running the Dialogic configuration manager. Regardless of whether or not one chooses to read the release notes (not necessary in most cases), one should choose to run the Dialogic configuration manager.

It is recommended that one not reboot your system immediately after the installation, since this is not necessary, and one will need to reboot after installing other drivers and software.

Next, a dialogic configuration manager automatically attempts to detect which boards are installed in a PC. In general, boards will be correctly detected providing that they are installed correctly. A display will be shown once boards have been detected:

Once boards have been directed, a user may need to make configuration changes depending on your system setup. The changes necessary for operation with the Gateway Server, based on a user's board type, are as follows. A user may also need other changes depending on the exact environment in which he or she is configuring software.

For Dialogic D/240SC-T1s and Dialogic D/300SC-E1s operating in ISDN PRI mode, one will need to configure the ISDN protocol used on the device.

Select the device, click on properties, go to the interface tab, and select the ISDN protocol from one of the protocols shown in the list. One will need to do this for each ISDN device installed in his or her system.

If running in Gatenet 3 mode with the Dialogic D/41ESC or D/21H, one will need to make changes to the Dialogic configuration. These changes are explained in the next section. Once configuration of the Dialogic drivers is complete, the Dialogic service can be started.

Step 4: Obtaining and Installing Dialogic Gatenet 3

Note: It is only necessary to install Gatenet 3 for a low density software only configuration. For hardware DSP processing boards the Gatenet 3 must be installed for the software to work correctly.

Dialogic Gatenet 3 is essentially a set of firmware from Dialogic that runs onboard the D/21H and D/41ESC boards. The purpose of the Gatenet 3 package is to provide hardware echo cancellation, allowing real-time, full duplex conversations to take place in an IP Telephony environment.

Installing Gatenet 3 overwrites some files from the Dialogic DNA 3 installation. As with the Dialogic DNA 3 software, it is necessary to obtain the Dialogic Gatenet 3 drivers first. These drivers can be obtained from the following locations:

A compact disk having the DNA 3 software on it;

The CD;

A Dialogic CD containing the Gatenet 3 drivers.

Array Telecom Corp's FTP site at ftp://ftp.arraytel.com. The Dialogic DNA3 drivers can be found in the directory/Version3/Drivers/GN3, and is supplied under the filename GN3.zip.

Once the Dialogic Gatenet 3 drivers are obtained, one runs SETUP.EXE in order to install them. One is then greeted with a welcome screen.

When a user selects "next", he or she may receive a warning screen, indicating that the Dialogic Gatenet 3 package overwrites certain files and registry entries, and cannot be uninstalled. This means that if a user needs to uninstall Gatenet 3, he or she will be forced to reinstall the Dialogic DNA 3 drivers to have a stable configuration.

A user will next be requested to enter user and company information. Enter this information, and click on Next.

The installation options will be confirmed. Verify that the installation options are correct, and click next. One should ensure that the directory to which the Dialogic Gatenet 3 drivers are installed matches the directory to which one originally installed the Dialogic DNA 3 drivers. Select "Next" once the installation options are verified. Setup will then proceed to copy the necessary files.

After optionally reviewing the release notes following a successful installation, a user will be given the option of rebooting his or her machine. It is recommended that a machine be rebooted at this time, prior to starting the Dialogic service.

After a machine has rebooted, one runs the Dialogic Configuration Manager in order to complete the configuration of the Gatenet 3 package. Run the Dialogic Configuration Manager by going to the Start Menu\Programs\Dialogic System Software\DCM.

One can make the following changes using the DCM. The following changes must be made under the properties of each D/21H and/or D/41ESC installed in the system:

Under the Misc, set Gatenet=ON

Under the Dialogic Bus tab, set BusType=NONE.

In addition, one should edit gatenet.prm. This file is found by default in C:\Program Files\Dialogic\Data. A user may use any standard text editor, such as Notepad or Write, to make these changes. However, the resulting file should be saved in a text format.

One will find a block in gatenet.prm that reads:

parm[246]=<value> parm[247]=<value>

In the above, <value> will actually be a number. Change the value so that the section reads:

parm[246]=240 parm[247]=240

Once the above changes are made, save the file. One will need to restart the Dialogic service in order for the changes to take effect.

Step 5: Starting the Dialogic Service

When the Dialogic drivers are installed, they are not activated until a user selects to actually start the service. Starting the service also involves verification by the Dialogic drivers that it is possible to start the Dialogic boards.

In order to start the Dialogic drivers, use Start Menu\Programs\Dialogic System Software\DCM to start the Dialogic Configuration Manager. If a red button with "STOP" written in the middle appears in the toolbar, then the Dialogic service is already running. Otherwise, a Green button should be present in the toolbar, which a user can press to start the Dialogic service. Depending on a particular board configuration, the Dialogic service can take from between 15 to 60 seconds in order to start.

Once a user has confirmed that the Dialogic service starts correctly, he or she may wish to configure it to start automatically whenever the machine starts. In order to do this, open the Service menu in the DCM, and select Startup mode. One can change the Startup mode between manual and automatic in this menu.

Installing Analogic Drivers

This section will describe an example installation of the Analogic drivers. These drivers are required to support the TAP-801/802/804 DSP boards manufactured by Analogic Corporation.

Note: The Analogic drivers should be installed if the hardware configuration includes Analogic DSP boards. Gatenet 3 users can choose not to install Analogic drivers.

Step 1: Obtaining the Analogic Drivers

The first step in the installation is obtaining the Analogic drivers. One should obtain the correct version of the Analogic drivers. For example, one can select the v1.3 drivers.

There are sources from which one can obtain the Analogic drivers: a compact disk having v1.3 drivers, or Array Telecom Corp's FTP site at ftp://ftp.arraytel.com. The Analogic v1.3 drivers can be found in the directory\Version3\Drivers\Analogic1.3, and is supplied under the filenames TAP-H.EXE and TAP-D.EXE.

Step 2: Uncompressing the Analogic Drivers

After one has successfully obtained the v1.3 Analogic drivers, they may be decompressed so that they can be installed. A CD can contain uncompressed versions of TAP drivers in addition to the compressed version, so one does not have to follow these directions if installing from CD.

One should uncompress both the TAP-H and TAP-D drivers separately. In order to uncompress the TAP-H drivers, run TAP-H.EXE from the location where it was downloaded. One will need to provide the name of a directory to which the TAP-H drivers will be decompressed. It is recommended that a user select C:\TEMP\TAP-H, so that he or she can easily remove the temporary files afterwards. Once a user clicks on OK, the files should be uncompressed, and ready to use.

The same procedure should be followed for TAP-D, except that one must uncompress to a different directory. C:\TEMP\TAP-D is recommended. As with TAP-H, this is a temporary directory that can be removed after the installation is complete.

If installing from a CD, the uncompressed versions of the TAP-H and TAP-D drivers can be found, respectively, on the CD. A user can use this in place of C:\TEMP\TAP-H and C:\TEMP\TAP-D in Steps 3 and 4 below.

Step 3: Installing the TAP-H Driver

After the drivers have been uncompressed, one can install the TAP-H drivers by running SETUP.EXE from the directory into which he or she uncompressed the TAP-H driver. The TAP-H driver installs the host libraries necessary for an application (such as an example of the present invention software) to interact with the DSP board. One should install this driver first, before TAP-D.

After one runs SETUP.EXE, he or she will be greeted with a standard welcome screen. Select Next to proceed.

One will be allowed to enter the location to which the TAP-H drivers are installed. One should install to the default location, since some of the TAP utilities are highly dependent on pathname.

After a user has selected the directory to which the TAP drivers are installed, he or she will be asked for the program folder that should be created to hold the TAP-H installed programs. A user may accept the default, or modify it if a different folder name is preferred.

Following the selection of the folder to which the TAP-H drivers are installed, the copying of the necessary files will commence. After the copying is complete, a user will be advised of the completion, and asked to log off and log back on in order for the changes to take effect. Preferably, one should not log off since he or she will need to reboot the machine following the installation of the TAP-D drivers.

Tip: The Analogic TAP-H drivers modify environment settings for the currently logged on user. If the Gateway Server is to be run using a different account, the settings made by the TAP-H driver will need to be moved from 'User Variables for <current user>' to 'Systems Variables' under My Computer\Properties\Environment. The variables that should be manually copied between the sections are 'TAP_800' and 'TAP_DIAG_DIR'.

Step 4: Installing the TAP-D Driver

The TAP-D driver is an driver used in addition to TAP-H in order to use an Analogic TAP-801/802/804 DSP board. The TAP-D driver installs the software to initialize with and communicate with the DSP board. The utilities installed by TAP-H are not usually used until TAP-D has been installed.

The installation for TAP-D is very similar to that for TAP-H. SETUP.EXE must be run from the directory to which the TAP-D driver was uncompressed. It will prompt a user with a welcome screen, at which point a user can select Next.

As with TAP-H, a user will be allowed to select the directory into which the software will be installed. A user should select the same base path as you did for TAP-H, and click Next. As with TAP-H, a user will also be allowed to select the folder into which the driver will be installed.

When the installation is completed, one will be advised to run drv_install and then to reboot the system. One should not follow this procedure precisely, since it does not allow one to verify that the board was in fact installed. In order to confirm correct installation of the driver, one should follow the procedure below.

Open a new Command Prompt, using Start\Programs\Command Prompt.

Change to the drive where the TAP-D driver (e.g. C:) is installed.

Change to the directory where the TAP-D driver (e.g. C:\opt\analogic\tap800) is installed.

Change to the subdirectory containing the board driver. (e.g. CD host\drv).

Run install.bat by typing 'install'.

This batch file should install the driver, and configure it. One should see the following message:

C:\opt\analogic\tap800\host\drv>drv_install tap installation

Querying the system for available resources.

This may take a while . . .

Probe found board 0, a Tap802, at port 0x240

If one sees the line above, or a line similar to the above, it indicates that the board has been located successfully.

After one confirms that the drivers have been correctly installed, it is recommended that one reboot his or her system.

Installing the Brooktrout Drivers

This section will describe the installation of the Brooktrout drivers. These drivers support the TR-2001 series of DSP boards manufactured by Brooktrout Technology.

Note: The Brooktrout drivers should be installed if the hardware configuration includes Brooktrout TR-2001 DSP Boards.

Step 1: Obtaining the Brooktrout Drivers

The first step in the installation is obtaining the Brooktrout drivers. There are sources from which one can obtain the Brooktrout drivers: a compact disk having the Brooktrout drivers.

Array Telecom Corp's FTP site at ftp://ftp.arraytel.com. The Brooktrout drivers can be found in the directory/Version3/Drivers/Brooktrout, and is supplied under the filename CompressedOpt?.

Step 2: Installing the Brooktrout Drivers

Run the file dunnoyet that was obtained in Step 1 above. This will start the installation procedure. The Brooktrout installation will be automatically uncompressed to a temporary location. After this process is complete, the setup program will be started automatically.

The Brooktrout TR-2001 SDK setup screen will appear. One can click Next at this screen to proceed. One should then review the license agreement.

One will be presented with the option as to where the software should be installed. A user should accept the default location in most cases. After one selects the location to which the software is to be installed, the copying process will commence. A series of MS-DOS/command prompt windows may appear during this process. This is normal.

After the installation is complete, a user will be requested to reboot and should reboot his or her computer at this time.

Software Installation

Once the necessary hardware and associated device drivers have been installed, a user will be able to proceed with the installation of the present invention software. When installing the software, one will be able to install as many instances of the software as one wants. In a fuller example, one must have the appropriate numbers of license to actually be able to use the software.

In one example of the present invention, software components are all installed from the same installation program. One may select the specific components that are to be installed when the installation program is run. This section will step through the installation of the present invention software, and explain the decisions made in the process.

Before a user begins, the user obtains the present invention software distribution. Once a user has obtained and uncompressed installation distribution, he or she is ready to begin installation. Prior to beginning the actual installation, a user should be sure to have the following information available: the Customer ID for an organization, the Product ID, and the License Keys corresponding to the software that is licensed.

When a user has the information listed above, he or she is ready to begin the installation process.

From a directory containing the uncompressed installation distribution, run a program SETUP.EXE. This will commence the installation process. One will be greeted with a welcome screen.

Following the welcome screen, one will greeted be by an information screen that requires one to enter information about him- or herself, his or her company, and information on a license sheet.

After the information screen, one will be given a choice of setup types. Two options will be presented, complete, and custom. Complete will install all components of the present invention software on the local machine. Custom will allow the user to select which components should be locally installed. Generally, unless one is setting up a test environment, it is best to select the components of the software that one will actually require or use.

If installing the Gateway Server, one should additionally select the type of Gateway Server configuration that should be installed. There are three choices, corresponding to the different hardware configurations of a Gateway Server. They are explained below.

Analogic TAP-80x. Select this option if one is using Analogic DSP boards with a system.

Gatenet 3: Select this option if one is using only Dialogic D/21H or D/41ESC boards, and has the Gatenet 3 package installed.

Brooktrout TR-2001: Select this option if one is using any of the family of Brooktrout TR-2001 boards.

After selecting a DSP configuration, one will be asked for a program folder to install the software to. Once the software has been installed, one will be able to access it in this folder. Normally, the default folder is acceptable. Once a user clicks Next, the copy process will begin.

Once the copy process is completed, a user will be given the option of viewing a readme file that accompanies the software. This file will usually contain the most up to date information about the software.

It is not necessary to reboot a machine after installing the present invention software. Once the software has been successfully installed, a user is ready to move on to the configuration of the present invention software.

Express Configuration

This section describes an Express Configuration (ExpressConfig) program. ExpressConfig can be used to generate an initial configuration for present invention software. It should be used when the software is first installed, or when the software needs to be completely reset, since it will replace all configuration data. Any configuration changes made prior to running ExpressConfig may be lost.

ExpressConfig performs configuration of the Gateway Server, Routing Server, and Database Server components of the present invention. It is capable of performing any or all of these components when it is run, so it is possible to reset and configure the Database Server without affecting the configuration of the Gateway Server or of the Routing Server. Nonetheless, it is necessary to exercise care when running ExpressConfig to ensure that configuration is not unintentionally overwritten.

Running Express Configuration

Express Configuration is installed when a user installs the present invention software. Clicking Start\Programs\present invention\ExpressConfig will start the ExpressConfig program. Once the ExpressConfig program has been started successfully, a user will be presented with a welcome screen, shown below. One will be able to navigate backwards and forwards in the configuration process by using the tree view in the left pane of the window. Alternately, a user can step through each configuration step in a normal sequence by simply using the Next and Back buttons.

The ExpressConfig program is divided into three main sections corresponding to different components of the present invention that can be configured. There are some aspects of configuration that are common to all three components that are set up using ExpressConfig; these common aspects are discussed in the next section.

With all components, there are three possible options with respect to how ExpressConfig will operate on that component.

Not all of the choices may be shown if one is installing for the first time. An explanation of the choices follows.

Do not configure the <component name> on this machine. One should select this machine if one has existing configuration for the given component that you do not want to overwrite, or if one does not wish to set up the component at this time. This is the default option if configuration already exists.

Perform configuration of the <component name> on this machine. This option will allow one to configure the given component on the local machine. With this option, items not specified during ExpressConfig will not be overwritten; in other words, only the areas of configuration handled by ExpressConfig will be affected. This is the default option if configuration does not already exist.

Reset the configuration of the <component name> and perform new configuration. This option is similar to performing configuration normally with the exception that any existing configuration will be automatically overwritten with default values. This option should be used carefully, but may be useful if one has completely corrupted your existing configuration.

Once a user decides which of the above is appropriate, he or she can proceed to entering the actual configuration information.

Note that ExpressConfig is a local utility. One cannot use it to remotely configure components located on different machines. This can be accomplished using the Management System after the present invention has been installed and set up using ExpressConfig.

Common Setup Information

This section describes the setup information that is common across the Gateway Server, Routing Server, and Database Server. The setup information described in this setup pertains to common things, such as identification, security, and management. As described above, ExpressConfig will step through a sequence of information screens. The following are the common information screens that a user can interact with for all three components.

Identification

An identification panel is used to configure identification and authentication information that will be used by a particular component to verify the entities that connect to it and use it's services. Although in principle a user could configure a complete list of all entities on each component, in practice this is not necessary. The following list shows, for each component, what kinds of entities will connect to it and use its services:

Gateway Server: Management System for access to management data. Note that other Gateway Servers do not use the same identification/authentication mechanism.

Routing Server: Management System for access to management data.

Gateway Servers for access to routing data.

Database Server: Management System for access to Management data

Provisioning System for manipulation of database.

Gateway Servers for user management and CDR collection.

With the above list in mind, it is only necessary to configure identification/authentication information for the entities that will connect to the component that you are configuring. For example, when configuring identification/authentication information for a Gateway Server, a user need only enter identification/authentication information for any Management Systems that may connect.

When setting up identification/authentication information using ExpressConfig, it is very important that a user at a minimum provide a configuration that allows for a Management System to connect. Otherwise, one will may be able subsequently to connect using the Management System in order to modify the configuration of the system, and may be forced to re-run ExpressConfig.

The first two parameters a user needs to supply are Security Domain Name and Server Identity. In essence, one is naming the security domain that the server will be a member of, and is providing the name/identity of the server within that domain. The name of the security domain will need to match the name of the security domain of the entities that the server being set up will interact with. For example, if one were setting up a Gateway Server that was managed by a Management System in domain TESTDOMAIN and which connected to a Routing Server in domain TESTDOMAIN, then one must use the same domain name—TESTDOMAIN. The identity that one gives the server within the domain should be unique. Any components that the server being configured connects to will need to have identification/authentication for the identity that one assigns the server.

Once a user has decided on the security domain name, and the identity of the server being set up within that domain, one will need to provide identification/authentication information for the other members of the domain. As mentioned above, one only needs to provide this information for entities that make use of the services provided by the server being set up. In order to add to the list of identities that can be identified and authenticated, enter the member name and IP address in the boxes provided in a panel or other GUI input. A new entry will appear in the list in the middle of the panel. To remove one of the entries, simply select it and click Remove. The principles behind this process are explained in more detail in the next section, when the identification/authentication model is elaborated upon. Advanced features (identity wildcarding, the use of netmasks) are also explained in the next section.

Management Access

The Management Access panel allows one to specify the identities of the nodes that should be granted management access to the server that is being configured. Any node listed on management access control list will be able to connect to the server being configured, and make changes to the configuration of the server. Therefore, it is important that the management access control list be used carefully in conjunction with the identification/authentication settings to ensure that unauthorized access is prevented The Management access control list is reasonably simple, because ability to manage is a binary ability—all nodes identified on the list are capable of managing, and any node not identified will not be allowed to perform any management functions. The means of adding and removing from the management access control list is similar to the identification/authentication list. To add a new entry, enter the member name of the node that is to be added, and click on the Add button. Similarly, to remove an entry, select the entry and click on Remove. It is assumed during ExpressConfig that any member a user adds will be in the security domain configured during the identification/authentication step of the ExpressConfig process.

License Information

In one example, components of the present invention require licenses in order to provide services. The use of license keys allows one to ensure that he or she is always in compliance with his or her license agreement, and that use of the software does not exceed the licenses that have been purchased. During ExpressConfig, a user can add license information, and an initial license key. A user may add additional license keys as he or she purchases them.

In one example, although licensing information can be configured on all of the Gateway Server, Routing Server, and Database Server, only the Gateway Server actually makes use of licensing information. However, licensing capabilities are included on all of the servers to ensure flexibility in creating licensing arrangements that meet customer requirements.

There are two main pieces of information that are used in setting up licensing using ExpressConfig. The first is customer/product identification information. One will need to provide a customer ID and product ID. Both of these pieces of information can be provided on a license agreement.

After a user has entered the basic identification information, he or she enters licensing information. There are two modes in which licensing can function. The first is standalone mode, where keys are locally configured on each server. If operating in this mode, then enter the license key supplied with the system. If, on the other hand, one is operating in client/server mode, he or she provides the IP address of a primary license server (and a secondary license server, if any). More information on setting up licensing is contained in the next section.

Gateway Server Setup

This section describes the setup that is specific to the Gateway Server component of the software. There are three panels used to configure Gateway Server specific configuration data.

Hardware Setup

The hardware setup panel provides a user with the means to quickly setup the hardware configuration of the system. It automatically creates configuration entries for the hardware devices were selected, and creates matching lines and line groups (explained in more detail in Section 5) based on selections.

There are two main questions that are to be answered in order to perform the hardware configuration of a Gateway Server. Firstly, the type of DSP configuration that is present in a system is identified. Secondly, a user indicates the number of Dialogic boards installed in the system that are to be used by present invention.

Note: If the Dialogic boards are being used in the same chassis as a Gateway Server with an application other than the Gateway Server, the board number that is opened following ExpressConfig completion. ExpressConfig uses boards starting from 1 and progressing upwards.

The DSP configuration is selected by picking one of the three available DSP options. One must select the DSP configuration that corresponds to the version of the software that is installed and to the hardware configuration of an actual system.

For the installed hardware device list, there are a number of hardware devices listed. In front of each device, there is an editable field showing how many devices of that type are assumed to be present. One needs to fill in the numbers of each device that are present in the system. Note that one may not be able to select Gatenet 3 mode D/41ESCs and D/21Hs if it was indicated that a hardware DSP board based configuration is used. Similarly, a user can only select quantities of the above boards if a user selected a Gatenet 3 DSP configuration.

Additionally, a user must indicate the type of installed MSI/SC boards, if any, as well as whether the D/240SC-T1 boards are configured in robbed bit mode or ISDN PRI mode. A user's selection matches the actual hardware configuration of the machine, and the configuration of the Dialogic drivers performed in previous steps. If a user does not install any MSI/SC boards, or D/240SC-T1 boards, then the respective settings can be ignored.

Call Routing

A call routing panel is used to allow one to configure the list of Routing Servers that the Gateway Server being configured will access in order to obtain routes. There are numerous settings that can be used to customize how a Gateway Server interacts with a Routing Server; the default values are used for any servers set up during ExpressConfig. Furthermore, significant local routing information can be set up on the local Gateway; however, this information, if any, should be entered using the Management System. A Call Routing page shows a standard list. In order to add a new Routing Server to the list, enter a name for the Routing Server, provide its hostname or IP address, and click on Add. To remove a configured Routing Server, select it in the list, and click Remove.

Database Access

A Database Access panel (or page) allows one to set up the list of Database Servers to which the Gateway Server being configured will connect. This page is identical to the Call Routing page described above, except that it is Database Servers being set up. In addition, ExpressConfig will create default settings for the database services (user management, CDR collection) based on the servers that you configure. The Database access page is shown below.

Routing Server

The Routing Server has a single unique panel in its configuration, which is the Client Setup panel used to configure the list of clients that will be allowed to connect to and use the services of the Routing Server.

The setup of the Routing Servers client access control list is identical to setting up the management access control list. Gateway Servers listed in the client access control list will be able to connect to the Routing Server, export routes, query for available routes, and receive disseminated routes. The exact permissions of a particular client can be modified on a client-by-client basis using the Management System.

Database Server

There are two panels of information that need to be set up using ExpressConfig for the Database Server. Each of these panels is described below.

Client Setup

Client setup for the Database Server is identical to the setup of the client access list for the Routing Server, described above. Just as with the Routing Server, the Database Server client access list can be manipulated at a later time using the Management System.

Server Login Setup

The Server Login Setup pane is used to provide information that is used to interface with the underlying database containing user records, call records, and so forth. The information provided on this pane is used by the Database Server to establish and maintain the connection to the underlying database.

There are four key pieces of information that are used. The first is the Database Source Name (DSN). One creates an ODBC data source (using Start\Control Panel\ODBC)

with the corresponding name prior to actually running the Database Server. One follows the directions below in the section on Database Table Setup to ensure that the database is setup with the appropriate tables. Although a user does not need to do this prior to running ExpressConfig, it should be done prior to running the Database Server.

When supplying a DSN in order to allow the Database Server to connect to the database, it may also be necessary to specify login credentials (a username and password) that are required to access the database. If a username and password are required, then a user should enter them in the supplied fields. Finally, a user should supply the name of a log file that will be used to record problems in interacting with the underlying database.

Database Table Setup

If a user will be using the Database Server component of the present invention software, it is necessary to ensure that the underlying database is correctly configured prior to starting the Database Server. There are three ways that a database can be configured for operation with the Database Server:

The database tables can be created and configured manually, using the schemas provided in Appendix A. This is not preferred unless a user intends to modify an existing database to fit the schema provided in Appendix A.

If one is running Microsoft Access, a user can use an empty database file that contains all the required tables, with no initial data in them. The database file can be installed as part of the installation of the Database Server or located on a CD in uncompressed form.

If a user is running Microsoft SQL Server, he or she can use a utility installed with the Database Server. This utility will connect to the specified data source, and create the necessary tables. One may use this utility by running setupSQLDB.exe from the directory to which the Database Server was installed, or by running an execution program from a CD.

Additional Setup Issues

This section describes additional setup instructions that should be followed to ensure maximal performance of the present invention in one example implementation.

Screen Savers

Microsoft Windows NT contains a number of screen savers that can be enabled after a certain period of inactivity. However, it should be noted that some of these screen savers can utilize 100% of the available CPU resources, since they perform complex graphical rendering. It is recommended that the screen saver be disabled on machines running the present invention software, or that a simple, non-3D screensaver be selected.

The present invention software runs at elevated priority to handle excessive CPU use by lower priority processes. However, it is still recommended that care be taken not to overload the machine running present invention software with other applications unless the performance of the present invention software on that machine is not critical (e.g. Management System).

Find Fast/Virus Scanners

Microsoft Office by default installs a file indexer, called Find Fast. This allows you to quickly locate Office documents. However, it periodically indexes the entire hard drive, which can degrade the performance of the entire system while it is running. See the above note regarding CPU utilization under screen savers.

The same is true for Virus Scanners, which may be configured to periodically read all files on the hard disk, scanning them for viruses.

Getting Up and Running

This section explains how to get present invention system up and running, once the basic installation and setup described in the previous section has been completed. In this section, one will learn how to start the system, and use the Management and Provisioning systems to interface with the system. One will also learn how to perform operations that are common across different components of the present invention software, such as configuring security and management access control.

This section is divided into the following sections:

Starting the Software—Describes how to run operational components.

Control Panel—Shows how a Control Panel can be used to monitor and interact with the operational components.

Using the Management System—Explains the basic principles necessary to use the Management System to interact with a running operational component.

Service Control and Logging—Shows how to use the Management System to control an operational components service state, and how to view and log events generated by that operational component.

Security Domain Configuration—Explains how to manipulate the security domain settings for an operational component.

Management Access—Describes how management access to a particular operational component can be restricted, so as to prevent unauthorized access and modification.

Licensing—Covers how licensing works, and how license keys can be entered and used with present invention software components.

Using the Provisioning System—Explains the use of the Provisioning System to interact with data managed by the Database Server.

Troubleshooting Service Startup—In the event that a service cannot be started, explains possible causes.

Starting the Software

The first step in using the present invention software is to start it. Once correctly installed, a program group can be found under the Windows NT Start menu containing all present invention software components. From this entry in a start menu, one can choose which components to start.

In order to get started, one will generally need to run at least two components; one operational component, such as the Gateway Server, plus the Management System, which is used to connect to the operational component in order to monitor and administer it.

Once started, the operational component will display a small icon in the system tray. Through this icon, one can perform very simple operations, such as starting and stopping the service provided by the operational component that is running. The small letter in the upper left corner the icon indicates which operational component is being interacted with; G represent the Gateway Server, R the Routing Server, and D the Database Server. Right clicking on the icon will bring up a small popup menu. From this popup menu, one will be able to see the about dialog, which displays program version information. One will also be presented with the ability to start or stop the service, unless the service is already starting or stopping. One can use the Close item to terminate the service completely. Once terminated, a service cannot be interacted with in any way until it is started up again.

Based on the ExpressConfig process that one went through, one should be able to load all of the operational components that one configured, and use the icon in the system tray to start those services. The state of a service is indicated by the color of its icon. Red represents a stopped service; yellow represents a service that is either starting or stopping, and green represents a service that is started. If one chooses to start a service, and the service fails to start, then the color of the icon will return to red. This indicates a configuration error that one will need to correct using the Management System prior to being able to start the service. The last section in this section explains how one can troubleshoot such a condition.

Control Panel

The Control Panel provides a simple means of interacting with locally running operational components, without having to go through the Management System. It is provided for convenience, and has only limited capabilities for interacting with the operational components. It is capable of interacting with all three of the Gateway Server, Routing Server, and Database Server. The Control Panel is started the same way as other present invention components, using Start\Programs\present invention\Control Panel. When started, a simple GUI is provided.

Tabs along the top of the window allow one to select which component one wishes to interface with. Once the desired operational component has been selected, there are several things that one can do:

Run—This button can be used to run the service, if it is not already running.

Connect—This button will connect to the service, assuming that it is running. If the service is not running, then one will not be able to connect successfully. Interacting with a component requires that one first connect to that component.

Start/Stop—Once one is connected, one will have the option to start or stop the service (unless it is starting/stopping already).

In addition to these controls, one will also be provided with diagnostic messages generated by the operational component that one has selected, once one has connected to it. These diagnostic messages are used to indicate information that can be useful in determining whether or not the system is functioning correctly. Underneath the event log window, which displays these diagnostic messages, one will also have several controls that allow one to control the display of these messages. Pressing the 'Clear' button will remove all messages currently displayed in the event log window. Pressing 'Lock Display' will prevent any new messages from being added, until one press 'Unlock Display' (which appears only when the display is locked). This allows one to read a particular set of events in more detail, without worrying that they will be repositioned or disappear because of new events that occur. New events will be collected while the display is locked, but one will be able to scroll up and down through the existing events. Finally, a message level selector allows one to choose what level of events one are interested in. The lower the level selected, the more messages will be displayed At the bottom of the interface, service-specific information will be displayed. The information displayed is service dependent, and is as follows:

Gateway Server—A list of the current sessions is displayed, showing the lines that have active calls, and the services that are active on those lines.

Routing Server—A list of the connected clients (Gateway Servers) is displayed, along with their IP addresses and connect times. This window is useful for determining whether or not a Gateway Server is actually able to connect.

Database Server—A list of the connected clients (either Gateway Serversor Provisioning Systems) is displayed. The IP address and time of connection is displayed. As with the Routing Server, this is useful for determining if Gateway Servers are actually able to connect to the Database Server.

Using the Management System

This section introduces the Management System, used to perform all administrative and management aspects of running an present invention network. The concept of how management is performed was discussed above; in this section, how to apply those concepts in order to actually manage operational components is discussed.

The Management System is a Microsoft Windows NT GUI application used to connect to and administer operational components of the system. It can be started once the present invention software is installed using Start\Programs\present invention\Management System.

Initial Configuration

Once one have started the Management System, one will need to do two things in order to be able to use it to manage your network. Each of these steps is described below.

Security Domain Configuration. Security domains are configured during ExpressConfig for each operational component that one configured. In order for a Management System to connect to an operational component, it must share a common security domain with that operational component. In addition, from a security domain standpoint, it is also necessary that the operational component be able to authenticate the Management System as a valid member of that domain.

In order to configure the identity of the Management System within a security domain, one should select the "Security" item from a "Local Identification" menu. This will bring up the security domain configuration screen. From this screen, one can list the security domains that the Management System is part of.

Clicking on a bullet, "Add," will allow a new security domain to be added. When adding a security domain, the only relevant information is the Domain Name, and the Member Name within that domain. Other fields are not required, although one can provide a description for future reference.

In order to change a domain, it is necessary to first remove the existing domain, and a new domain with the same name. The only reason to do this would be to change the member name of the Management System within that domain. This is not frequently required. Selecting a particular security domain will provide additional information about that security domain.

It is possible to configure multiple security domains on a given Management System. However, each security domain must have a unique name. It is not generally necessary to do this, unless a particular Management System needs to configure operational components located in different security domains.

Remote System List

A Management System is capable of administering numerous remote systems. In order to facilitate this process without needing to enter addressing information for a system each time it is necessary to manage that system, the Management System maintains a remote system list that is permanently stored. The remote system list appears (by default) on the left side of the Management System window, and shows all remote systems that have been entered.

There are several ways to manipulate the remote system list. The first is through the "Remote Systems" menu. When this menu is selected, the following additional items appear:

Add New System: This creates a new system in the remote system list, and needs to be used to add each operational component that will be managed from the Management System. Upon selecting this option, one will be provided with a dialog panel or other GUI input means.

One needs to provide the necessary information in this dialog that pertains to the system being added. The fields required in one example are as follows:

System Name: An identifying name for the system that is being added. This name is for local identification purposes only, and does not have any impact on connecting to and/or managing the remote system being configured. It does not need to match, and is in no way related to, a member name within a security domain. However, it may be easiest to use a nodes security domain member name in this field.

System Type: Indicates the type of node; Gateway Server, Routing Server, or Database Server.

IP Address: IP address of the node that you wish to connect to.

Port Number: UDP/IP port number that the server is running on. You should normally accept the default setting, which is filled in automatically when you select the correct system type.

Description: This field allows you to enter arbitrary text that will help to identify this system. It is not required, but can be used to record information for reference purposes, e.g. "Located in New York, USA".

Once a user clicks on OK, the new remote system will be added, and will appear in the remote system list.

Remove. This command removes the currently selected remote system from the managed system list. One may only select this command if an entry is currently selected in the remote system list.

Connect/Disconnect. This command will establish or terminate a connection to an operational component. One must have a remote system selected in order to perform this command. Once connected, one will be able to administer the operational component.

Properties. This option allows one to configure the settings for an existing remote system, and requires that the remote system is selected in the remote system list.

The second way of performing these commands is by using the mouse, by right clicking in the remote systems list. If one right clicks on a remote system, one will be able to connect/disconnect from it, view its properties, or remove it. If one right clicks an empty area in the remote systems list, one will be given the option to add a new remote system.

Connecting and Administering

Once one has configured at least one entry in the remote systems list, corresponding to the operational component(s) that one wishes to administer, one will need to connect to the operational component. One can do so by issuing the connect command, as described above, or simply by double clicking on the remote system to which one wishes to connect.

Once connected, an additional tree of options will appear beneath the remote system that a user connected to, in the remote system list. This tree will allow a user to navigate between the options that are available to configure. The exact makeup of this tree varies from one type of component to the next, and also depends on the configuration of a particular operational component.

If one has difficulty connecting to the remote system, there are several possible causes. Regardless of the cause, a message box will appear indicating that a connection to the remote system could not be established.

If this dialog appears immediately, then the remote system that you are trying to administer was contacted, but it rejected your attempt to connect to it. This is due to one of two reasons:

A user could not be identified and authenticated by the remote system. A user should check the security domain name, and member name of the Management System, in order to ensure that they are correct. Then, a user should confirm that the remote system that he or she is trying to administer is in the same security domain, and that the security domain on that remote system is capable of authenticating the user. This process is explained in the section below, Security Domain Configuration. As long as a user entered the member name and IP address of the Management System when using ExpressConfig, this should be taken care of.

The Management System was identified and authenticated, however, it had no entry in the management client access list. Configuring the management client access list of an operational node is discussed in the sections below; however, as long as the member name of the Management System was entered during ExpressConfig, it will have an entry in the management access list.

If this dialog takes several seconds to appear, then the remote system could most likely not be contacted. This may be due to an error in the IP address of the remote system, a temporary network failure, or a firewall that is blocking traffic. It may also be caused if the operational component that a user is trying to connect to is not running, or if a user selected the wrong type of system when setting up the remote system entry in the remote system list.

The diagram (e.g., tree view) shows the remote system list after a connection has been established, and the connected node has been expanded. The tree view is navigated in the same way as a tree view presented by Microsoft Windows NT explorer, and numerous other applications. Nodes in the tree can be expanded and collapsed by clicking in the boxes beside them. Nodes with a '+' in the box beside them can be expanded. Nodes with a '−' beside them can be collapsed, or else do not have any nodes beneath them. Double clicking on the label for a node will bring up a window corresponding to that node (the contents depend on which node was selected). Changes to configuration are made using the windows that appear. Future sections describe in detail how to interact with individual components using the Management System.

Service Control and Logging

When one uses the Management System to connect to an operational component, one window will automatically appear. This window is the Service manager window, and is present on all operational components.

Several options are available from this window. Each of these options is discussed below.

Service State Control

First, the service state can be modified by either starting or stopping the service, assuming that the service is not already in the state of starting or stopping. The current service state is also indicated. Clicking on Start/Stop will cause the service to be started or stopped, respectively.

Event logging can also be configured from the Service Manager. Clicking on "Event Log" will bring up the event logging configuration dialog. Event logging allows events to be logged to disk for subsequent review. Event logging incorporates a circular logging feature that allows the amount of disk space consumed by the log to be managed. An event logging configuration dialog allows one to enable or disable the logging of events to disk. Normally, logging events to disk is unnecessary unless one is trying to diagnose a problem. If one enables event logging, he or she will have the following options:

Debug Level. Selects the level of events that will be logged to disk. Any events that are of a lower level than the level selected will not be stored in the log. This can help to only log events of the relevant level to disk, so as to maximize the amount of useful information in the log file.

Maximum File Length. Log files are circular; once a particular log file fills up, the next log file in sequence will be truncated to zero length, and used to store log information until it too is full. The maximum file length parameter is used to control how full a log file is allowed to get before the next log file in the sequence will be used.

Log File List. This list provides the names of the log files that will bemused to record events. These log files will be used in a circular pattern, using the process described above. One can use the Add/Remove buttons to add or remove log files from the list, or can set the current log file (i.e. the log file into which the next event will be placed) by clicking on the Set Current button. Normally, the default log filenames will be sufficient.

Clicking OK will make changes to logging configuration permanent; pressing Cancel will abort any changes that one made.

Finally, the Service Manager window provides a means to monitor events that occur on a particular operational component. Any events that occur on the operational component that is currently connected to will be displayed in the window. However, events may be filtered by priority level. The default debug level can be used to control what level of events will be displayed. It is not normally necessary to view debug events, and since each message consumes bandwidth, it is generally sufficient to leave the debug level on the default setting of only displaying warning-level events or higher. The Advanced button allows one to configure event display levels on a type-by-type basis, and is only required for advanced diagnostics. Finally, two buttons are provided in order to clear and lock/unlock the display.

Security Domain Configuration

One of the concepts explained herein is that of security domains. The concept of a security domain is central to understanding how identification and authentication operate in an present invention network.

Nodes in an present invention network need to be in a common security domain in order to exchange services. In order for two nodes in the same security domain to be able to authenticate each other, they need to have authentication information that allows them to authenticate each other. There are many possible forms that could be used for the exchange of authentication, such as a password. The present invention software is constructed so as to support a variety of methods for identification and authentication. However, at this time, only a single model for authentication, based on member lists, is supported.

Note: Security domain names, and member names within a security domain, are case sensitive. It is imperative that attention be paid to case when entering security domain names and member names.

From the Management System, a top level node in the tree of the Gateway server, Routing Server, and Database Server is the "Security and Identification" node. Double clicking this node will bring up the Security and Identification page. From this page, one can configure the security domains that are configured on the operational component that is being managed. This can be shown in a diagram. An explanation of other information in the diagram follows.

Memberlist Domains

In a memberlist domain, authentication checking is performed by way of a static list of members, and corresponding IP addressing information. When a node providing some service receives a new connection requesting access to that service, it will check the identity of the requesting node, and determine if the IP address of the requesting node matches the corresponding entry in the database. If there is a match, then the identity of the requesting node will be accepted. Otherwise, the identity will be rejected, and the connection will progress as if the requesting node had no identity. (Normally, this would result in a denial of access to the resource).

In the diagram above, it can be seen that a security domain can be expanded, by clicking on the '+' next to the name of the domain. Expanding the domain causes the members of the domain to be shown. The "Add Member" and "Remove" buttons can be used to add and remove members from the member list. Clicking on "Properties" allows the settings for a member of the domain to be configured. When a new member is added, or an existing member is edited, a dialog will appear.

In the dialog, three settings can be configured for a member of a security domain. The first is the name of the member. When a request is received from a remote node, it will present its name. The name that is configured in this dialog must match the name presented by the remote system when it connects. The second piece of information required is the privilege class to be assigned to the remote system. Privilege classes are not currently used by existing components in the software, so using the default value of zero suffices. The third field is a description of the node. This is purely for informational and reference purposes, and does not affect the functioning of the software in any way. Once these basic settings have been completed, an "Addresses" panel allows the IP address authentication information to be configured.

In the Addresses panel, a user can configure a list of IP addresses from which the named member of the domain will be allowed to connect. If the IP address from which the member connects is not within one of the ranges specified if the list, then the identity of the connecting member will be rejected. The list of addresses is manipulated in the usual fashion. Each entry in the list has three pieces of information:

(1) The IP address from which the member is allowed to connect;
(2) The netmask controlling which IP addresses can be connected from. For example, if the IP address field is 192.168.1.33 and the netmask is 255.255.255.0, then connections will be accepted from 192.168.1.0 through 192.168.1.255;
(3) The port number from which the member is allowed to connect. The default value of zero allows a connection from any port, and should be used unless it is necessary to override this setting.

Note that multiple address ranges may be configured. It is only necessary for a connecting member to match one of these address ranges in order to be accepted. Thus, if the same name is assigned for convenience to two Management System nodes, one IP address entry could be entered for each node, allowing them both to identify themselves as the authorized Management system.

Note: It is possible to enter a '*' (asterisk) for the name of a domain member. If such a wildcard entry exists, and no other entries in the list matches the member name presented by a connecting node, then if the addressing information for the wildcard entry matches that of the connecting node, the identity of the remote node will be accepted as valid. For example, configuring an entry with a name '*', and an IP address 192.168.1.0 netmask 255.255.255.0 would allow all nodes from 192.168.1.0 through 192.168.1.255 to connect, and their identities to be accepted no matter what is presented.

Management Access

In addition to configuring the identification and authentication information on a particular operational component, to have administration by a remote node, access should be granted to the services provided by that operational component. This section describes how to configure access to the Management 'server' built into each operational component.

All operational components have a root level node in their configuration trees titled "Management Access." Double clicking on this node will bring up a Management Access dialog. This dialog presents the list of nodes that currently have management access. For each entry in the list, the name of the entry, description of the entry, identification corresponding to the entry, and current status of the entry are shown. The status simply shows whether or not management is current enabled for that entry. Entries in the list are called "clients"—in effect, they are "clients" of the internal management "server" of each operational component. In reality, these clients are the Management Systems that are authorized to connect.

When a new entry is added to the management access list, or an existing entry is modified, another dialog will be displayed. This dialog allows properties to be set up for an entry in the management access list. In this dialog, it is possible to configure several things. The first is the name of the access entry. This name is for informational and logging purposes, but must be unique. The second is a description of this entry, which is also for informational purposes only. A flag allows an entry to be temporarily disabled. If this flag is set, then Management Systems with an identification matched by this access entry will not be allowed to manipulate the Management System.

In addition to the basic information described above, a list of identities that is accepted for this management access entry can be configured. The purpose of this list is to specify those nodes that are able to access the Management System using this access entry. This list enables multiple distinct remote identities to share a single client configuration. The purpose of this is mainly for future expansion. For example, if a management access entry was extended to support the configuration of exactly which screens could be accessed, it would be tedious to duplicate this configuration for each Management System that needed to be configured. Therefore, allowing multiple identities allows the access entry to be shared amongst multiple Management Systems.

When new identities are added, or existing identities are modified, a security identification dialog pops up, allowing a user to enter the identity being added or modified.

The type allows a user to select whether the identity being configured is a remote node or a security group. Security groups are not presently accessible directly by the user, so foreign entity should generally be selected. IN addition, a user should specify the domain name and member name which comprise the identity of the connecting node. The domain name may be selected from one of the security domains that is configured on the operational component that the Management System is connected to, and the member name should match the name of a member that can be authenticated using the authentication information discussed in the previous section. In addition, it is possible to wildcard the member name by entering a single asterisk ('*'), which allows any valid member of the domain to be recognized under this access entry. Lastly, a minimum privilege level can be configured, in which case, the requesting node must have this level of privilege, or higher, in order to be granted access. Privilege levels are configured for each domain member when setting up a security domain.

Licensing

The software licensing model used by present invention components has been described hereinabove. This present section provides further details on how to setup software license keys, and elaborates on standalone and client/server modes of operation so that it is possible to select the correct choice for a given configuration. Each of the two licensing models, and how to configure the software for operation under either of those two models, is given below. In one example, only the Gateway Server requires license keys to be entered. However, the process for managing licenses is common to all present invention software components that require licensing, and in alternative embodiments of the invention, can apply in different licensing models.

Regardless of the mode of operation selected for licenses, an operational component that uses licensing can have a top-level management tree node named "Licensing." Double-clicking on this node will bring up a License Manager dialog.

There are several common pieces of information that are used regardless of the licensing mode actually in use. The ExpressConfig program normally fills in these fields, but it may be possible to change these fields at some point. Any changes to the configuration of the License Manager can only be performed by clicking "Change Settings", and making changes using the dialog that appears. The common settings are as follows:

Mode. This allows the License Manager to be changed in terms of its mode of operation. A user should select the value for this parameter first, since certain parameters cannot be edited unless a user is in a particular licensing mode.

Customer ID. A user must enter the customer ID assigned to his or her organization in this field. Each license key issued is keyed to a customer ID. This information is normally printed on a software license certificate, issued when a user purchased the software.

Product ID. The product ID is a serial number which identifies the product. Each license key issued is keyed to a Product ID, and will only work with this product ID. Like the customer ID, the product ID is printed on a software license certificate.

The remaining settings are determined by the licensing mode that a user selects. Each of the available licensing modes is discussed in the following subsections.

Standalone Mode

In standalone mode, all licensing on a particular node in the system is performed independently of all other nodes. All license information required by that node is held locally. In standalone mode, each node should have its own hardware dongle in order to decrypt license keys.

License keys can be added and removed from the main License Manager window. This option is provided once standalone has been selected as the mode of operation. A user should select standalone operation, and then accept the changes prior to being allowed to enter license keys. Two simple buttons, Add and Remove, allow a user to add and remove license keys. When a user clicks "Add" and enters a license key, the license key will be verified, and it will either be accepted or denied. If it is accepted, it will appear in a License Manager window, and information associated with that license key will be display. If, however, it is denied, it will not be recorded. If a license key is repeatedly denied, then a user should check the following:

Ensure that the license key is typed in exactly as issued. There are no brackets, apostrophes, or quotation marks in the license keys themselves, so if a license key is provided within such delimiters, a user should not type them in when entering the license key. For example, if an E-mail reads:

Your license key is "ABCDEFG1234567"
then it should be entered as ABCDEFG1234567, without the quotation marks.

Case is significant when dealing with license keys. Therefore, ABCDEFG1234567 should not be typed in as abcdefg1234567.

Ensure that the customer ID that a user has entered is correct, and matches the customer ID on the license certificate or otherwise issued to the user (the customer ID may not always be printed on the certificate depending on the restrictions on the key, but can generally be found there).

Ensure that the product ID that a user has entered is correct, and matches the product ID on the license certificate or otherwise issued to the user. (As above, the product ID may not always be printed on the certificate).

If a hardware dongle is used (hardware dongles are generally used; time-limited, demonstration keys may not use a hardware dongle), one must ensure that the dongle is correctly connected to the computer, and that it is connected to the correct kind of port on the computer.

If using a limited license restricted to a particular IP address, ensure that the IP address of the machine that a user is installing on matches the IP address used to issue the license key.

License keys are time limited, and may have expired. Ensure that the system time and date are accurately set, and that the license key being entered is presently valid.

Client/Server Mode

In client mode, a centralized license server determines the licenses available to a particular operational component (a client of the license server). This mode of licensing is suitable in environments where a number of operational components are owned and operated by a single organization. It reduces the necessary administration since licenses can be acquired for multiple operational components and centrally configured, rather than needing to enter license keys on each individual node. However, license keys issued for use by a license server can only be used by a license server, and thus, any operational node that no longer operates with the license server will be unlicensed, and unable to provide services. For example, an organization deploying numerous Gateway Servers in different areas would benefit from the use of a license server. However, if those Gateway Servers were independently owned and operated, the Gateway Server owners may not want to use a license server. This is since their licenses would effectively be pooled, and would not be separable should a Gateway Server owner decide to leave the association.

Operation in client/server mode requires the presence of at least one centralized license server. In addition, it is possible to configure a backup server, so that if the primary server becomes temporarily inoperable, due to hardware or software failure, the nodes in the network continue to operate. Setting up the license server is discussed in further detail below. This section deals exclusively with configuring the License Manager, and assumes that a primary license server (and a secondary license server, if required) already exists and is running.

Once the licensing mode is changed to Client/Server Mode, a number of fields must be filled in. These fields are the primary IP address, secondary IP address, primary port number, and secondary port number. The primary IP address and primary port number are mandatory, and must be filled in with the IP address and port number of the primary license server. (The port number of the license server should be left as the default, 6797, unless a user is specifically running the license server on a different port number). The secondary IP address and port are optional, and should be filled in with the IP address and port number of the secondary license server if available, and 0.0.0.0 port 6797 otherwise.

Using the Provisioning System

The Provisioning System, described above, is used specifically for the management of data in the database servers. This section introduces the provisioning system, and provides basic information on how to use the provisioning system. The functionality offered by the Provisioning System, and how to use this functionality; is described further below, when User Management and CDR Collection via the Database Server is discussed in detail.

The Provisioning System is started in a similar way to the Management System, using Start (Programs(present invention(Provisioning System. Before the Provisioning System starts, it will require the selection of what type of records will be modified. When starting the provisioning system for the first time, simply select "User Records."

The first step in configuring the Provisioning System to connect to a Database Server is to configure its identification information. This process is similar to the process used when setting up the Management System. To access the identification configuration of the Provisioning System, select "Security" from the "Connection" menu. A user will be presented with a security domain configuration dialog identical to the one presented by the Management System. Use this dialog to enter information about a user's security domain in the same way as for the Management System.

Once a user has configured the security domain settings for the Provisioning System, the next task is to configure the list of Database Servers with which the Provisioning System interfaces. The list of servers is available by selecting "List of Remote Servers Available" on the "Connection" menu.

Database Servers can be added and removed from the list of available servers, using the Add and Remove button. The IP address and port number is required for any Database Server that a user wishes to add. A user may also change the IP address and port number for Database Servers that have already been configured. Also, one needs to ensure that the identity of the Provisioning System is in the client list on the Database Server, or it will not be allowed to connect.

With the Provisioning System, one of the Database Servers available should be designated as the active server. The active server will be used to process all requests made through the Provisioning System. If a user changes the active server, he or she should close any active session, and open a new session in order to perform operations. Unlike the Management Systems, the service should be started on the Database Server before the Provisioning System will be able to connect.

Once a Database Server list and active Database Server have been configured, a user should be able to use the Provisioning System to interact with data in the database. By selecting "New Session" from the file menu, and selecting the kind of session that one wishes to create, one can establish a connection to the Database Server, and can issue requests and manipulate data. How to use the Provisioning System to do so depends, however, on the type of session and the operations that are being performed. Performing these operations are described in detail in later sections.

Troubleshooting Service Startup

This section provides summary information about the possible causes that can prevent a service from starting correctly. First, it is necessary to differentiate between not running, and not starting. If an operational component cannot run, then it will fail to load, and no icon will be displayed in the system tray. Possible causes for failing to run are:

Insufficient access to configuration information (caused by user account being used to run the program);

DLLs or other files installed with the software have been removed, or relocated;

Another instance of the operational component is already running on the same machine.

Once a service is running, there are very few things that could possible prevent it from starting. Failing to start is characterized by a red icon appearing in the system tray, and turning yellow while it is attempted to start the service, but returning to the red (stopped) state without turning green. The causes for a failure to start the service depend on the type of service.

Gateway Service

There are no known reasons why the Gateway Service would fail to start. Even if hardware devices fail to initialize, the Gateway Service should initialize nonetheless.

Routing Service

The Routing Service should start successfully in all cases. There are no known causes that can prevent the routing service from starting successfully.

Database Service

The Database Service may fail to start in the event that a connection to an ODBC database cannot be established. If this is the case, then the Management System should be used to correct the ODBC connection information and the service startup should be retried.

Part II—Operation

Gateway Server Capabilities

This section provides an introduction to the Gateway Server, a component in an present invention network. In one example, the Gateway Server is the largest and most complex component of the present invention software, and is the component which brings together the functionality offers by various components of the system, and actually makes that functionality available to the end users of the system.

The material in this section is divided into several sections. A brief description of these sections is as follows.

Hardware Support. The present invention Gateway Server is designed to interact with a variety of underlying hardware, in order to support a diverse range of technology for interconnection to traditional telecommunications networks. Because of this, configuring hardware support in the software can be complex, and is explained in detail in this section. Normally, this process is not necessary, but information is provided for reference purposes.

Lines and Line Groups. Each line connecting the Gateway Server to the telecommunications network, as well as lines connecting the Gateway Server to other Gateway Servers, need to be configured. In addition, to simplify administration, lines are grouped into line groups, which allow certain properties to be configured on a number of lines. This section explains lines and line groups, and how to perform configuration operations on them.

Services. At the heart of the Gateway Server is the services that it provides to the end users. The Gateway Server has an extremely flexible architecture that allows services to be seamlessly integrated with the system, added and removed, and routed between. An API even allows the development of custom applications that operate with the Gateway Server. This section describes how services work, and how to configure services for use.

Call Rating. The Gateway Server has the capability to debit for calls, explained in more detail in the services section. However, in order to charge for calls, the Gateway Server requires call rating information to be supplied, which govern how much calls cost. This section explains the call rating process, and how to configure call rates.

Voice Prompt Management. The Gateway Server features customizable voice prompts, with support for multiple languages. This section explains how to set up and customize voice prompts for use with the system, and provides some additional detail on how voice prompts can be administered.

Some of the capabilities that the Gateway Server is capable of providing require in the interaction of the Routing Server and/or Database Server. The use of these components to enhance the services that the Gateway Server provides is described in later sections.

Hardware Support

This section describes how the Gateway Server supports hardware devices, and how to configure the hardware support component of the Gateway server.

In order to connect a Gateway Server to a traditional telecommunications network, specialized hardware boards must be used. The Gateway Server supports a range of such boards, each offering different numbers of lines, and types of lines. In addition to these telephony boards, the Gateway Server is also capable of making use of DSP processing boards that enable larger numbers of calls to be handled by a single Gateway Server. The hardware support component of the Gateway Server is responsible for interfacing with the installed hardware devices, and on enabling those devices to co-operate in providing IP Telephony services. In addition to supporting telephony devices, the Gateway Server extends the concept to network devices, used for interconnection to IP Telephony devices via an IP network. In one example, the only physical device installed in the Gateway Server for this interconnection is an Ethernet card.

In addition to supporting a variety of types of hardware devices, the Gateway Server can also support multiple devices of a single type. For example, it is possible to use two Dialogic D/41ESCs, each of which is a 4 line telephony boards, to achieve 8 lines of capacity.

A hardware device configuration window can be accessed by double clicking on Hardware Devices, a top-level management tree node on the Gateway Server. This window will display a list of devices that is currently configured, and the current status of those devices.

From this window, individual hardware devices can be started or stopped. By default, when the gateway service is started, all hardware devices will be started, and when the gateway service is stopped, all hardware devices will be stopped. Add and Remove buttons can be used to add and remove hardware devices, and the Properties button can be used to configure existing hardware devices. When a hardware device is added, or its properties are configured, a type-specific dialog will appear that allows a user to configure information for that specific hardware device.

The subsections below discuss each hardware device supported by the system. When one chooses to add a hardware device, he or she will be prompted to select what kind of hardware device is being added from one of the following devices. Some devices allow multiple instances to be present. Because of this, devices are identified by the combination of their type, and an instance number assigned to the device when it is added. Prior to discussing each individual board, however, general information regarding Gatenet 3 vs. DSP modes of operation are provided.

Gatenet 3 vs. DSP Compression

The Gateway Server uses complex signal processing algorithms in order to minimize the bandwidth required for communication between Gateways, while simultaneously preserving a high quality of voice. There are two ways that the required signal processing can be performed:

(1) Echo cancellation, the first step in processing voice data, is performed on the hardware device that is connected to the telephone equipment. However, the CPU of the machine used to run the Gateway Server is used to apply compression algorithms to the voice data. The compression algorithms are by far more complex and CPU-intensive than echo cancellation. This configuration, known as a Gatenet 3 configuration, allows the use of a single (or multiple) telephony interface boards without a requirement for a specialized DSP processing board. The drawback to this approach is that there is a limit to the number of simultaneous calls that can be handled by a main CPU of certain types of computer that run the Gateway Server. A second drawback is that some devices are reduced in terms of the number of lines they can support when echo cancellation is performed onboard. In some cases, not intended to limit the invention, only certain boards can be operated in Gatenet 3 mode;

(2) Likewise, echo cancellation and voice compression are performed on a specialized DSP board that is connected in hardware to the telephony interface board. This provides better performance and scalability, but incurs the cost of the specialized DSP board.

The Gateway Server software is capable of supporting either mode. However, since the hardware configuration depends on which mode is selected, the mode of operation is normally predetermined.

Dialogic D/21H

The Dialogic D/21H operates only in Gatenet 3 mode, but is completely compatible with the Dialogic D/41ESC when operated in this mode. Please see the section below on the Dialogic D/41ESC for details on how to configure a Dialogic D/21H.

Dialogic D/41ESC

The Dialogic D/41ESC is a four port, analog loop start interface board. It allows a connection to a central office using standard analog telephone lines, as well as interconnection with PBXs or other equipment that provide FXO (also called IST) ports.

The Dialogic D/41ESC is capable of operating either in Gatenet 3 mode, or in DSP mode. When operating in Gatenet 3 mode, it is only capable of providing two ports of connectivity to telephone equipment; otherwise, all four ports can be used. Also, a D/21H functioning in Gatenet 3 mode is identical to a D/41ESC, and can be set up and treated in exactly the same manner.

D/41ESC General Panel

The first panel displayed is a General panel. Other panels can be selected by clicking on the tabs at appear along the top of the dialog. The settings on the General panel are explained below.

Board Number. This is the Dialogic board number of Dialogic D/41ESC being configured, and controls which board (if more than one D/41ESC is present) will be used. Normally, the first D/41ESC device added should be assigned board number 1, the second 2, and so forth. However, if some boards in the chassis should not be used, or are used by other applications, this parameter allows explicit specification of which Dialogic board number to open.

Enable GN3/EC Mode. This parameter is used to enable or disable operation in Gatenet 3 mode. See the section on Gatenet 3 vs. DSP compression above to determine how this parameter should be configured.

Number of rings before answering This controls how many times an inbound call will ring before the Gateway Server answers the call.

Enable Trunk Channels. This group of buttons allows a user to select specifically which trunk channels will be opened on the D/41ESC. Note that if one enables Gatenet 3 mode, one cannot enable trunk channels 3 and 4. Normally, one should enable all channels unless using other channels of a particular Dialogic board with a different application.

Enable Voice Channels. This group of buttons is the same as the trunk buttons, but control which voice channels are used. Under most circumstances, one uses the same settings for voice channels and trunk channels.

Output Gain. This setting allows one to control the output gain. If the volume of voice prompts and speech are too low when making calls, then adjusting this option allows the gain to be adjusted. However, before using this parameter, one should verify that other Dialogic options are set correctly, since gain can be applied in several different locations. Also, if one uses a separate DSP board for processing, this setting will have no effect since the DSP board will apply gain, not the D/41ESC.

D/41ESC Call Analysis Panel

A Call Analysis panel is used to configure how the D/41ESC detects the presence of a connection. The parameters on the call analysis panel are passed directly to the corresponding Dialogic modules that make use of these parameters. For a detailed discussion of how the Dialogic D/41ESC performs call analysis, refer to the Dialogic documentation. The two most relevant parameters on this page are Enable Voice Detection, and Enable Loop Current Signaling. Voice detection should always be enabled, except in specialized environments. Voice detection allows the beginning of a call to be determined based on the recognition of speech patterns, such as "Hello". Loop current signaling allows loop current based answer supervision provided by the telephone network to be interpreted, and should only be enabled if supported by the telephone network provider.

D/41ESC Ring/Dialtone Settings Panel

The D/41ESC can be configured to wait for a dial tone before it enters digits. It can also be configured to wait a maximum number of rings on an outbound call before it gives up, and assumes that the call will not be answered. This panel allows one to configure settings that affect this process.

Ring Settings. Time for Outbound Call Pickup. This parameter controls how long the Dialogic D/41ESC will wait for an outbound call to be picked up before it abandons the call.

Dial Tone Settings: Minimum Dial Tone Length. This parameter controls the minimum length of a dial tone before it will be recognized.

Dial Tone Settings: Timeout for Dial Tone. This parameter controls how long the Dialogic D/41ESC will wait for a valid dial tone before it abandons the call due to no dial tone.

Dial Tone Settings: Maximum Dial Tone Interruption. This parameter controls the maximum break in a dial tone that will be tolerated without considering a particular tone not to be a valid dial tone.

D/41ESC Tone Definition Panel

During Call Progress Analysis, and also for hang-up detection, the D/41ESC uses cadence detection to determine when a line is ringing, when a user answers, when the line is busy, and so forth. However, many of these tones may not be common from one country to another. As a result, it is possible to customize the tones that are used by the Dialogic D/41ESC in order to determine whether or not particular events are happening.

By selecting one of the tones listed, and clicking on Edit, one is able to modify the frequencies and timings that control how a particular tone is detected. One should determine the information that defines the tones that are used on the particular equipment that one is connecting to the Gateway Server. When editing each tone, a dialog is displayed:

One should supply the information in the dialog. The parameters are fairly self-explanatory. By default, dual frequency cadence tones will be detected. If one wishes to detect a single frequency tone, then set the second frequency to zero. To detect a continuous tone, not a cadence tone, one should set the repeat count to zero.

The two most important tones in most cases are the hang-up cadence tones. Hang-up cadence tones are tone definitions that can trigger the automatic disconnection of a call. In some environments, disconnection signaling is only performed by way of cadence tones. In this case, it is necessary to enter the appropriate tone information under either the primary or alternate hang-up cadence. It is also necessary to enable disconnection upon detecting this tone at the line level.

Dialogic D/160SC-LS

The Dialogic D/160SC-LS is very similar to the D/41ESC, but with two notable exceptions:

It has 16 analog loop start interfaces instead of 4;

It cannot operate in Gatenet 3 mode.

This board is suitable for customers who require a large number of analog lines connected to a telephone device. The configuration panels for the D/160SC-LS are identical to those for the D/41 ESC, except for a general panel, which provides a larger number of ports that may be enabled or disabled.

For all other panels, refer to the information provided for the D/41ESC above.

Dialogic D/240SC-T1 (Robbed Bit T-1)

The Dialogic D/240SC-T1 is a T-1 interface board that provides 24 channels of digital connectivity to a telephone device with a T-1 interface. Although the Dialogic D/240SC-T1 is capable of operating either in ISDN PRI mode, or in robbed bit mode, the Dialogic D/240SC-T1 device in the Gateway Server refers only to the D/240SC-T1 operating in robbed bit mode. If a user is operating the D/240SC-T1 in ISDN PRI mode, one should add a Dialogic ISDN device, described below.

Much of the configuration of the D/240SC-T1 is identical to the configuration for the D/41 ESC. All of the T-1 specific configuration is contained on a general panel.

The configuration fields on this page are as follows:

DTI Board Number. A D/240SC-T1, like a D/41ESC, provides both T-1 trunk and voice resources. However, there are separate logical board numbers for the trunk and voice boards. This parameter allows one to control which DTI board number will be opened for this device.

Voice Board Number. As explained above, the Dialogic voice board number for a D/240SC-T1 is opened separately from the T-1 trunk. The D/240SC-T1 actually emulates 6 independent voice boards. Thus, for D/240SC-T1 #1, the voice board number starts at 1. For D/240SC-T1 #2, the voice board number starts at 7. Normally, one will not need to customize settings made by ExpressConfig; however, for integration or sharing with other applications, this option is provided.

T-1 Signaling Bits. With T-1 robbed bit protocols, information is signaled between the telephone equipment and the Gateway Server using two bits, known as the A and B bits. Different patterns for these bits represent different information. Most telephone equipment uses the default settings for the T-1 signaling bits. However, the interpretation of bits received from the telephone equipment, and the bits that will be sent to the telephone equipment, can be customized in this page.

T-1 Network Mode. This mode controls how the T-1 signaling bits, defined above, will be used. It controls the relative timing and sequence of the bit patterns. One should select the option that corresponds to your telephone equipment.

Dialogic ISDN

The Dialogic ISDN device provides support for both T-1 ISDN PRI systems and E-1 SDN PRI systems. If one has configured either a D/240SC-T1 or a D/300SC-E1 in ISDN PRI mode, then one should install a Dialogic ISDN device. One Dialogic ISDN device is required for each ISDN span (23 lines for T-1, 30 lines for E-1) that one has configured in a system.

The configuration of the Dialogic ISDN device is significantly simpler and more understandable than dealing with the cadence tones and settings for some of the other Dialogic devices. This is because with ISDN, signaling is explicit, out of band, and relatively constant between different environments. There are three panels that a user deals with when configuring a Dialogic ISDN device.

General Panel

A general panel allows general settings to be configured on the D/240SC-T1. These settings are explained below.

DTI Board number/ Voice Board Number. These parameters are identical to the settings explained for the D/240SC-T1. Refer to that section above for an explanation of these parameters.

Board Type. This parameter controls whether the ISDN device in use is a D/240SC-T1 or a D/300SC-E1. You should select the parameter corresponding to the board that is installed in your system.

Output Gain. Dialogic ISDN devices are almost always used with a DSP voice board, so the output gain parameter should not normally be used unless one is involved in a very specialized application.

Channel Configuration Panel

A channel configuration panel simply allows one to select which channels will be used on the Dialogic ISDN device. In almost all cases, one should disable all voice channels, since the voice channels are not used. Although enabling the voice channels does not interfere with the Gateway Server, some ISDN protocols require enough DSP processing power that the voice channels cannot be enabled successfully. In most cases, one should enable all of the trunk channels.

Call Setup Parameters Panel

Unlike conventional telephone devices, which signal calls using the hooks witch state and DTMF tones, ISDN devices signal calls in a single digital message. The contents of this message do vary between ISDN switches, however. A Call Setup panel, shown below, allows the correct message for a particular ISDN switch to be sent.

The parameters in this panel are as follows:

Destination Number Type. Indicates the type of number being transmitted to the ISDN switch. This field needs to match the type required by the ISDN switch one is connected to.

Destination Number Plan. Indicates the numbering plan used for the destination number transmitted to the ISDN switch. This field needs to match the numbering plan required by the ISDN switch being connected to.

Connection Timeout. This controls how long the Gateway Server will wait for the completion of a particular call. If the call is not completed within this amount of time, it will be aborted.

Originating Number Type. Same as the destination number type, but for the originating number (i.e. the number of the Gateway Server).

Originating Number Plan. Same as the destination number plan, but for the originating number.

Originating Number. Number sent to the ISDN switch as the number of the party originating the call. Normally, when connected to the PSTN, this parameter will be ignored, since the PSTN switch knows the identity of the originator.

Layer 1 Protocol. Controls the value of the Layer 1 Protocol parameter in the call setup message. This should normally be left at the default value, but some specific ISDN switches may require this value to be overridden.

Dialogic MSI/SC

The Dialogic MSI/SC boards are analog station interface boards. The MSI/SC allows telephones, or other equipment that normally plugs into a standard analog line from the PSTN, to be connected directly to a Gateway server. In essence, the MSI/SC emulates a line from the PSTN, and can be used to connect to PBX trunks in addition to standard telephones. This kind of interface is also known as an FXS interface, or station side interface.

There are two variants of Dialogic MSI/SC boards, those with the ringing option and those without. In order to use the Dialogic MSI/SC with the Gateway server, the ringing option is used in order to make outbound calls.

In addition, there are three configurations of an MSI/SC; an 8 line, 16 line, and 24 line configuration. These are referred to as the MSI/80SC-R, MSI/160SC-R, and MSI/240SC-R, where the -R denotes the ringing option. A user needs to know which of these configurations he or she has prior to configuring the MSI/SC for use with the Gateway Server.

Only one panel is configured for an MSI/SC board. The fields in the panel are explained below.

Board Number. This controls which Dialogic MSI board number will be opened.

Board Type. Indicates the type of board; either the MSI/80SC-R, MSI/160SC-R, or MSI/240SC-R.

Ring Line For Outbound Calls. Indicates whether or not the ringing option is present on the MSI/SC board. This option is used in order to make outbound calls.

Unanswered Rings before Aborting. When ringing a particular line, the MSI/SC will generate a certain number of rings before the call is aborted. This parameter allows the number of rings that will be generated before an abort to be configured.

Output Gain. This parameter allows the gain of the lines connected to the MSI/SC to be controlled. This can be used to adjust the volume of the phones connected to the MSI/SC.

ANI Information. ANI, or Caller ID information, can be used by Gateway server applications in order to identify a user without asking for identification. Since the lines connected to the MSI/SC may be fixed (i.e. line #3 is always connected to the phone of a particular user), Caller ID information can be associated with each port of the MSI/SC. One can use this control to enter Caller ID information for each MSI/SC line.

Mibridge DSP

As discussed in a section above, the Gateway Server supports the use of specialized DSP processing boards to achieve high density and consistent call quality. Although boards from different manufacturers are supported, the firmware used on the boards is licensed from Mibridge, Inc. in all cases. The Mibridge DSP device in the Gateway Server refers to any of the DSP boards supported by the Mibridge firmware, and any quantity of those devices. A user should install only one Mibridge DSP device, even if he or she has multiple DSP boards.

There are two simple panels that should be configured for the Mibridge DSP device. The Board Type panel has only one option, allowing the type of board to be selected. One should select the board type that corresponds to the actual hardware present in the Gateway Server. A voice channel configuration panel, shown below, allows addition options to be configured. The options are explained below.

SCbus PCM Encoding. Depending on the Dialogic devices being used with the Mibridge DSP board, the PCM encoding on the SC bus used to connect the Dialogic and DSP boards may be different. If one is using any board except for the D/300SC-E1, mu-Law encoding is normally used. If, however, one is using the D/300SC-E1, one should select A-Law encoding.

Automatic Gain Control. In certain environments, it is beneficial to enable automatic gain control to compensate for naturally low input levels. This is controlled via the Automatic Gain Control setting. In most environments, however, Automatic Gain Control should be disabled.

Fixed Input/Output Gain. If automatic gain control is not enabled, then a fixed level of gain can be configured. In most environments, the default gain of 0db should be used. However, the level of gain can be customized if the default setting is not sufficient.

Network H.323

The Network H.323 device enables communication using the H.323 protocol. This allows calls to be received from and placed to Microsoft NetMeeting terminals, or other H.323 compatible devices. The only required configuration parameter for the Network H.323 device is the H.323 terminal name that will identify the Gateway Server to the remote H.323 entities with which it communicates.

Network Proprietary

The Network Proprietary device enables communication with other present invention Gateway Servers using a proprietary protocol. This is the normal protocol used for Gateway to Gateway communication. There are two main configuration parameters for the Network Proprietary device. The first is the port range, which controls which UDP/IP ports will be used for media data transmitted to and from this Gateway Server. The second is the Local System ID of the Gateway Server. This name will be presented to remote Gateway Servers when a call is placed, and may be used by the remote Gateway Server in order to identify and authenticate the originating Gateway Server. More details on this process are discussed in the User Management section.

The "Network Settings" tab allows advanced network properties to be configured and tuned. These settings, as well as a detailed explanation of the port range feature, are found in Appendix B, which provides technical network design information.

Lines and Line Groups

The hardware support component of the Gateway Server, discussed in the previous section, provides support for hardware devices that are located in the PC on which the Gateway Server runs. However, providing actual functionality to the end user involves co-operation between different boards. Furthermore, lines on different boards may often need to be treated the same way, and pooled together. The line and line group component of the Gateway Server organizes the capabilities provided by underlying hardware devices into virtual "lines", and allows these lines to be grouped together into line groups. This section explains lines and line groups.

Lines

Lines represent a single logical point of connection to the system. A line is capable of handling a single call from a user, and represents one complete port of connectivity. There are two kinds of lines; telephony lines, which are directly related to the telephone lines actually connected to the Gateway Server, and network lines, which are created on demand and used to represent connections to other Gateway Servers or to users on the H.323 network.

Since network lines are created on demand, it is not necessary to interact with network lines in most cases. However, telephony lines are created in advance, and must be created in order for the Gateway Server to make use of the underlying hardware devices. Telephony lines serve primarily to combine resources supplied by underlying hardware devices in order to deliver the required services to the user. For example, a DSP device is not capable of actually connecting to the PSTN, but it is capable of performing IVR. On the other hand, a telephony board may not be capable of performing IVR, but can manage the connection to a user. Telephone lines group these resources together to form a single virtual line that can be used to deliver the services provided by the Gateway Server.

The actual configuration of a telephony line can be quite complex, and is in general not necessary since ExpressConfig will set up suitable default parameters. The configuration of telephony lines is discussed below when the telephony line group is discussed in detail.

Lines are either in the active state, the inactive state, or switching between the two states. Network lines are always in the active state, since they are deleted once they are no longer active. Lines can be activated or deactivated at any time. When the gateway service starts, all lines will automatically be activated. When the gateway service stops, all lines will be automatically deactivated.

Line Groups

For the purposes of call routing, as well as configuration of parameters, lines are always organized into groups of lines, called line groups. Line groups manage properties that generally do not need to be configured on individual lines. Also, the service level of the Gateway Server may associate application-specific properties with line groups that affect how services are provided to the user. For example, the service layer could be configured to handle all calls coming in on a particular line group by routing the call to a specific number, whereas calls to another line group would be handled using an IVR application.

As with lines, there are two kinds of line groups; telephony line groups,and network line groups. Telephony line groups contain numbers of telephony lines. Network line groups contain network lines, and handle the dynamic adding and removal of network lines as calls are established and terminated. The configuration of these two types of line groups differs; each will be discussed in a separate section below.

Using the Management System, a Line Groups window can be displayed by expanding the top level configuration tree node named "Line Groups". In the top part of the window, a line group may be selected from one of the available line groups. Typical installations have one network line group, and one telephony line group. Once a particular line group is selected, the bottom part of the window will show the list of lines that are currently configured on that line group. The state of each of the lines will also be displayed, along with any error messages associated with that line. In the top window, line groups can be added, removed, or configured. In the bottom window, individual lines can be activated or deactivated, and lines can be added, removed, and configured. The configuration of lines and line groups are discussed in the sections below.

Telephony Lines and Line Groups

Telephony line groups manage groups of telephony lines, and apply parameters and properties that are common across all lines in that group. Telephony line groups also interpret events that occur on lines, such as DTMF digits, and can assign a meaning to those events. For example, a hardware device or line might only be aware that the DTMF digit sequence '###' was pressed; however, the telephony line group may know that this sequence indicates that the call should be disconnected.

When a telephony line group is added or configured, a dialog (general panel) will appear allowing parameters to be customized. Panels can be navigated between using the tabs at the top of the window. The settings available on the general configuration dialog are as follows:

Maximum Connect Time. If one wishes to limit the maximum duration of a connection to the system, it is accomplished using this parameter. Normally, one will not need to enable a maximum connect time, but depending on the application, it may be necessary to do so.

Line Allocation Strategy. The line allocation strategy controls how a line is selected when an outbound call is to be placed using the telephony interface. These strategies are usually used in conjunction with the line allocation strategy used by the telephone equipment to which to the Gateway Server is connected in order to minimize glare conditions. There are four possible strategies:

Lowest line allocated first. The lowest free line number will be used to place the call;

Highest line allocated first. The highest free line number will be used to place the call;

Round robin (decreasing). The first call will be placed with the highest line number in the system. Each successive call will be placed using the highest available line number that is below the previous line number used to place a call. Once no lines are available, the scheme starts again with the highest available line number;

Round robin (increasing). Identical to round robin (decreasing), but starts with the first line and progresses up.

Enable Support for DID. Enables the use of DID information on the lines in this line group. This should only be enabled if the telephone equipment to which the Gateway Server is connected provides DID signaling.

Note: DID is sometimes used to refer to DNIS service provided on an ISDN PRI line. One should not enable DID on an ISDN PRI line. Enabling DID only allows the collection of DID information using DTMF digits sent at the beginning of a connection. ISDN PRI does not signal DNIS (sometimes called DID) information in this fashion.

DID Min/Max Digits Accepted. If DID is enabled, controls how many DID digits will be required in order for DID collection to be successful. If the number of digits is between the maximum and minimum, inclusive, then the Did information will be accepted; otherwise, DID collection will fail.

DID Collection Time Limit. Specifies how long DID digits will be collected for after the call is answered. Normally, one second is sufficient for the transfer of DID digits, but this may depend on your particular telephone service.

Hangup Settings Panel

A hangup settings panel allows the events that cause a user to be disconnected to be configured. In normal environments, it is not necessary to configure these settings. However, in some environments, disconnection is not signaled explicitly by the telephone equipment, and must be detected by alternate means.

Silence Triggered Hangup Settings. These settings allow one to configure whether or not a line will automatically be disconnected based on an extended period of silence. Normally, this feature is disabled. When enabling the feature, one should select whether silence of the local party, or silence on both ends of the conversation is required to cause disconnection. One should also specify the time, in seconds, of continuous silence that is required in order to cause disconnection.

DTMF Triggered Hangup Settings. When integrating with PBXs and other kinds of telephone devices, disconnection can sometimes be signaled through the use of DTMF digits. If one enables DTMF triggered hangup, one will be required to specify a string of DTMF digits (including extended digits such as A, B, C, D) that will cause hangup. If these digits are detected in the order specified, and within the amount of time specified in the interval field, then the call in progress will be disconnected.

Integration Digit Settings

The integration digit settings are used for custom applications. One should not modify these settings.

The above describes the settings for the telephony line group. In addition, when configuring a line on the line group, it is necessary to provide configuration information for that line. In order to understand telephony lines, it is necessary to understand how resources are represented in the system. There are three types of resources associated with a telephony line. The trunk resource represents the actual connection to the phone equipment, such as the physical analog line, or a T-1 channel, and so forth. The voice resource represents the DSP processing resource that is used to perform IVR, voice compression, and so forth. Finally, an optional auxiliary resource can be used for call progress analysis, cadence detection, and other such applications. ExpressConfig normally sets up the resources for each telephony line exactly as required. It is generally not recommended that one modify these settings.

When a telephony line is added or configured, the following set of panels can be interacted with in order to configure the telephony line.

Resources Panel

The resources panel controls the interaction of the telephony line with the underlying hardware devices. This fields for this panel are explained as follows.

Location/Position Information. This field allows one to provide identifying information that can enable you to locate the physical line. It is for descriptive purposes only, and is not required.

Trunk Resource Configuration. In this section, one needs to specify the hardware device that is associated with this telephony line, and the instance of the trunk resource on that device which is to be used. Trunk resources are described above.

Voice Resource Configuration. This section allows one to specify which voice resource should be associated with the trunk resource configured above. Voice resources are described above.

General Panel

The parameters provided for this general panel follows.

Accept Any Location/Location List. These settings are for future expansion, and will allow one to address individual lines when routing calls. This enables the development of virtual PBX style applications, but is not required for operation with any of the applications currently shipping with the Gateway server.

Class of Service. The class of service on each line can be configured on a line-by-line basis. Class of service constraints allow lines to be disabled, to accept only incoming calls, to place only outgoing calls, or to accept calls in both directions (duplex service). The desired class of service can be specified using this setting.

Call Analysis

This panel allows you control call analysis settings. There are two main settings:

Enable Call Progress Analysis. This parameter determines if call progress analysis should be enabled. If enabled, it is also necessary to select which resource will perform the call progress analysis. The correct value for this setting is generally determined by ExpressConfig, and depends on a particular hardware configuration.

Enable Cadence Detection. This parameter determines if cadence detection is active during calls. Cadence detection may be used to trigger certain things, such as automatic disconnection. If cadence detection is enabled, it is necessary to specify which resource will perform the cadence detection.

Auxiliary Resource. If either cadence detection or call progress analysis requires the use of an auxiliary resource, the auxiliary resource must also be configured. It is necessary to specify the device and instance of the resource associated with this line, just as for trunk and voice resources.

Connection Detection Panel

This panel controls how the start of a conversation is detected by the system. There are several options for how this connection detection occurs.

Connect Immediate. If this parameter is enabled, all calls are assumed to be connected after they have been dialed, without waiting for any signaling from the telephone equipment.

Connect CPR. If enabled, this parameter will enable calls to be connected if call progress results are provided by the call analysis resource associated with this line.

Connect LCR. If enabled, this parameter will allow loop current reversal events to trigger the connection of a call. In some environments, loop current reversal is used for answer supervision.

Connect Cadence 1. Enables connections to be signaled through the use of custom cadence tone 1, which must be defined at the hardware device level. If a call is being placed, cadence tone 1 is detected, and this parameter is enabled, the call will be connected immediately. Note that the process of placing a call may interfere with the use of cadence detection in certain hardware configurations.

Connect Cadence 2. Identical to the above, but for custom cadence 2.

Disconnection Detection Panel

The disconnection detection panel is very similar to the connection detection panel. However, events in this panel are used to detect the disconnection of the user previously connected on a particular telephony line.

Disconnect LCR. Enables or disables loop current reversal signaling of disconnection.

Disconnect LCOff. Enables or disables loop current off signaling of disconnection.

Disconnect Cadence 1. Enables or disables disconnection signaling using custom cadence tone 1.

Disconnect Cadence 2. Enables or disables disconnection signaling using custom cadence tone 2.

Network Lines and Line Groups

Unlike telephony lines, network lines are created dynamically by the system as new calls are received, and are removed when calls are terminated. Therefore, there is no need to configure a list of lines, or to set configuration for those lines.

Furthermore, the network line group itself has no configuration properties at the line group level. (Recall that settings may be associated with line groups at the service level, described in the next section). The reason for this is that parameters are associated with the network proprietary device, or the network H.323 device.

A second network line group is generally not required. All network calls are processed through the single network line group. However, one must have a network line group in order to receive network calls.

Services

The Services component of the Gateway Server is the heart of the Gateway Server. This component is responsible for enabling the applications that actually provide services to the end user.

Applications are highly separated from the Gateway Server platform discussed so far in this section. Applications make use of the numerous capabilities provided by the Gateway Server platform in order to interact with the user, and to deliver enhanced services. In one example, all such applications are written using a $C^{++}$ API that provides access to functionality provided by the Gateway Server. Services can interact with each other, and transfer control from one service to another, creating a flexible environment for constructing applications.

Gateway Server applications are contained in DLL files that are linked at run-time to the Gateway Server platform. However, it is possible for third parties to create similar application DLLs. It is also possible to use the Gateway Server API to write applications that run from a separate process, or even a different machine.

The first part of this section will describe the services component of the Gateway Server platform. The second part of this section describes the applications according to the present invention that are included with the Gateway Server.

Selecting the "Services" node in the configuration tree using the Management System will access a main service window. The area at the bottom of the window shows a list of active sessions, the line that each session is associated with, and the service/application that is currently managing that session. The other information presented on this page is discussed below.

Service Selection

The Gateway Server is capable of supporting numerous kinds of services, and can run any number of instances of a particular service. Because multiple services are present that can handle an incoming call, it is necessary to define rules for selecting the service that will be used to handle incoming calls. By default, ExpressConfig creates a rule that selects the Gateway application to handle all incoming calls. However, this behavior can be customized, and different services can be selected.

In order to select the service used to handle incoming calls, the Gateway server provides a rule tree. When an incoming call is received, the Gateway server will traverse the rule tree until it finds a service that matches the parameters of the incoming call. Information in the incoming call can be used to control the service selection process. For example, DID or DNIS information can be used to select which service is activated, and with what parameters. This is extremely powerful in creating a flexible, single box solution that hosts multiple applications.

The rule tree consists of a number of rules, arranged in a tree like structure. When an incoming call arrives at that Gateway Server, selection begins at the top of the tree. Each rule at the top level of the tree is processed until a rule is found which matches the information contained in the incoming call. If a match is made, then that node in the tree is selected. A node in the tree, however, can either be a final node, in which case it contains the name of a service used to handle the call, or it can be a subtree. If it is a subtree, then the above process is repeated starting at the top of the tree that is beneath the selected node. If the bottom of the rule tree is reached and a matching rule is not found, then no service will be selected and the incoming call will be rejected.

Each rule in the rule tree contains a condition that must be matched for the rule to be selected. A blank rule allows all incoming calls to be matched. If the rule is a final rule, meaning that it directly selects a service, then the name of the service, and parameters for the invocation of the service, are also required. A dialog opens to show settings for a rule. This dialog includes fields as described below.

Attribute. This field provides the name of the parameter that will be checked to see if this rule should be selected. It names an attribute of the incoming call, such as DNIS, DID, or others.

Relation. This selects the relation that the attribute must have to the value, described next, in order for this rule to be selected. Possible relations are equals to, and not equals to.

Value. This is the value against which the value of an attribute will be compared. For example, if an incoming call has DNIS=1234, and the Attribute name is DNIS, then 1234 will be compared against the value specified in this field. In the example above, if the relation was equals to, and the value is 1234, then this rule will be selected. If, however, the value was 1235, or the relation was not equals to, then the rule would not be selected.

Service. If configuring a final rule, the name of the service that will be used to handle the call must be specified in this field.

Bindings. In order to customize the behavior of a service, it is possible to specify additional bindings to be passed along to the service. Bindings are a list of (attribute,value) pairs that will be interpreted by the service that is invoked. Clearly, the bindings list is service dependent. For a list of bindings that can be used to modify the behavior of a service, one needs to refer to the documentation for that service. As an example, placing "Language=English" as a binding will cause the Gateway Server to use English as the initial language for voice prompts. This is extremely powerful when combined with rules, because it would allow a configuration where calls received with DNIS=1234 are handled using English voice prompts, and calls received with DNIS=1235 are handled using Chinese voice prompts.

Service Level Line Group Settings

There are certain parameters that affect services and service selection that are required to differ from one line group to another. For example, it might be desirable to allow users calling in-on one line group (connected to a PBX, for example) to make calls without entering an identification code, whereas calls received on a different line group might require an identification code. Service level settings can be associated with any of the configured line groups. These settings can be viewed by double clicking on the line group nodes in the configuration tree that appear when the service node is expanded. There is one node for each line group that exists in the system. The settings, which are common for all line groups, are explained below.

Auto-user Lookup using Call Setup Information. Information may be associated with incoming calls that allow a user to be identified automatically, without the use of user identification entry. For example, a user could be identified using Caller ID information supplied by the telephone equipment. Enabling this field will cause an automatic user lookup to be initiated as soon as the call is received, using all information available at the time that the call is received. More details on how user records are managed can be found under the User Management section of this document.

Auto-user Assignment using Call Setup Information. In the event that the lookup of a user based on Caller ID or other properties fails, or if this feature is not used, it is possible to always assign users to a particular user account. Because this is configured on a line group by line group basis, it could be used to assign all callers on a particular line group (e.g. one connected to a PBX) to a particular user account, perhaps PBX_USERS. On the other hand, calls on other line groups would continue to require user identification, whereas the users on the PBX interface would be automatically associated with the PBX_USERS account. If this field is selected, it is necessary to enter the user ID with which the line group will be associated, under User ID.

Default Privilege Level. Routes are restricted on the basis of privilege level, as will be explained in the section on number translation and call routing. Before a user is identified, however, they will have a certain privilege level. This parameter can be used to control the default privilege level assigned to an unidentified user. This in turn can be used to restrict calling privileges. For example, one route to 1-800-NEWUSER could be assigned a privilege 0, with all other routes requiring privilege 1. A greeting could say "If you are a new user, please call 1-800-NEWUSER to open an account. Otherwise, please enter the number you wish to call". By granting a default privilege level sufficient to make the call to 1-800-NEWUSER, it is possible for new users to call in and open accounts using the same system, without requiring multiple telephone lines and telephone numbers. Similarly, unidentified users on different line groups could have different default privilege levels.

Use DNIS/DID Information as Dialed Number. Enabling this parameter causes the Gateway application, discussed below, to treat DNIS/DID information as the number that the user wants to call. This can be used to instantly route calls based on the number dialed by the user to access the system. This can be used to provide 800 services, for example, by routing calls to 1-800-1234567 to customer A's local number of (703)555-1234, and routing calls to 1-800-7654321 to customer B's local number of (416)555-1234. This allows a single line to be used to provide 800 services to multiple customers that are located in different cities, reducing their long distance costs for handling calls from customers.

Gateway Service

The Gateway service, in the context of high level applications, is a core service that leverages the capabilities of the Gateway Server platform to deliver calling capabilities to end users. The Gateway application service should not be confused with the Gateway Server service. Because the Gateway application is complex in its operation and provides a significant degree of functionality, it is discussed in the next section.

Autoforward Service

The autoforward service is a relatively simple service that forwards all calls to a pre-determined number. It is capable of playing a greeting immediately before the call is forwarded. This service can be useful in a number of applications. For example, a particular DNIS field could select the autoforward service, which could announce "Please hold, and the next available customer service representative will be pleased to serve you", and automatically forward the call to the customer service department ACD—which could potentially be in a different geographic location.

The Autoforward service can be configured by double clicking on the "Autoforward" node in the configuration tree, which can be accessed by expanding the "Services" root level node. An Autoforward configuration dialog is described below. Note that one must click on "Change Settings" in order to make changes to the service settings.

Country Code/Area Codes/Local Number. These fields specify the number that calls will by default be automatically forwarded to.

Enable Voice Prompt. If enabled this feature causes a voice prompt to be played immediately prior to forwarding the call. The name of the voice prompt to be played (see Voice Prompt Management later in this section) can also be configured.

In addition to the above configuration parameters, the number to be dialed can be overridden by binding the parameter "Autoforward_Call number" to the number that is to be called. This allows a different number to be forwarded to based on DNIS/DID information, or other call setup information.

Internal Services

The Gateway Server, by default, has several "internal" services that are used to accommodate common tasks, such as collecting digits and obtaining user identification. These services are not directly selectable, but can be used when developing third party applications, and may also appear in the list of services that are presently in operation.

Call Rating

The Gateway Server is capable of assessing charges to user accounts for calls that are made by the user. These charges can either be recorded in call detail records, or debited directly from users accounts. This process is explained in greater detail when the Gateway application, and User Management are explained. However, a key part of performing this charging for a call is determining how much to charge for the call. This section explains the operation of call rating, and describes how call rating can be configured. Call Rating by the Gateway Server is designed to be extensible by application developers. In order to facilitate this, there are multiple ways to rate calls, known as call rating types. A single standard model for rating calls is built into the software; it is possible for third party application developers to add additional means of rating calls. In addition, for each call rating type, numerous profiles may exist. Different profiles may use different values for how much to charge, how often the user is charged, and what levels of discounts are applied. The call rating engine supports multiple profiles for each of the call rating types that are present.

The call rating configuration dialog can be found under the "General" node in the configuration tree. Expanding this node will show the "Call Rating" node, which can be double clicked on in order to bring up a call rating configuration dialog. This dialog is described below, and provides a list of currently defined call rating profiles for each call rating type. New profiles can be added to the list, and existing entries can either be removed or modified.

When modifying a call rating page, the page that will be displayed depends on the call rating type. For the standard, built-in call rating type, the following information is included in a displayed page:

Description. Allows a textual description, for reference purposes, to be associated with the call rating profile.

Rate Modifier. Routes that are used to place calls contain a rate modifier, which is a floating point number. How this number is used for a given rating profile depends on this configuration setting. The rate modifier can be ignored, in which case the rate modifier field in the route will have no effect. If the base option is selected, then the rate modifier will be used as the base rate for the purposes of rating the call (base rates are explained below). If the percentage setting is selected, it will be used to adjust the normal base rate to determine the effective base rate.

No Charge Time. This field specifies the time, in seconds, during which no charge will be applied for the call. Calls of this duration or less will effectively be free. This can be set to zero to begin charging immediately.

Base Rate. This field specifies the base rate for the call, in units (dollars) per minute. The base rate is the nominal charge that will be applied during the entire call. This field is overridden if "Base" is selected for the Rate Modifier, and will be adjusted by the percentage specified in the rate modifier of a route if "Percent" is selected for the rate modifier.

Granularity. This controls the incremental billing unit. It is used to ensure that all charges are in cents, tens of cents, dollars, etc. This allows currencies such as the Yen, which has no fractional components, to be used, by simply setting the granularity to 1 (i.e. all billing is in increments of 1 Yen).

Initial Interval. Specifies the first interval, in seconds, which will be charged for when making the call. As soon as the no charge time is exceeded, the initial interval will be billed for.

Initial Rate (%). This controls the actual rate that will be used for billing the initial interval. For example, if the initial rate is set to 200%, and the initial interval is 10 seconds, then the first 10 seconds of chargeable time will be billed at a rate of 200% of the base rate. This can be used to provide certain behavior. In the example above, if the no-charge interval is 10 seconds, the initial interval is 10 seconds, and the initial rate is 200%, then the first 10 seconds are free, but after 20 seconds, the charge is for 20 seconds worth of the base rate. By doing this, calls are effectively charged at a uniform rate, but if the caller hangs up in the first 10 seconds, no charge will be applied.

Incremental Interval. Once the initial interval has elapsed, the user will be billed in incremental units of time specified by this parameter.

Incremental Rate (%). Each incremental user billed to the user will be billed at that incremental rate percentage times to the base rate for the call. Normally, this will be 100%. As an example, if the incremental interval is 10 seconds, the base rate is 0.60 per minute, and in the incremental rate % is 100%, then the user will be billed for each 10 seconds used, or part thereof, at 100% of the base rate of 0.60 per minute. Since each 10 seconds used costs 0.10 at 100% of the base rate, each 10 seconds or part thereof used by the user would cost them 0.10.

Voice Prompt Management

An integral part of providing IVR based services is the management of the voice prompts that are actually played to the user. The voice prompt management system is responsible for managing the voice prompts that are available on the system, and allowing those voice prompts to be played. In addition, in order to support multilanguage applications, multiple languages of a particular voice prompt may need to be supported.

The media manager handles all aspects of voice prompt management. It allows the list of voice prompts to be configured via the Management System. To view a Media Manager window, double click on the "Media Manager" node in the configuration tree, which is visible when the "General" root level node is expanded.

The Media Manager window shows the list of voice prompts. By default, when ExpressConfig sets up the default configuration for the Gateway Server, a number of voice prompts are installed. These voice prompts are used by the Gateway application in order to interact with the user. A user can modify these voice prompts to change the prompts used by the Gateway application. One can also add additional voice prompts that can be used by third party applications, or other applications such as Autoforward.

Media Manager buttons for Adding and Removing function differently than a normal list. The reason is that each entry has a number of versions (i.e. languages) of each voice prompt may be present. When one adds a new media entry, one should specify the name of a voice prompt. If one selects the name of an existing voice prompt, one should add an available version of that voice prompt (or overwrite an existing one). If one enters a new name that does not already exist, a new voice prompt will be created and maintained by the media manager. A dialog for adding a new voice prompt includes information as follows. The version corresponds to the language selection of the user, and can also be used for other purposes. When adding a voice prompt or version of a voice prompt, one can also specify the default version of a voice prompt. The default version is the version that will play if the requested language is either unspecified, or unavailable. The description of the voice prompt is used for informational purposes. Finally, one needs to provide a path to a muLaw file that contains the voice data that one wishes to be played. This file should be in raw muLaw format, 8000 samples per second, 8 bits per sample, mono.

Similarly, when one removes a voice prompt, a user should select which version is to be removed. One will be provided with a selection of the available versions that can be removed. If one removes the last version of a particular voice prompt, then that voice prompt will be removed entirely from the system.

If one needs to make bulk changes to voice prompts, it is useful to be able to directly access the voice prompts as they are stored on disk. The filename format for voice prompts managed by the media manager is mm_<promptname>_<versionname>.mulaw where <promptname>is actually the name of the voice prompt, and <versionname> is actually the version of the voice prompt. The files are stored in the main Gateway Server directory. Using this information, one can do a bulk overwrite of all voice prompts once one has a configured set of voice prompts. (However, this can only be used to overwrite existing voice prompts, not to add new voice prompts or new versions of voice prompts). One should also note that one should restart the Gateway Server if her or she directly modifies the files on disk in order for changes to take effect.

The Gateway Application

This section further discusses the Gateway application described in the previous section. The Gateway application is the main application provided by Array in order to deliver calling services on the Gateway Server platform. It makes use of all of the capabilities provided by the Gateway Server platform in order to deliver sophisticated calling services to the end user.

The discussion of the Gateway application is divided into several parts, as listed below.

Principles of Operation—Describes the basic sequence of steps that the Gateway application uses in processing a call entered by the user. This allows the basic IVR sequences to be understood. It also allows an understanding of the steps that the Gateway application goes through in setting up a call.

Gateway application Configuration—Discusses the configuration options that can customize how the Gateway application behaves, and how to set those parameters.

Supplementary Application Configuration—Discusses the internal applications that affect the behavior of the Gateway application, and how these applications can be customized.

Session Bindings—Describes the session bindings interpreted by the Gateway application.

Each of these parts is discussed in a separate section below.

Principles of Operation

The Gateway application is a separate application from the Gateway Server that interfaces with the Gateway Server using the services API provided by the Gateway Server. However, the Gateway application is normally loaded in-process by the Gateway Server. This allows the Gateway application to integrate with the management and configuration facilities provided by the Gateway Server, in addition to being able to provide services to end users.

The Gateway application handles calls, and interacts with users in order to collect the necessary information to complete calls on behalf of the user. The Gateway application handles both network calls and telephony calls, and handles inbound or outbound calls of each of those types.

The following sequence of steps is followed by the Gateway application in handling a telephone call from a user.

The incoming call is answered;

The system greeting is played;

Depending on the configuration, the user may be prompted for their identification. If so, the identification entered by the user will be processed to ensure that it is correct, and the call will proceed;

The user is requested to enter the number that they wish to call;

The number dialed by the user is translated using the E.164 translator (described in the section on routing and number translation) into a standardized format;

The routing manager is used to find routes that match the number dialed by the user. The routes can come from a number of sources. The process used to find routes is discussed in the next section;

The routes are prioritized according to the configuration of the system;

Routes are tried successively, until either all routes have been tried, or the call has been placed successfully. If the route being used requires the user to provide their identification and/or authentication code, then the user will be prompted to do so before the route is actually used;

If debit is being used for the call, then a debit reservation is made against the user account that is making the call. Depending on the configuration of the Gateway service, the user may also be informed of their current balance, and how long the call will be allowed to last;

The call is placed according to information contained in the route. If a connection is established to the remote party, then the call proceeds as normal. Otherwise, the system plays a message indicating why the call could not be completed and optionally prompts the user for another number to call;

If the call is connected successfully, and the called party hangs up, the calling party will be informed, and optionally asked for a second number to call. If the calling party hangs up, the called party will be disconnected;

After the call is completed, regardless of whether or not it was successful, a call detail record will be inserted into the database of call records. A cause code will indicate whether or not the call was successful (and why).

Gateway Application Configuration

Several configuration parameters can control how the Gateway application interacts with the end user. These parameters are explained below. The Gateway application window can be viewed by opening the "GatewayService" node in the configuration tree, which is visible when the "Services" root level node of the configuration tree is expanded.

There are three panels that allow the configuration of the Gateway application. The tabs at the top of the window allow these panels to be navigated between.

General Settings Panel

This panel allows general Gateway application configuration options to be configured. There are only three parameters that can be configured on this panel:

Follow on calls. This parameter determines whether or not the user will be allowed to make follow on calls. This refers to the capability of placing a second (and third, and so forth) call after the first call has been disconnected, without hanging up and calling back into the system. If the Gateway application serves live users, this is generally a useful feature; however, if the Gateway Server is interfaced to an automated switch, then this functionality is generally not necessary.

Maximum number of retries. To limit the length of time that a particular line can be tied up, there is a limit to the maximum number of retries that can be entered by a user. This field controls how many times a user can try to unsuccessfully make a call before they will be disconnected by the system.

Call Charge Preferences. This field allows the selection of the strategy for charging calls placed using the Gateway application. The possible selections are as follows:

Credit. Calls will be made in a post-billed mode. Debit will not be used for calls, and calls will not be made without a charge applied;

Credit/Debit. Calls will be made in a post-billed mode. However, if the user of the system does not have credit enabled on their account, but have debit enabled, then debit will be used to place the call;

Debit. Calls require that the users have sufficient debit balance in order to make the call. Users with insufficient debit balance, or whom do not have a debit account will be denied permission to make the call;

Debit/Credit. Calls will be made in debit mode, as described above. However, if a user does not have debit enabled on their account, but has credit enabled on their account, they will be permitted to make the call using credit;

No Billing. In this mode, credit/debit checking will not be performed, and the user will be allowed to make calls without charges being assessed. However, CDRs will still be collected, so a post-paid billing system based on CDRs would still be functional;

Route Dependent. In this mode, the call charge preferences depend on the number dialed, and are contained in the route.

Country/Area Code Settings Panel

The country/area code settings panel allows one to provide information about your local calling area to the Gateway service. This is used to provide a dialing plan that emulates the dialing plan provided by the local telephone company in that area.

There are four parameters that one needs to configure. These parameters are the international prefix, national prefix, country code, and area code. The way that these parameters operate is as follows. After the user enters the number, it goes through the following three steps prior to being interpreted by the system:

If the number is prefixed by the international prefix (i.e. the sequence of digits normally used to dial an international number), then the international prefix is stripped off, and the number is interpreted;

If the number is prefixed by the national prefix (i.e. the sequence of digits normally used to dial a domestic long distance number), then the national prefix is stripped off, the country code is added to the front of the dialed digits, and the number is interpreted;

If the number is not prefixed by either of the above, then the country code, followed by the area code, are added to the front of the dialed digits, and the resulting number is interpreted.

For example, if the international prefix was 011, the national prefix was 1, the country code was 81, and the area code was 3, then numbers would be processed as follows:

01117035551234 matches the international prefix and is processed as 17035551234;

1612345678 matches the national prefix and is processed as 81612345678;

123456789 matches neither, and is processed as 81312345678.

In the first example, nothing was added after the international prefix, since dialing the international prefix implies that the country code and area code have been dialed. In the second case, the number didn't include the local country code (81), since it was a domestic long distance call—so the country code was added prior to processing. In the final example, neither the international nor national prefixes were added; so it is assumed that the call is to the local area, and the country code plus area code were added to the front of the dialed number.

When the dialed number is sent for processing and route resolution, it is always required to be in a fully resolved format that contains the country code, area code, and local number. This way, routing information can be shared between Gateway Servers in different areas without modification. If routes were simply based on digits dialed by users, locale differences would prevent this from being possible.

Advanced Panel

This panel contains settings that do not normally require modification. The settings available on this panel are as follows.

Try First Possible Route. By default, the Gateway application will try to place a call using the optimal route, and ask for user identification if necessary. If some users cannot be identified, this could cause difficulty since even if multiple routes exist, they will not be tried if the user cannot enter their identification code when the first route is tried and requires identification. To circumvent this situation, it is possible to enable the first possible route (that can be used with the current credentials) to be tried first, rather than the optimal route.

First Digit Timeout (ms). This parameter controls how long the Gateway service will wait for the first digit to be dialed when waiting for a number.

Subsequent Digit Timeout (ms). This parameter controls how long the Gateway service will wait for the second and subsequent digits when waiting for a number.

Identification Mode. Selects when identification information will be requested from the user. There are three possible settings for this parameter:

Always—Always prompts the user for their identification, after the number has been entered, but before the call is actually placed.

At the beginning—Always prompts the user for their identification, but does so immediately, when the user first calls into the system.

On demand—Only prompts the user for their identification if it is required in order for the user to have sufficient privilege to access

Supplementary Application Configuration

In order to facilitate reuse of certain application code by third party application developers, the Gateway application separates some functionality into separate applications that are used to perform common tasks, such as obtaining a valid user identification, or obtaining a users authentication code. These supplementary applications are separated from the Gateway application, and are invoked by the Gateway application. This section describes the configuration of supplementary applications invoked by the Gateway application. User Identification Application the user identification application is used to obtain a valid user identification from the user. The user will be prompted for their user identification, and will be given several attempts to enter their user identification correctly. The user identification application will automatically consult with the Database Server to determine if the user identification provided is valid. The user identification settings window can be accessed using the "IdentificationService" node in the configuration tree, visible once the "Services" node is expanded. This window includes the following information:

Maximum Number of Retries. This parameter controls how many failed attempts to enter their user identification a user will be allowed before they are disconnected.

First Digit Timeout. This parameter determines the amount of time a user will be given to enter the first digit of their user identification.

Subsequent Digit Timeout. This parameter determines the amount of time a user will be given to enter the second and subsequent digits of their user identification.

User Authentication Application

The user authentication application is almost identical to the user identification application, except that it obtains and checks the authentication code for a user. A configuration screen, shown below, can be accessed using the "AuthenticationService" node in the configuration tree, also visible once the "Services" node is expanded. The window includes the following information:

Maximum Number of Retries. This parameter controls how many failed attempts to enter their user authentication code a user will be allowed before they are disconnected.

First Digit Timeout. This parameter determines the amount of time a user will be given to enter the first digit of their authentication code.

Subsequent Digit Timeout. This parameter determines the amount of time a user will be given to enter the second and subsequent digits of their authentication code.

Session Bindings

The previous section discussed the concept of session bindings, in particular how they relate to customizing how a service application behaves. This section discusses the session bindings that can be used to manipulate the behavior of the Gateway application.

The Gateway application uses several session bindings that are set up automatically by the Gateway Server platform in order to provide the appropriate behavior based on the type of call being handled. At this time, there is only one parameter that can be directly used to customize the behavior of the Gateway application. This parameter is shown in the table below.

Parameter Value
    User language Version of media prompts that will be played by default, until the user is identified. Once the user is identified, voice prompt language will be determined by the user profile

Routing and Number Translation

This section describes how to configure routing and number translation according to the present invention. This is a critical aspect of the overall operation of the VoIP system. There are numerous ways that calls can be routed across the network in the present invention, and selecting the optimal approach for a particular configuration is important in ensuring the performance and manageability of the network. This section presents the concepts behind routing and numbers translation, and describes how routing affects the functionality of the overall system, and explains available choices for how calls will be routed.

Note: Routing in the context of the present invention software refers to call routing, not IP routing. IP routing, which handles the routing of IP packets sent on the underlying IP network, is a separate issue and it is assumed that the present invention components are running on a network in which the IP routing is configured correctly.

This section is divided into several sections, each covering a different aspect of call routing. These sections are as follows:

Number Translation. As a prelude to discussing actual routing, one should consider how the present invention software translates digits dialed by the user into a call address that can be routed. This section describes the number translation process.

Routes and Route Information. Describes the concepts of routes, and how routes are used in order to complete calls. The information that is contained in each route, and how that information affects the behavior of the system, is also discussed.

Routing Models. Explains the different types of routing models that exist, based on how routing information is distributed in the network. Local routes, static global, disseminated, and dynamic routes are all discussed.

Routing Manager. Having discussed the principles behind a route, this section discusses how routes are managed, and general settings that are used to control the routing process.

Routing Servers. To facilitate the exchange of routing information between different Gateway Servers, the present invention provides Routing Servers. Routing Servers can be used to centralize the administration of call routing in the network.

Number Translation

The Gateway application normally collects digits from the user to determine what number they wish to call. However, the routing system is based on routing numbers in a specific format. Specifically, the routing system in the present invention is based on routing E.164 numbers, comprised of a country code, an area code, a local number, and an optional extension. These E.164 numbers, also called E.164 addresses, are usually displayed as follows:

+CC(AC)LN-EEE

In the above, CC would be replaced with the country code, AC with the area code, LN with the local number, and EEE with the extension. The routing system is capable of routing numbers in this format, so the string dialed by the user is translated into the format shown above. For example, the following translation would be used to make a call:

170378770007002->+1(703)7877000-7002

Although the above example is quite simple, certain countries have complex system for number translation. In these situations, the number of digits in the area code and local number may be variable. The subsections below explain the method used by the system to perform number translation.

E.164 Parser

The E.164 parser is a component of the Gateway Server that is responsible for translating the digits entered by the user into E.164 form. The E.164 parser operates using tables that are locally defined on each Gateway Server. However, it is possible to allow E.164 parser data to be synchronized automatically, to prevent the need to update E.164 parser tables on all Gateway Servers each time a change is to be made. The synchronization process is described in the next section.

The E.164 parser operates by matching patterns in the E.164 parser table with the digits dialed by the user. Each table entry specifies the pattern of dialed digits that should be matched, as well as information on how to translate those digits. Table entries are organized by country codes; table entries within each country should be set up for which numbers can be parsed. The Gateway Server is installed with a default set of tables, but E.164 parsing information should be provided for countries not set up by default. It is also necessary to update E.164 parsing information to reflect actual changes to the numbering system in the world.

A diagram that shows the list of countries for which parsing data is configured can be viewed by expanding the "Routing" root level configuration tree node, and double clicking on "E.164 Translation". The synchronization mode, explained in the next section, can also be configured from this screen.

The country list is a standard list; selecting a country will allow its entries to be added or removed; country codes may also be added. Once a country is selected, a user is able to configure the table for that country, as well as configuration settings for that country. The General panel for a country allows one to enter the country code and country name for the country that her or she is configuring. The country code cannot be changed, however, once the country has been added.

The "Address List" panel allows the actual translation table for the country to be set up. All existing configured patterns are listed, and can be modified or removed. Additional entries can be also be added.

There are two pieces of information that need to be configured for each entry in the E.164 parser table. The first is the actually pattern, specifying addresses that will match. This information is configurable under the "Address" panel when configuring a table entry.

There are four pieces of information that are required when specifying an address to be matched:

Country Code. This is the country code to which the entry pertains, and is not edit able since the country which entries are being added to is already selected. When checking a number entered by the user, the E.164 parser starts at the left of the entered digits, and attempts to find a matching country code for the first digit entered. If it fails, it tries again for the first two digits, then the first three digits, and so forth. Once a country code is selected, the E.164 parser proceeds to the area code checking step.

Area Code. The digits following the country code will be compared against the area code field. If the digits following the country code match the value entered in the area code field, then checking will progress to the local number stage. Since it is not desirable to enter every conceivable area code, it is possible to wildcard the area code. Wildcarding is accomplished by entering 'A' in the place of a digit that is to be matched, and will allow any digit to be matched. For example, the pattern 4AA will match any three digit sequence starting with the digit 4. However, once one uses a wildcard digit, all digits to the right of that point should also be a wildcard. Using the above example, 4AA is a valid entry for the area code field, but 4A4 is not.

Local Number. If the area code field matches, then checking will proceed to the local number stage. At this point, the digits following the area code will be compared against the digits specified in the local number, and a match will be checked for. If the digits match, then the checking will proceed to the extension stage. As with the area code, it is possible to supply wildcard digits in the local number field, by using the symbol 'N'. Thus, 123NNNN will match any seven digit local number, as long as it begins with '123'. Additionally, it is possible to specify optional digits, using a lowercase 'n'. For example, 123NNnn would match numbers starting with 123, with between 5 and 7 total digits. Note that all characters to the right of an 'N' should either be another 'N' or an 'n', and that all characters to the right of an 'n' should also be an 'n'. Finally, if one uses optional wildcards, the extension field should be blank.

Extension. For certain applications, it is desirable to allow an extension to be explicitly represented. For example, a Gateway Server connected directly to a PBX whose main number is +1(703)555-1234 might want to terminate calls to 17035551234 followed by any four digits (assuming four digit extensions on the PBX). The extension field is optional, and be left blank, in which case extension checking is bypassed. If present, the extension field specifies digits that must be matched in the digits dialed by the user that follow the local number. As with the local number field, it is possible to use 'E' as a required wildcard character, and 'e' as an optional wildcard character.

The second panel under a pattern entry for a particular country, "Extra Settings", allows you to configure the number of extra digits that will be matched with the pattern. If a pattern matches the dialed number but additional contains extraneous digits, then the extra digits setting will be consulted. If there are fewer extra digits than specified in this setting, then the pattern will be considered to match and the extra digits will be discarded. Otherwise, the digits entered by the user will not be matched.

Prioritization and Examples

Another important concept in understanding E.164 translation is that of prioritization. There may be multiple entries that match a particular number dialed by the user. The E.164 parser selects the table entry that has the greatest number of matching digits. For example, if the number dialed is 17035551234, consider the following entries exist in the table for country code 1:

+1(703)555NNNN
+1(70)35NNNNNN
+1(703)NNNNNNN
+1(AAA)NNNNNNN

The matching table entry selected will be +1(703) 555NNNN, because it has the most digits matching. Note that although +1(70)35NNNNNN also matches the dialed digits, fewer specific digits match (in other words, there are more wildcard substitutions). Also, note that the result of using +1(70)35NNNNNN would have been different, since it would have resulted in an area code of 70, and an eight digit local number.

The following are some examples of parsing entries, and the types of numbers that they match.

| CC | AC | LN | EXT | Description |
|---|---|---|---|---|
| 1 | AAA | N | | Matches any 10 digit number in country code 1. |
| | | N | | |
| | | N | | The first three digits will be used as the area code, the following seven as the local number. |
| | | N | | |
| | | N | | |
| | | N | | Numbers matching this rule will have no extension. |
| | | N | | |
| 1 | 703 | 55 | | Matches numbers starting with 1703555. |
| | | 5N | | Numbers may be 8 to 10 digits in length. |
| | | Nn | | The area code is always 703; the remaining digits dialed is considered the local number. |
| | | n | | |
| 1 | 703 | 55 | eee | Matches 17035551234, with up to three additional digits. |
| | | 51 | | |
| | | 23 | | If present, the additional digits will be considered to be the extension field. |
| | | 4 | | |
| 81 | 429 | 5N | | 8 digit (excluding country code) |
| 81 | 42 | N | | numbers beginning with 814295 will be considered to be in the 429 area code, whereas numbers beginning with 814291 will be considered to be in the 42 area code. This true example (taken from Japan) illustrates how local number digits can actually alter the determination of what area code a number falls into. |
| | | N | | |
| | | N | | |
| | | 91 | | |
| | | N | | |
| | | N | | |
| | | N | | |
| | | N | | |

Alternative Configurations

The sections above discussed how E.164 pattern tables are used to translate numbers to an E.164 form. The E.164 parser system is based on emulating the telephone number interpretation typically performed by PSTN switches. However, this is not necessarily appropriate for all applications. For example, when terminating traffic to a foreign area with variable length area codes, it may be known only that all numbers are 9 digits in length when the area code and local number are combined. In such situations, it is possible to forgo specifying the area codes, and simply to treat the entire sequence of digits entered by the user as a long local number. In this case, the area code field would be left blank, and the local number would be 'NNNNNNNNN' (9 wildcards). With this entry, it would not be possible to know the area code that was actually dialed, but this knowledge is not always required, and using this approach can avoid the otherwise tedious task of creating a list of all existing area codes.

Note, however, that any routes configured on the Gateway Servers would also have to be for a nine digit local number with no area code.

E.164 Parser Data Synchronization

The above sections described a key element, the E.164 pattern tables, that are used to control how digits entered by the user are parsed into a standard address form. However, the tables that are used in doing this are relatively large, and furthermore, may change frequently if they are used to reflect the way that numbers are translated by the PSTN, since PSTN carriers make frequent changes to the ways that area codes are assigned. In order to ensure that Gateway Servers continue to be practical to maintain, it is possible to synchronize E.164 parser data with a centralized source.

Whenever a change is made to the centralized version of the data, maintained on a Routing Server (discussed below), the change will automatically be propagated to the Gateway Servers that are synchronized with that version of the parser data.

On a Gateway Server, E.164 parser data synchronization is configured on the E.164 Translation node, described above in the section on the E.164 parser. In the box labeled "Synchronization Mode", there is a button labeled "Change" that can be used to control how synchronization is performed. There are three options:

No Synchronization. In this mode, E.164 parser data must be configured independently on the Gateway Server. Changes to E.164 parser data elsewhere in the network will not affect the way that the Gateway Server being configured parsers E.164 numbers.

Client Synchronized In this mode, E.164 parser data will be synchronized with a server that provides E.164 parser data. This mode should only be selected on Gateway Servers, not Routing Servers (described below), except in specialized cases. In this mode, the contents of the local E.164 parser tables will be kept consistent with those of a listed server. Whenever a change is made to the data on the server, the local Gateway Server will automatically receive those changes and update its local database. Because the local database is maintained, the number translation process remains very fast, so that overall call setup time is not impacted. The IP address and port number of the server are required when selecting this mode of operation.

Server Synchronized. This synchronization mode is not generally useful for Gateway Servers. For Routing Servers, described below, this mode allows Gateway Servers to synchronize with the contents of the local E.164 parser tables. Any changes made to the local tables will be propagated to the Gateway Servers that list the Routing Server being configured as their server during Client Synchronization mode setup. Additional setup needs to be performed, in order to control which Gateway Servers are allowed to connect and retrieve data; this is described when the Routing Server is discussed.

Routes and Route Information

An important concept in understanding how calls are routed by the system is that of a route. A route, at a simple level, is a grouping of information that tells the Gateway Server how to make a particular call. For example, a route could tell the Gateway Server to make calls to a particular area code via the Gateway Server located at IP address 192.168.1.3. Similarly, a route could tell a Gateway Server that in order to make calls to a particular number, it should use a particular set of telephone lines, and dial a specific sequence of digits. In general, most calls involve the use of two routes. On the originating Gateway, a route will exist supplying the address of the terminating Gateway. At the terminating Gateway, a route will exist supplying the actual number to send to the attached telephone equipment, and allowing the call to be placed.

The information actually contained in a route is significantly more complex that the simple description above. Information on prioritization, timing, and access control are also contained in a single route. This section describes the key information contained in a route.

There are four main groups of information that are contained in every route that can be configured, which deal with different aspects of routing. These groups are as follows:

The list of E.164 address patterns that the route corresponds to, and how the Gateway Server should place a call in the event of a match. For example, a route for +1(703) NNNNNNN should match the number +1(703) 5551234 entered by the user, and may tell the Gateway Server to complete this call via a Gateway Server located at IP address 192.168.1.3;

Ordering information that controls the order in which routes are tried, if multiple routes are available to complete a particular call. This information is necessary in providing redundancy. Information of this nature would allow two routes to a particular number to be defined. The less expensive route would likely be prioritized so that it will always be tried first, and only if it fails will the second, more expensive route be selected;

Timing information, defining when a particular route may be used. For example, consider a technical support center with a branch on the east coast and a branch on the west coast. One route could direct calls to the technical support center between the hours of 9:00am and 3:00pm Eastern Standard time to the center on the east coast. A second route would direct calls between 3:00pm Eastern Standard time to the center on the west coast;

Access Control information, which is used to determine which users are allowed to make use of the route. As an example, calls to a customer signup center at +1(800) 2SIGNUP might accessible to all users, but calls to all other numbers might require that the user have an active account. Access control information allows such conditions to be specified.

Additional information may be contained in a route, depending on the type of the route. The sections below discuss the information that is common to all routes, regardless of their type. The screens shown in the section below are for locally defined routes. However, the panels are common to other types of routes as well. In the examples below, one may expand the "Routing" root level configuration tree node and double click on the "Local Routes" window. From the local routes window, one can either add a new route, or modify an existing one.

Addressing Information

The routing address panel shows the list of addresses that will be matched by a particular route. For example, if an address matches +1(703)NNNNNNN, then whenever the user dials a number with country code 1, area code 703, and 7 digits in the local number field, it will be handled by this route (unless there is another matching route of higher priority).

Under normal conditions, a route will only have a single address entry associated with it. The reason that additional address entries are allowed is to provide flexibility in addressing very specific applications.

Remember that E.164 translation happens prior to routing. Therefore, numbers will already be in +CC(AC)LN-EXT format before the routing process commences. This provides increased flexibility, since it is not necessary to specify how the number is to be interpreted. For example, a route could exist for +1(Aaa)NNNnnnn. This would match any number in country code 1, with a 1–3 digit area code and a 3–7 digit local number. It is not practical to do this at the E.164 translation stage, since a number like 1703555 could be interpreted as +1(703)555, +1(70)3555, +1(7)03555, and so forth. However, at the routing stage, it makes addressing highly flexible; even a country with a complex area code system like Japan could be routed to with a single route for +8 1 (Aaaaa)NNNnnnnn.

When a new route address entry is added, or an existing route address entry is modified, a dialog will appear for configuring the route address entry. The fields in this dialog are explained as follows:

Call Address. This group of fields specify the address pattern that must match the address entered by the user in order for this route to be selected. In one example, only E.164 addresses are supported; however, other types may be supported. For E.164 addresses, it is necessary to provide the country code, area code, local number, and extension of the addresses that should be matched. The same wildcards described when E.164 translation was discussed could be used. However, as discussed above, some restrictions regarding the use of wildcards are relaxed. Specifically, using optional wildcard characters does not require that all subsequent fields in the address use only optional wildcards. For example, 'Aaa' can be used in the area code field without requiring that the local number field consist solely of 'n's. However, restrictions within a field (fixed digits must precede required wildcards, which must precede optional wildcards) still exist.

Line Group Type/Instance. When the Gateway Server is placing a call using a particular route, it is necessary for a line group to be selected in order to make that outbound call. The line group type and instance allow a particular line group to be identified, in which case calls using this route will only be placed using that line group. In addition, if the line group type is set to dynamic, then an appropriate line group will automatically be selected based on the contents of the route, and availability of individual lines.

Rate Modifier. The Gateway Server is capable of rating calls and charging for those calls. The section on call rating in the Gateway Server Capabilities section describes the rate modifier, and how it is used in determining the cost of a call to the user. The value entered in this field as the rate modifier will be passed to the call rating function when determining the charge for a call.

Disable Route. In order to allow calls to specific numbers to be restricted, it is convenient to create routes that prohibit access to the number instead of allowing it. The 'Disable Route' field is used for this purpose. A disabled route will be treated like a normal route, and prioritized as if it was a normal route. However, when the list of routes is prepared, all routes lower in priority than the highest priority disabled route will automatically be rejected. For example, it is possible to reject calls to all numbers beginning with 911 in North America with just a single route for +1(AAA)911nnnn with Disable Route selected.

Device Type. Two kinds of underlying devices can be used to place a call based on a route; telephony devices, and network devices. The kinds of information used by a network device to place a call is obviously different than the information required by a telephony device. This field allows the type of routing information being supplied to be specified. Note that specific fields may change depending on the type of device selected. This field could sometimes be referred to as the route 'type'—e.g. network routes and telephony routes—but is not referred to this way herein to avoid confusion with route distribution types (local, dynamic, etc.).

Remapped Number/Station Address. This field appears for Telephony Routing device types only. The remapped number field allows one to specify the digits that will actually be sent to the connected telephone equipment when a call is placed using this route. The remapped number may contain the same wildcards used in specifying the address of the call, but may not exceed the number of wildcards contained in the address. For example, if the area code field reads 'AAA', then a remapped number of 'AA' would result in the first two digits (leftmost) of the area code being sent to the connected equipment. A remapped number of 'AAA' would send all three area code digits to the connected equipment, and a remapped number of 'AAAA' would be invalid. Placing optional wildcards in the remapped number will result in a substitution if a matching digit exists in the actual address, and no digits if no such digit exists. The format of the station address field is identical. However, the station address is used to select a particular line for placing the call, and does not affect the digits sent to the connected equipment.

Host IP/Port. This field appears for Network Routing device types only. This field is used to specify the IP address and port number of a Gateway Server or H.323 terminal that will complete calls to a particular number. The default port numbers should generally be used unless otherwise required.

Enable Voice/Fax. Controls the kinds of calls that will be enabled. These fields are optional. Voice calls should always be enabled; voice calls are dynamically switched to fax when the appropriate tones are detected.

Array Proprietary/H.323. This field appears for Network Routing device types only. Since the Gateway Server supports multiple protocols for actually placing a network call, it is necessary to specify which protocol will be used. Calls handled by other present invention Gateway Servers should select the Proprietary protocol (or non-proprietary protocol), whereas calls to H.323 terminals such as Microsoft Net-Meeting should select the H.323 protocol.

Ordering Information

The ordering information panel for a route is very simple, and provides parameters that govern the order in which a route is selected. Two parameters can be modified through this page; preferability, and a cost estimate. Both of these parameters affect the order in which routes are selected; however, the exact relationship between these parameters and order is determined based on configurable parameters that are discussed under the General Settings section below.

Timing Information

It is possible to restrict the times of the day, as well as the days of the week, during which a particular routing entry may be used. Possible applications of this capability were already discussed above.

Note: Route timing restrictions apply to use of the route, which occurs when the call is initiated. In one example, if a call extends beyond the time in the call route, it will not be automatically disconnected. For example, for a route enabled from 9:00am to 5:00pm, a call placed using that route at 4:59pm will be allowed to continue indefinitely past 5:00pm.

Use Timing. This flag controls whether or not route timing restrictions will be used. If disabled, a route can be used at any time of day. Otherwise, the time restriction table will be used to determine if the route can be used.

Use Local Time/Time Zone. If selected, use local time means that timing information in the route will be assumed to be for the local time zone. If such routes are transferred between different systems, then the timing information will be interpreted according to the local time on the Gateway Server that uses the route. This may or may not be the desired behavior. For example, consider a route is valid between 9:00am and 5:00pm, local time, distributed to two Gateway Servers, one on the east coast (Eastern Standard Time) and one on the west coast (Pacific Standard Time). The east coast Gateway Server would allow use of this route between 9:00am and 5:00pm EST, and the west coast Gateway Server would allow use of this route between 9:00am and 5:00pm PST. However, if local time zone is not checked, then the time zone (relative to GMT) can be selected. For example, if the time zone in the example above was GMT—5:00 (EST), then the east coast Gateway Server would allow calls between 9:00am and 5:00pm EST but the west coast Gateway Server would only allow calls to be made between 6:00am and 2:00pm PST.

Allowed Usage Times. A list of allowed usage times is managed for each route that has timing information enabled. Each entry in the list specifies a time range during which the route may be used. An arbitrary number of entries may be added. Each range entry specifies a starting day and time, and a finishing day and time. If at least one matching timing entry exists at the time and day of week that a route is considered, then the route will be used.

Access Control Information

The access control panel allows restrictions on users that can and cannot use a route to be configured. The access control system is highly flexible, allowing a wide range of conditions to be implemented.

The list allows an arbitrary number of access control entries to be configured. When considering whether or not a particular user is allowed to make use of a route, the system begins with the first route in the list, and proceeds through the access control list until it finds a matching entry.

If no entries exist in the access control list, then access will be granted. Otherwise, if entries exist but no matching entries are found, then access will be denied.

For each route access entry, the following parameters can be configured:

Route Access Type. Each route access entry can either grant access, or deny access to user. Since the first matching entry in the route access list will be used to determine whether the route will be accepted or denied, it is possible to set up complex restrictions. For example, it would be possible to grant access to a particular group of users, but to deny access to one particular member in that group using two route access entries. The first, which occurs higher in the list, would deny access to the particular member. The second would grant access to the group. Since the first entry in the list is processed first, the deny access result would occur for the particular member for whom it was desired to deny access.

Call Charging. This option determines how call charging should be performed for calls that are placed using this route, and when this route access entry was selected. For example, consider a user placed a call using a route, and granted access under an access entry that specified that Debit is required. In this case, the user would be required to have debit enabled on their account, as well as a sufficient balance, in order for the call to occur. A detailed description of the options for call charging are described in the section on Gateway Server Capabilities, in the section on Call Rating.

Call Rating Type/Profile. This selects the call rating type and profile used to actually bill the call, if the call is to be billed. These parameters are also explained fully in the section on Gateway Server Capabilities, in the section on Call Rating.

Requirements. This list specifies conditions that should be met in order for a route access entry to be selected. If any of the conditions in this list are not true, then the route access entry will not be selected, and the next route access entry in the route access entry list will be considered. This is a standard list, allowing individual requirements to be added and removed. There are several kinds of requirements that can be configured:

GroupID; requires a specific value for the Group ID of the current user. Can be used to grant access to a particular group of users.

IsIdentified; simply requires that the user have an account on the system.

UserID; requires a specific value for the User ID of the current user. Can be used to grant access only to a particular user, such as a system administrator account for testing purposes.

UserMinPrivilege; requires that the user have a certain minimum privilege level. This does not require that the user is identified, since all line groups have a default privilege level that is assigned to users that have not yet been identified.

Routing Models

From the previous section, it is clear that there is a significant amount of information contained in each route. Because of this, it is highly desirable to minimize the number of times that the same routing information must be entered. In order to provide flexibility while keeping administration to a minimum, the present invention software supports four models for how routing information can be distributed around the network. These models are not exclusive; in other words, one does not need to select a single model. Routes of all four types can be used on a particular Gateway Server.

Locally Defined Routes

Locally defined routes, more commonly referred to as local routes, are routes that are defined on a single Gateway Server. They are not by default transferred to other Gateway Servers, or shared with a Routing Server. The route exists locally on that Gateway Server.

The benefit of a locally defined route is that it is simple to configure, since it does not require a Routing Server to be used. It is also efficient, since it is available locally to the Gateway Server, so it can be found immediately without making a request to a distant Routing Server. The drawback to a local route is that if there are a large number of Gateway Servers, it becomes difficult to administer local routes on each Gateway Server.

However, local routes are an important part of the dynamic route scheme, described below. Local routes can be exported to a routing server. Exported routes are not an exact duplicate of the locally defined route, and are considered to be a different kind of route. However, dynamic routes (exported local routes) are derived from the information contained in a local route. Dynamic routing is defined in more detail below, and how a local route is transformed into a dynamic route is described in the section on Routing Servers. A configuration panel specific to local routes determines whether or not a particular route will be exported and transformed into a dynamic route. This panel appears when creating or modifying local routes and includes the following information:

Enable Export. If this flag is selected, then the route will be exported to the Routing Servers listed in the export list.

Export List. This list contains the names of the routing servers to which the route should be exported. Routing Servers and exporting routes is described further in the section on Routing Servers below.

Static Global Routes

Static global routes are routes that are statically defined on a Routing Server. They are very similar to local routes, but since they are defined on a Routing Server, numerous Gateway Servers can query them. Static global routes are not downloaded to the Gateway Server; rather, when a Gateway Server wishes to place a call to a particular number, it will ask the Routing Server for any routes that match the number entered by the user. The Routing Server will return any static global routes that match the query (in addition to any dynamic routes, described below).

The advantage of using static global routes is that it simplifies administration, even across a relatively large number of Gateway Servers. Static global routes generally require consistency between the configuration of Routing Servers and the configuration of Gateway Servers. For example, if a Routing Server directs all calls to a particular number to a Gateway Server (a network route), that Gateway Server will need a matching telephony route enabling it to place the call on the telephony network. In some cases, however, Gateway Servers should query the Routing Server at the time of the call in order to obtain those routes which can increase call setup time.

Setting up static global routes is described further in the section on the Routing Server below.

Disseminated Routes

Disseminated routes are routes that are defined on the Routing Server, but distributed to Gateway Servers at the time that the Gateway Server connects. Unlike static routes, the Gateway Server does not query the Routing Server for disseminated routes at the time of the call; rather, it simply consults.

The advantage of using disseminated routes is that a single route can be disseminated to multiple Gateway Servers, without requiring any work for each Gateway Server that is to be disseminated to. Any change made is automatically propagated to all Gateway Servers. At the same time, because each Gateway Server has a local copy of the disseminated route, routing remains highly efficient. However, in some cases, when using static routes and disseminated routes there is a need to maintain consistency between the routes for the originating Gateway Server (a network route) and the terminating Gateway Server (a telephony route).

Setting up disseminated routes is discussed further in the section on the Routing Server below.

Dynamic Routes

Dynamic routes are routes that are exported dynamically by Gateway Servers to the Routing Server. When a local route is marked for export, it is transformed into a dynamic route, and is available on the Routing Server to be queried by other Gateway Servers.

There are several advantages to using dynamic routing. Firstly, it simplifies administration since routes can be shared between Gateway Servers effortlessly. Secondly, it does not have the consistency problem of static and disseminated routes whereby the pair of network and telephony roues must match. This is because the exported route will normally be transformed from a telephony route into a network route; but all other information in the route will remain the same. Thirdly, it improves the resilience of the routing process to the failure of a Gateway Server; if a Gateway Server fails, its routes will automatically no longer be available, and other Gateway Servers will route calls as if the Gateway Server that crashed did not exist. Normally, Gateway Servers would try to route to the failed Gateway Server, and only after a timeout occurred would they fallback to alternate routes. The disadvantage, however, of using dynamic routes, in some cases, is that the Gateway Server must query the Routing Server at the time of the call, increasing call setup time.

It is not necessary to actually set up dynamic routes, since Gateway Servers export them based on information in a local route. The parameters that affect the transformation process are discussed below in the section on Routing Servers.

Dynamic Caching

Above, the four types of routes were presented. Among those types, static roues and dynamic routes had the disadvantage that it is necessary to query the Routing Server on a per-call basis to obtain the routes for that call. This increases the call setup time, which may be critical in some applications. To reduce the impact on call setup time introduced by these two types of routes, the routing manager built into each Gateway Server is capable of caching routes that are obtained dynamically for the Routing Server. This feature is discussed when describing the routing manager, below.

Summary

The following table presents a comparison between the four different kinds of routes, and is a summary of their benefits and disadvantages in certain examples:

| Item | Local | Static | Disseminated | Dynamic |
| --- | --- | --- | --- | --- |
| Configured On | Gateway Server | Routing Server | Routing Server | Routing Server |
| Call Setup Overhead | No | Yes | No | Yes |
| Route is Shared With | No Sharing | All Gateways | Selected Gateways | All Gateways |
| Must Configure Pair of Routes | N/A | Yes | Yes | No |
| Auto-Disable on Failure | No | No | No | Yes |

Routing Manager

The Routing Manager is a built-in component of the Gateway Server. It is responsible for making all routing decisions, and for managing all the routes used by the Gateway Server. The Routing Manager has the following responsibilities:

Maintaining the database of local routes;

Establishing and managing connections to the Routing Servers in the network;

Exporting routes to the Routing Servers, and importing disseminated routes from the Routing Servers;

Obtaining static global and dynamic routes from the Routing Servers, and caching those routes for future use;

Finding all matching routes for a particular number dialed by the user, and prioritizing those routes.

The main configuration page for the Routing Manager is found under the "Routing" root level node of the configuration tree. Expanding this node will show the other options available. A window appears as described below.

Clicking on the "Change" button allows the general settings to be modified. There are three parameters that can be configured, as follows:

Dynamic Routing Usage. Selects when a query is issued to the Routing Server in order to obtain routes dynamically. (This includes obtaining statically configured global routes, not just dynamic routes). There are five options, as follows:

Always. If selected, Routing Servers (if any) will be queried on each call to obtain dynamic and static global routes.

Never. Routing Servers are never queried for dynamic and static global routes.

Use if no Cached Routes Available. The Routing Server will be queried only if no routes in the dynamic cache match the number that was dialed by the user.

Use if no Local/Disseminated Routes Available. The Routing Server will be queried only if there are no matching local routes, and no matching disseminated routes.

Use if no Routes Available. The Routing Server will only be queried if no routes exist that can be used to place the call. This requires that there are no matching local or disseminated routes, and the dynamic cache has no routes that match the number entered by the user.

Cache Timeout. Entries in the cache need to have a maximum lifetime after which they are no longer valid, since cached routes do not reflect any possible changes that occurred on the server. This parameter allows one to specify the lifetime of routes stored in the dynamic cache.

Base Error Filename. This parameter allows one to configure the base filename for error logging. Date and session information will be appended to form the final filename.

Route Ordering. This setting allows control over how routes are prioritized. If multiple routes are available for a number entered by the user, these parameters will be used to control the order in which those routes are tried. Clicking "Change" allows the list to be modified. It is possible to move each parameter up or down to select the order in which priority will be determined. For example, if "By address" is the top entry, followed by "Cost estimate", then when comparing two routes, the route with a better address score (described below) will be ordered first. If, however, the two routes have the same address score, they will be ordered based on their cost estimates. If they are the same on the cost estimate, then the next parameter in the list will be used.

In ordering routes, "By Address" refers to how many exact digit matches occur in the address. For example, if the user dialed +1(703)5551234, a route to +1(703)555NNNN would receive a score of 7, whereas a route to +1 (703) NNNNNNN would only receive a score of 4. Higher scores are more preferable.

Routing Server List. This list shows the Routing Servers that the Routing Manager interacts with, and shows the current state of the connection to that Routing Server. Routing Servers can be added and removed, or their settings can be modified. When adding or modifying a Routing Server entry, a significant amount of configurable parameters can be specified. These parameters are discussed below.

Local Route Configuration

Local routes were already described at length previous sections, and how to configure a local route has been explained. In order to access the local route list, double click on the "Local Routes" node, under the "Routing" root level configuration tree node. This will display the local route list, from which local routes can be added, removed, or modified.

Dynamic Cached Routes

The Dynamic Cached Routes window, which can be viewed by double clicking on the "Dynamic Cached Routes" node under the "Routing" node, shows the dynamic routes that are currently cached by the Routing Manager. This display is for information purposes only, and, in one example, does not provide any controls that can be used to make changes to the configuration of the Routing Manager.

Routing Server Settings

When adding or modifying a routing server, a large number of configuration parameters are available. These configuration parameters are split into seven panels, each of which are described below. Note when viewing the configuration for a routing server that it is necessary to click on the change button in order to modify the configuration.

General Panel

The general panel is used to specify general information about the routing server. Each of the parameters is discussed below.

Server Name. Defines a local name for the server. This name is used when identifying which servers local routes should be exported to. Note that the server name cannot be modified once a server has been added.

IP Address/Port Number. Defines the IP address of the Routing Server. The port number should be left at the default unless one is specifically running a Routing Server on a different port number.

Send Exported Routes to Server. This parameter can be used to prevent any routes from being exported to the server. If this parameter is not enabled, then no routes will be exported even if individual routes indicate that the route should be exported.

Accept Disseminated Routes from Server. If checked, then any routes disseminated by this Routing Server will be accepted. Otherwise, routes will not be accepted from the Routing Server. If dealing with a Routing Server that is not trusted, disseminated routes should not be accepted since they can instruct a Gateway Server to place long distance calls via the telephone equipment to anywhere.

Search Order. Multiple Routing Servers can be configured. Search order controls the order in which Routing Servers are used to obtain routes dynamically. All Routing Servers marked "First" will be searched first. If all Routing Servers fail to find any routes, then all Routing Servers marked "Second" will be searched. This progresses until either routes are found, or no more Routing Servers are available to be searched.

Exported Routes Usage

The exported routes usage panel allows one to override the settings of local routes that are exported to the routing server. This is part of the transformation process that a local route undergoes when it is transformed into a dynamic route. Exported routes will usually have their usage information changed. The Routing Manager makes these changes before the route is sent to the Routing Server.

Exported Routes Access

The exported route access panel allows the route access settings in a local route to be replaced. Normally, it is desirable to remove route access settings sent to the routing server, since each Gateway Server will determine what route access conditions should apply. Configuration of the route access settings is identical to the configuration performed when defining the local route.

Exported Routes Ordering

When exporting a route to the routing server, it may be desirable to customize ordering information prior to actually exporting the route. The exported routes ordering panel allows one to do this and includes the following information:

Usage. Allows one to specify whether the ordering information in a route will be overridden.

Preferability. If one is overriding the ordering information contained in the route, this field allows one to specify the preferability parameter that will be applied to the exported route.

Cost Estimate. If overriding the ordering information contained in the route, this field allows one to specify the cost estimate that will be applied to the exported route.

Imported Routes Access

The imported route access panel is used to replace the route access information on routes imported from the Routing Server. Often, each individual Gateway Server may define its own users, and its own set of permissions on what calls can be made by the user. However, routes from the Routing Server will typically not contain access settings that implement the desired behavior. This panel allows route access information to be overridden to implement the local policy for route access. Configuring the route access information is identical to configuring the route access table for a local route.

Imported Routes Ordering

The imported routes ordering panel is identical to the exported routes ordering panel, but is used to modify imported routes obtained through a dynamic query.

Routing Servers

The above sections described the principles of routing in the present invention, and discussed the Routing Manager that is part of the Gateway Server. An important component that was referenced significantly in the above discussion is the Routing Server. The Routing Server is a critical component in facilitating the exchange of routing information between different Gateway Servers, and for centralizing and simplifying the administration of routes.

This section describes the Routing Server, and how it can be used to deliver the routing capabilities described above. The sections below describe different aspects of the Routing Server.

The main routing server configuration window can be viewed by double clicking on the "Routing" root node of the configuration tree, when connected to a Routing Server. This window is described below and allows client setup to be performed.

Routing Clients

The top part of the dialog can be used to configure the list of routing clients that are allowed to access the Routing Server. These clients are Gateway Servers that are set up to connect to the Routing Server. Unless a client entry exists for a connecting Gateway Server, the connection will be denied.

When adding or modifying a client entry in the client list, several settings can be configured. These settings are described below. The configuration of each client is divided into four panels.

General Panel

The general panel is used to specify general settings regarding the client. The general panel is explained below.

Disseminate Routes to this Client. This field controls whether or not any routes can be disseminated to this client, and must be enabled to allow routes to be disseminated. If disabled, this parameter overrides the dissemination settings in individual routes.

Client Name. Provides a descriptive name for the client. This name is for information purposes only.

Local Alias. Routing clients may have a local alias. Multiple clients may share a single local alias. The purpose of this local alias is to provide a simplified means for identifying a client, or multiple clients. Aliases are the first level of grouping, and all clients are required to have an alias. If one does not require the first level of grouping, then one should simply use the client name as the alias name.

Description. The description allows text to be entered for informational purposes only. This information is not used by the system.

List of Identities. This field contains the list of identities that are associated with this client entry. The configuration of the identities is identical to the configuration explained herein when setting up the management client access list. The same procedure should be followed when setting up a routing client entry; the only difference is that this list controls the Gateway Servers that can access the routing client for routing purposes. Placing an identity in this list does not allow that entity to connect for administrative/management purposes.

Groups Belonging To. This list provides an easy way to add the client being configured into routing groups, which are described below. It also provides a simplified way of determining which groups the client is already a member of. However, it is necessary to take care when modifying group membership, since ALIASES are members of groups, not individual clients; thus, removing group membership removes the membership of the entire alias.

Routing Usage Panel

The routing usage panel allows usage information in routes exported by the client to be replaced with specific routing information. Normally, this is used if the exporting Gateway Server is not fully trusted, and it is desired to ensure that all exported routes received from that Gateway Server are directed to the IP address of the exporting Gateway Server. The operation of this panel, however, is identical to the one found when configuring the Routing Manager component of the Gateway Server, and is described in the previous section.

Routing Access Panel

The routing access information supplied in routes exported by individual Gateway Servers may not match the routing access information that it is desirable to export network wide. For example, a Gateway Server might define route access settings that only apply to its local users; the network wide scheme might specify different route access settings. This panel allows the route access information supplied in routes exported by the Gateway Server to be overridden using settings that are defined on the server. The route access list is defined exactly the same way as for a local route.

Exported Routes Ordering

Similar to usage information, it is possible to override the ordering information supplied in a route exported by a Gateway Server. This panel allows this to be performed in an identical manner to the way it is performed by the Routing Manager on the Gateway Server side.

Routing Groups

The Routing Server allows the definition of groups of aliases. Wherever an alias name can be supplied, such as in the list of Gateway Servers to which a route can be disseminated, it is possible to use a routing group name instead. This permits large scale operation of the Routing Server. For example, consider a Routing Server that manages routing across four carriers each of which has 10 Gateways in each of three countries. This is a total of 120 Gateway Servers. Each one would have a client entry, allowing it to connect to the Routing Server. For each carrier, three aliases would be defined—one for each country served by that carrier. At the group level, each carrier would have the aliases for each country grouped into a single group entry for that carrier. This would allow a route exported by one carrier to be available by the three other carriers, but would still allow a particular route to be disseminated to all the Gateways in one particular country.

Routing groups can be added and removed from the general panel shown above. The only thing required to create a routing group is the name of the group. Once created, members can be added or removed from the routing group.

Exported Routes

The Exported Routes window is available by double clicking the "Exported Routes" node under the "Routing" root node in the configuration tree. This window displays all exported routes that are currently present on the Routing Server, and the name of the Gateway Servers that exported those routes. This window is described below. One should not make any configuration changes using this window, but it is possible to use this window to verify that routes are being exported successfully.

Static Routes

Static Routes can be configured on the routing server by double clicking the "Static Routes" node, located below the "Routing" root node in the configuration tree. The list of routes statically defined on the Routing Server will be displayed, as shown below. The route list is a standard list that allows routes to be added, removed, or modified.

When adding or modifying entries in the route list, the route properties page is identical to that for a local route, except that the export list is not present.

Disseminated Routes

Disseminated routes can be configured in the same way as Static Routes. The dynamic route list is available by double clicking on the "Disseminated Routes" node, located below the "Routing" root node in the configuration tree. The display is almost identical to that for static routes.

When adding or modifying routes that are contained in the disseminated routes list, an additional panel will appear that allows control over the clients to which the route will be disseminated. The panel includes the following information:

Disseminate to All. If selected, this flag will cause routing data to be disseminated to all clients that do not explicitly disable dissemination of routes.

Dissemination List. This list provides the name of all aliases and groups that are defined on the Routing Server, to which this route will be disseminated. Unless disseminate to all is selected, only clients in this list will receive the route being configured.

Alias/Group List. This list provides a list of all aliases and groups to which this route is currently not disseminated. Entries can be moved from this list to the dissemination list (to add it to the dissemination list) or vice versa (to remove it from the dissemination list).

Database Basics

This section introduces the basic principles of operation behind the Database Server, as well as how Gateway Servers access the Database Server. This section provides the background knowledge necessary to understand and configure the services that depend on the Database Server, which are discussed in the following sections.

This section is divided into two sections, as follows. The first section deals with database issues on the Gateway Server side. The second with general issues on the Database Server side.

Gateway Access to Database Servers. Describes how a Gateway Server can be configured to access multiple Database Servers, and how multiple Database Servers can be used with each of the services provided via the Database Servers.

Database Server General Setup. Explains the use of the Management system to modify general Database Server settings.

Database Server Access Control. Describes how to configure the clients of the Database Server, a necessary step in order to allow Gateway Servers and Provisioning Systems to connect to and make use of the Database Server.

Gateway Access to Database Servers

Similar to the Routing Manager component of the Gateway Server, discussed in the previous section, a Database Manager component also exists as part of the Gateway Server. This component is responsible for managing access to Database Servers, and for coordinating requests issued to multiple Database Servers. Double clicking on the "Database Server Access" root level node of the configuration tree accesses the Database Manager configuration dialog. These directions should be performed when connected to a Gateway Server, not when connected to a Database Server.

The Database Server list is a standard list, like the Routing Server list, of the Database Servers that the Gateway Server being configured has access to. When adding or modifying an entry in the Database Server list, the following dialog will be displayed, allowing one to enter information about the server:

Server Name. Name of the server being configured. This name will be used to identify this server entry when configuring the services that make use of Database Servers. Once the server has been added, the name assigned to it cannot be changed.

Host Name/Port Number. The hostname or IP address, and port number, of the Database Server that is being configured. The port number should be left at the default value unless you are specifically operating a Database Server on a different port number.

The Database Manager component allows Database services, described in the following two sections, to access any of the servers that are available. The configuration of how servers are accessed is similar to that for routing. Like routing, ordering information can be supplied that determines what order the servers are used in. Database Servers are organized into groups, much like Routing Servers are placed into ordering levels. Operations are performed on every Database Server in group #1. If none of them handle the operation, then the operation is retried on every Database Server in group #2. This continues until no more groups are defined, or until at least one Database Server processes the operation successfully. There are two main differences, however, between Database Server request processing and Routing Server request processing:

A Database Server can be in more than one group. For example, Group #1 could contain Server A and Server C, and Group #2 could contain Server B and Server C.

Ordering/Grouping information is configured on a service-by-service basis. For example, the User Management service could use a different set of servers than the CDR Collection service.

Database Server General Setup

The ExpresConfig program was used to perform the initial set up of the Database Server. In the event that a change to the configuration of the Database Server is necessary, the Management System should be used to make the change. Using the Management System to administer such items as the management access control list, or identification/authentication configuration was discussed in above. However, it may also be necessary to make changes to the data source configuration that controls how the Database Server establishes a connection to the underlying Database.

When connected to a Database Server using the Management System, double clicking on the "Database" root level node will display the main Database Server window. By clicking on a "Change Settings" button, it is possible to modify the general server settings that define the data source and database settings. Note that one should not change the port number under normal circumstances.

It is necessary to restart the Database Server in order for changes to the server settings to take effect.

Database Server Access Control

The Database Server manages a significant amount of critical data. User records and call records are essential to the correct operation of the system, and significant possibilities for fraud exist if an unauthorized user is able to obtain access to modify or even just to view the data that is managed by the Database Server. For this reason, it is necessary to control access to the Database Server.

Database Server access control works in the same way as management access control, and Routing Server access control. Like the Routing Server, it is necessary to create a client entry for each Gateway Server that connects to the Database Server. It is also necessary to create a client entry for every Provisioning System that accesses the Database Server. The client list can be modified through the bottom portion of the main database window.

The configuration of a single database client is significantly simpler than for routing clients since groups and aliases are not required in setting up the Database Server.

User Management

This section covers the management of end users of the present invention, and describes the aspects of the system that are specific to handling details associated with the end users of the present invention. All aspects of user account setup, grouping of user accounts, accounting for calls made by users, setting up of debit information for users, and other such information is discussed in this section.

This section is divided into several sections that deal with different aspects of user management. The sections are as follows.

User Management Concepts. Discusses the main ideas of user management in the present invention. The main types of records that are maintained for the purpose of user management are discussed, and the interaction between these records is explained.

Gateway Server Access to Users. Describes the user management service that is part of the Gateway Server, and how it needs to be set up to obtain user records from the Database Server.

Managing User Records. Describes how the Provisioning System can be used to set up and manage user accounts.

Managing Group Records. Shows how to use the Provisioning System to set up and manage group records.

Managing Account Records. Demonstrates the setup and management of account records, including debit capability.

User Management Concepts

This section begins with a description of the fundamental purpose behind user management. Most importantly, user management is not necessary for certain applications. Most often, the purpose of user management is to allow an operate to charge for services provided by the present invention . For many enterprise applications, the identity of the user that is making a call using the present invention is unimportant, as is collecting records of all calls made by particular users. However, in providing a revenue generating commercial service, user management is critical.

User management provides several key things:

Identification and authentication of users. Without management of users, it would not be possible to distinguish between legitimate users, and unauthorized users of the system. Sometimes, the telephone equipment connected to the Gateway Server accomplishes this, but generally, user management is required in order to perform user verification.

Classes of service. In order to offer different classes of service (differentiated by numbers that can be called, or the quality of routes used to call those numbers), it is necessary to differentiate between users. User management is required in order to do this. For example, it may not be desirable to provide all users with the capability to call internationally.

User-specific behavior. Some preferences and configuration may vary from one user to another. An example is the language preference of the user. This parameter may differ from user to user, and hence, it is necessary to differentiate between users.

Billing and Accounting. In applications where it is necessary to charge for services, it is necessary to identify the users that should be charged for the service, unless there is only one user of the system (which is usually not the case).

Debit Capability. When the debit capability of the Gateway Server is being used, it is necessary to manage users and their balances.

In the present invention system, all records associated with user management are stored on the Database Server. Other components of the system, such as the Gateway Server, must communicate with the Database Server in order to obtain those user records. This simplifies control over access to the underlying database, and allows multiple Gateway Servers to share the user database. Of course, since multiple Database Servers can be operated, it is not necessary for all Gateway Servers to use only a single database of users.

User Records

In order to provide the services described above, it is necessary to maintain a record of each legitimate user of the system. With that record, it is necessary to store information, such as their language preference. A user record is the piece of data that contains most of the information that is relevant to the user. It contains things such as:

General information about the user, such as their name;

The ID and password that a user requires to access the system;

Additional identifying information, such as Caller ID, that can be used to automatically identify or authenticate the user;

Preferences of the user that customize system behavior;

The access level of the user to system services;

Limited billing and accounting settings for the user.

An important piece of information in the above list is that only limited billing and accounting settings are stored in the user record. Most billing and accounting related settings are actually stored in account records, which may be associated with multiple users. The purpose of separating accounting information into a separate account record, described below, is to allow a single account to be shared by a group of users. For example, a corporate calling account might allow a group of users to be billed jointly, while still providing individual users with their own IDs and passwords.

Group Records

Group records are closely related to user records. The purpose of group records is to allow classes of users to be defined. A user may be part of either no group, or one group. If a user is part of a group, then certain settings in the user record may be left undefined, and specified instead by the group record By taking this approach, rather than specifying all information directly in the user record, it is possible to make changes that affect a group of users simultaneously. For example, consider issuing a batch of 2000 demonstration calling cards. If these calling cards need to have an expiration date, and each calling card had a separate user account associated with it, then it would be necessary to specify the expiration date for each one of those calling cards. If it was desired to change the expiration date for that entire batch of calling cards, then every record would need to be updated, or specialized tools for provisioning the database would need to be used. Instead, it is possible to create a group record, associated with the user record for each card, and to make a single change to the group record.

For certain fields in the user record, it is possible to specify that the value in the associated group record should be used as the value of that field. For example, the expiration date in a user record could be set to "use group record settings". With this setting, the group record would determine what the expiration date of the account was. These settings can be made on a field-by-field, user-by-user basis. For example, consider two user records associated with the same group record. User record #1 could specify an expiration date of Jan. 1, 2002, but with privilege levels defined by the group record. User record #2 could have a group specified expiration date, but with a privilege level of 2. This provides the flexibility of using group records to represent default settings, while permitting specific changes and exceptions on a user-by-user basis.

Much of the information in a user record can be left unspecified, and determined by the values in the corresponding group record. These fields include, but are not limited to:

Start and expiration dates for the account;

Privilege levels, both normal and authenticated;

Preferences, such as authentication requirement and language settings;

Time of day usage restrictions;

Billing and accounting information.

In general, because the use of group records in no way restricts the customization of each individual user record, it is recommended that group records are used to specify options that are common across a group of users.

Account Records

Account records provided the basis for real-time debit in the present invention system. Although account records can be used in post-paid applications, it is often not necessary to do so. This is because a third party billing application that prepares bills using the call detail records is provided with data that identifies the exact user that made a particular call. From this point, the third party billing application could use its own rules regarding whether the call should be billed to the user, to a shared account, directly to a credit card, or in some other manner.

However, for real-time billing using the debit capability of the software, it is necessary to define an account record. Account records define properties that are used for billing, and may be associated with credit records, to limit the amount of credit extended to a user, or with debit records, which are used to provide real-time billing. Credit and debit information maintained by the system is always associated with an account record.

Remote Gateways and User Management

It is desirable to apply many of the capabilities provided by user management to Gateway Servers as well as to end users. For example, it might be desirable to have a debit account for a particular Gateway Server, or to control the permission levels granted to different Gateway Servers. In order to facilitate this, the Gateway Server is capable of associating a user account with remote Gateway Servers that request calls.

The mechanism for performing this association is by using the Remote System ID, a configurable parameter on each Gateway Server. This ID is used as if it was Caller ID information, and is used to look up a matching user record. Details on setting this up are described below, in the section on managing user records. It is also possible to use authentication information in the user record to verify the IP address of the remote Gateway Server.

Gateway Server Access to Users

This section describes how to set up the user management service on the Gateway Server. As described in the previous section, database services each supply an independent list of the Database Servers that are to be used, grouped according to the order in which they should be used, to obtain user records. For Gateway Servers performing user management, the principle type of operation used is that of obtaining a user record from the Database Server. It is generally not necessary for this kind of operation to perform the operation on multiple Database Servers at the same time. However, it may be desirable to fallback to an alternate Database Server to obtain the user record if the normal Database Server that provides user records are obtained is not available. This section describes how to perform such a configuration of the user management service on the Gateway Server.

The server access settings for the user management service can be viewed by double clicking the "User Management Service" node, visible when the "Database Server Access" root level node is expanded. The server settings will be displayed.

It is possible to see the definition of groups, and the members (i.e. Database Servers) that are members of each group. For the reasons explained above, there should normally be one Database Server configured in each group. The primary server from which user records are obtained should be in Group #1. The secondary server should be in Group #2, and so forth. It is possible to add the name of a Database Server that is in a particular group by selecting the Group, then clicking on Add Member. The names entered for Database Servers must be selected from the list of configured Database Servers.

Managing User Records

The Provisioning System is used to manage all user records. In order to use the Provisioning System to access the user records managed by a Database Server, it is necessary to ensure that one has a user management session open in the provisioning system. Once a user management session is open, one is presented with a query screen.

From this screen, one is able to query the database of existing users, add new users, remove users, and modify existing users. Note that there are two buttons: "User Properties," which is used to get details about a particular user, and "Modify," which is used to change an existing user record.

When adding or modifying a user record, one will be provided with a user information dialog that consists of a number of panels. This is discussed in the subsections below. However, prior to modifying a user record, you will need to query for the records that you wish to modify. This is also required if one wishes to remove a user record. First, using the interface shown above to query existing user records is discussed.

User Record Queries

The user record query screen is the main interface to user management capabilities on the Provisioning System. This screen allows user records to be searched, based on various criteria.

In order to query available user records, one or more query options can be specified. User records can be queried by a variety of fields, including name, ID, and authentication code. When specifying the search criteria, it is possible to use '*' as a wildcard that will match any string. For example, entering "12*" as the User ID search criteria will find all user records beginning with 12. Once the search criteria are entered, the ordering parameter for results should be selected. This controls the order in which the results are displayed. Once this parameter has been set, clicking on Query will begin the search for matching user records.

Once the query is complete, the results will be displayed, and the "Close Query" button will become selectable. The "Close Query" will close the query, and allow a new query to begin. Once a query is closed, it is no longer possible to travel forward and backward through the results. However, any user records displayed in the result window can still be selected, and viewed or edited. If there are more user records matching the query than can be displayed at a time, the "Next" and "Previous" buttons will allow scrolling through the matching user records.

Whether or not a query is active, it is possible to add a user by clicking on the "Add User" button. However, the other operations require that a user record in the result window of a query be selected. Once selected, the user record can be removed, viewed, or modified.

User Record Information

There are six panels that are used to display information about a user. Each one of these panels is discussed below.

Identification Panel

The identification panel contains information that is used to identify and authenticate the user, as well as some general settings for the user account, as follows:

Name. Name of the user. This field is used for information purposes. The name field is optional, but once a user has been added, the name for that record cannot be modified.

Numeric ID. This is the ID of the user. Since users generally access the system using a telephone, it is required that the ID only contain numbers that can be entered using DTMF tones. The ID of the user must be unique.

Authentication. This group of fields specify whether it is automatically necessary for the user to specify their authentication code. Before a user enters their authentication code, they will be assigned their normal privilege level. Once their authentication code has been entered, they will be granted their authenticated privilege level. If a user is required to always enter their authentication code, they will be prompted to do so regardless of whether or not the service that they are accessing actually requires that privilege level. Otherwise, if they are not required to always enter their authentication code, they will only be asked for their authentication code if it is necessary in order to make use of a service that they have requested access to. It is possible to use the settings defined in the associated group record for this field by choosing "Use Group".

Language Preference. Specifies the language preference for the user; if left blank, the default language will be used.

E-mail Address. Used to record the E-mail address of the user. Available for information purposes only, and can be left blank.

Home Phone. Home telephone number of the user. Available for information purposes only, and can be left blank.

Online Announcements. Specifies which announcements the user wishes to hear when making debit calls. If "debit balance" is selected, then the user will be told their remaining balance each time they place a call. If "time left" is selected, then the user will be told the maximum duration of a call each time a call is placed. If "use group" is selected, then debit balance/time left prompting will be performed based on the group record setting for the value.

Permissions Panel

The permissions panel is used to configure the access level, and account active dates for the user account. The permission panel is described below.

Account Status. This field allows an account to be enabled or disabled. Group settings can also be used to determine whether or not an account is enabled.

Permissions. Determines the normal and authenticated privileges assigned to this user account.

Activation Date/Time. Sets the date and time when the account will become active. The account may only be used on or after the time specified. It is possible to use the group value for this setting.

Expiration Date/Time. Sets the date and time when the account will expire, and become unusable. The account may not be used after the specified time. It is possible to use the group value for this setting.

Caller ID Identification Panel

This panel allows additional identifying information about the user to be entered. When a user accesses the system, identifying information may be available. Examples include Caller ID information signaled by the telephone equipment, the H.323 terminal name of an H.323 user, or the remote system name of a calling Gateway Server. Any of this information can be used to automatically identify a user, without requiring them to enter their ID. This panel allows you to configure the information that can be used to automatically identify a user.

In order to add new identifying information for a user, type the value associated with that information in the New String field. For example, if the Caller ID string that should be used to identify the user is 7035551234, then enter this string in the New String field. Once the string has been entered, click Add. A new entry in the table, with the corresponding string, will be added. Once it has been added, click on the lookup type column for that string. One will be able to select what type of identification the new string corresponds to. The available options are:

Caller ID/ANI. The entered string will be matched against Caller ID information provided by the connected telephone equipment.

H.323 terminal name. The entered string will be matched against the H.323 terminal name supplied by the user when connecting using the H.323 protocol.

Remote system name. The entered string will be matched against the system name supplied by a remote Gateway Server.

In order to remove an identifying string, simply select it and click Remove.

Note that identifying information must be unique; in other words, the same Caller ID string and type cannot be associated with more than one user record. This is clearly necessary since the information is used to uniquely identify a particular user.

Caller ID Authentication Panel

This panel is the analog of the identification panel just discussed, but applies to authentication of the user. It is configured in a manner that is very similar to the identification panel discussed above.

As with the identification panel, it is necessary to type in the authentication string, and click on Add in order to add an authentication record with that string. Then, click on the lookup type column to specify what the lookup type for that string should be. There are numerous authentication types, some of which are for expansion purposes.

Caller ID/ANI. This allows caller ID information to be used to authenticate the user. This allows a single Caller ID string to be associated with multiple users, and allows Caller ID to bypass password checking. For example, it is possible to set up a calling card account that when used from the users home, requires only the users ID to be entered, but when used from a payphone, requires both the user ID and authentication code.

IP address and port. Must be entered in "192.168.1.3 port 6789" format, and will authenticate the user only if their IP address and port number match the specified values.

IP address only. Must be entered in "192.168.1.3" format, and will authenticate the user only if their IP address matches the specified IP address. IP address with netmask. Not currently used for authentication purposes.

PIN code. This authentication type is not presently used, since the authentication code is contained in the basic user record settings.

Text password. Not currently used for authentication purposes, designed for enhanced applications in the future.

Note that the reason that there are some additional types is that third party applications could make use of these types even though they are not directly used a Gateway application.

As with the identification panel, authentication entries can be removed by selecting the entry and clicking on "Remove".

Account Record Status Panel

The account record status panel is used to display information about the account record that is associated with this user record. It allows an account record to be selected or created, and is described below.

Clicking "Select New" will allow the selection of an account record that is associated with the current user record. It is possible to select either an existing account record, or to create a new account record associated with the user record. When select new is selected, the account record query window will be displayed, allowing existing account records to be searched. This process is described in greater detail when account records are discussed, below.

The "Change Settings" button allows the account record associated with the user record to be modified.

The "Detach Account" button will remove the association between the account record and the user record.

Parent Group Panel

The parent group panel displays information about the group associated with this user record, if any, and allows the group association to be changed.

Clicking "Select New" will allow the selection of a group record that is associated with the current user record. It is possible to either select an existing group record, or to create a new group record. This is done by way of the group record query window, which will allow you to search for the group record that you wish to add. The group record query screen is discussed in greater detail below.

The "Detach Group" will remove the association between the user account and the group record with which the user account is currently associated.

Managing Group Records

The management of group records is very similar to the management of user records, since group records mainly provide default values for user record fields. The group record query page, from which group record operations can be performed, is accessed via the user record query page, by clicking on the "Group Records" button. The group record query page is discussed in the sections that follow.

Group Record Queries

Querying the available group records on the system works very similarly to querying user records. The first step is to specify the search criteria, by entering information into the fields on the left that correspond to the group records that you wish to retrieve. As with user records, it is possible to use wildcards when searching for group records. Ordering parameters can also be set, following which it is possible to query for group records.

Once results have been returned, group records work identically to user records; it is possible to close the query, scroll forward and backwards using the "Next" and "Previous" buttons respectively, and to add/remove/view/modify group records.

Group Record Information

The information available in the group record is a simplified set of the information contained in the user record, since not all user record fields can be left as defined by the group record. There are two panels that provide access to the fields contained in the group record, each of which is described below.

General Panel

Most settings are available on the general panel. For an explanation of any of the parameters shown, refer to the corresponding parameter in the user record, where the parameter is actually described. User records will only use values specified in the group records if the corresponding user record values indicate that the group record should be used to determine the value.

The account ID setting works identically to that for the user record, but will establish an association between the group record and the account record.

The only group record specific information is the "Group Info" field, which allows descriptive information about the group to be entered. This information is for descriptive purposes only, and does not affect the behavior of the system.

Managing Account Records

Management of account records can be performed through the account record query screen, accessible by clicking on "Account Records" when viewing the user record query screen in the Provisioning System. This brings up the account record query window.

Account Record Queries

The account record query window functions in the same manner as for user records and group records. The first step is to input query information in the fields on the left, the second is to select ordering settings, and finally, the third step is to click on the "Query" button. Like user and group records, it is possible to scroll through available account records using the "Previous" and "Next" buttons.

The "Add New" button allows new records to be added; once a query result has been selected, the "Remove", "Properties", and "Modify" allow the account record to be deleted, viewed, or modified, respectively.

Account Record Information

Account record information is administered in two panels, each of which is described below.

General Panel

The general panel allows general account record information to be configured. An explanation of the fields follows.

Account ID. Specifies the ID of the account. This ID is referenced by user records and/or group records, and must be unique. If account records are uniquely associated with a user record or group record, it may make sense to adopt a scheme where the account ID and user/group ID are identical.

Has Debit Record. Indicates whether or not a debit record is associated with this account record. This is required in order to provide debit capability.

Balance. If a debit record is associated with this account record, then this field specifies the balance, in dollars, of the account.

Maximum Negative Debit. Specifies the maximum amount that the account record can be in deficit. Normally, this parameter will be set to zero, but if it is necessary to grant an account the capability to go into debt, then this can be set to a non-zero value.

Max Connections. Controls how many concurrent uses of this account are possible. This is used to restrict how many users may simultaneously make use of a single account. For group calling cards, it may be desirable to allow many users to simultaneously make use of the account, but in some cases, it is desirable to prevent multiple users from using the account at the same time. Note that even if concurrent usage is allowed, fraud is not possible through making concurrent calls—both calls will be debited, in real-time, from the account.

Account Information. This is an informational field that can be used to record comments about the account.

Profiles and Restrictions Panel

The profiles and restrictions panel, described below, is used to control the rating of calls, and modes of operation which are supported on this account.

Rating Profile. This parameter is not currently used by the billing/rating process.

Enable Debit. Enables debit to be used on this account. Requires that an associated debit record exists in order to actually enable debit.

Enable Credit. Enables credit to be used on this account.

Enable Billing Exempted. If set, this flag exempts the account record from being charged for any use of services.

CDR Collection

This section presents call detail record (CDR) collection, and explains how this task is accomplished in the present invention.

CDR collection is essential in any environment in which charges are applied for the services provided by the present invention. A Gateway Server will create a CDR for every call that is placed through the system. CDR collection is the process of collecting the CDRs across multiple Gateway Servers, and storing them in a centralized database. As such, CDR collection involves the Database Server as well as the Gateway Server.

The discussion of CDR collection is divided into three main sections:

Querying CDRs on a Database Server. Explains how the Provisioning System is used to access the CDRs that are available on a Database Server.

Information in a CDR. Describes the information in a CDR, and the meaning of that information.

Gateway Server Collection of CDRs. Describes the process by which the Gateway Server collects CDRs, and how it transmits these CDRs to a Database Server, or to multiple Database Servers.

Database Server Failure Handling. Describes how the Gateway Server handles inserting CDRs in light of a temporary failure of the Database Server to which the CDR is inserted.

Querying CDRs on a Database Server

Similar to the operation of user management, it is possible to use the Provisioning System to access the CDRs that are contained in the database managed by a Database Server. This is not the only way to access CDR information; it is also possible to directly access the underlying database.

In order to query CDR information, it is necessary to establish a CDR session with the Database Server using the Provisioning System. Once such a session has been established, the CDR query screen will be displayed.

From this window, CDRs can be queried in a manner that is similar to that used for querying user, group, and account records, described in the previous section. Search criteria can be entered in the available fields. After search criteria is entered, the ordering parameter should be selected. Then clicking "Query" will display a list of CDRs that match the query. It is possible to use the "Next" and "Previous" buttons to scroll through the available CDRs. The "Close Query" button should be used if it is desired to make an other query.

The information contained in each CDR is described below.

Information in a CDR

CDRs collected by the Gateway Server contain a large amount of information. This section will help one to understand the fields in the CDR.

System Name. Contains the identity of the Gateway Server that submitted the CDR.

Inbound Intf. Identifies the inbound line group that received the call.

Inbound Line. Identifies the specific line on a line group that received the call.

Outbound Intf. Identifies the outbound line group used to place the outbound portion of the call. May be unknown if the call was never placed.

Outbound Line. Identifies the specific line on the outbound line group that was used to place the call.

Call Type. Indicates the charge type for the call.

Called Addr. Indicates the address that was called. This field will generally be in E.164 form, but is prefixed with the "e164:" tag to identity E.164 numbers.

User Connect Time. Indicates the time, as collected by the submitting Gateway Server, at which the user connected to the system.

Call Connect Time. Indicates the time, as collected by the submitting Gateway Server, at which the call placed by the user was connected to the destination party.

Call Duration. Specifies the duration, in seconds, of the call. This is the time between the called party answering the call, until the time that the call was disconnected.

IVR Duration. Specifies the amount of time, in milliseconds, that the user spent in the IVR process, entering their ID, the number to call, and so forth.

Setup Duration. Specifies the amount of time, in milliseconds, required to set up the call. This includes searching for routes, obtaining a line to place the call, contacting a remote Gateway, and other overhead.

Dial Duration. Specifies the amount of time, in milliseconds, that the call was placed for before it was either terminated, or until the called party answered.

Call Attempt. Depending on the configuration of the Gateway Server, it may be possible to make multiple calls on a single call into the system. This field indicates the call attempt number within a single call into the system.

Identified. Indicates whether or not the user making the call was identified.

Succeed. Provides a success code indicating whether or not the call was successful, and if the call was unsuccessful, provides a cause code.

RemoteSystem. Indicates whether the call was originated by a remote Gateway Server, or a local user of the system.

User Name. Provides the name, if available, of the user that placed the call.

User ID. Provides the ID, if available, of the user that placed the call.

Caller ID. Stores caller ID information, if available, of the caller that accessed the system.

Group ID. Stores the group ID, if available, of the group account associated with the user when the call was made.

Account ID. Specifies the account ID, if available, associated with the user at the time that the call was made.

Session ID. Provides a unique call ID that identifies this call. The session ID can be used to correlate the CDR collected by the originating Gateway Server, and the terminating Gateway Server.

Route Used. Provides information, if available, regarding the route used to make the call.

Inbound Info. Provides information available regarding the inbound line or user.

Outbound Info. Provides information available regarding the outbound line or user.

Gateway Server Collection of CDRs

CDR collection is a capability that is provided by the Gateway Server platform. The Gateway application makes use of this capability to create a CDR for every call that it processes. CDRs are inserted regardless of whether or not the call was successful; the success code, explained above, is used to record the actual success of the call.

On the Gateway Server side, the configuration of CDR collection involves specifying the Database Servers list and groups that are used in CDR collection. Double clicking on the "CDR Service" node can access the CDR collection configuration dialog. This node is visible when the "Database Access" root level node in the configuration tree is expanded. Note that one should use the Management System to configure these parameters, and that one should be connected to a Gateway Server in order to do so.

The server settings for the collection of CDRs is configured as described above. For the CDR service specifically, it is useful to understand how concurrency and fallback work. If two or more Database Servers are placed in the same group, then both of them will receive a copy of the CDR when it is inserted. Only if all Database Servers in that group fail to receive a copy of the CDR will the next group be used. This can be used to achieve redundancy, by always logging CDRs to multiple Database Servers. (However, there is still some resilience to Database Server failures even in the absence of such a configuration, as described in the next section). Configuring independent groups, allows a secondary Database Server to receive CDRs in the event that the normal Database Server is not available.

Database Server Failure Handling

In the event that none of the Database Servers are available to log a CDR collected by a Gateway Server, it remains important that the CDR not be lost, as this would represent lost revenue. Therefore, for CDRs that cannot be successfully transmitted to a Database Server, a local queue is maintained. While the Database Server remains unavailable, any CDRs collected will be stored in this queue. Once the Database Server becomes available, the CDRs in the queue will be transmitted to the Database Server, and then removed from the queue. This queue is maintained persistently on disk, so that even if a Gateway Server undergoes a temporary failure while the Database Server is unavailable, it will continue to try to insert CDRs once it recovers from the temporary failure.

License Server

The Licensing Server is an additional (optional) software component according to the present invention. The License Server is designed to simplify the administration of a VoIP system according to the present invention, by allowing all licenses to be managed from a single centralized server. This eliminates the need to configure license keys manually on individual components. Furthermore, it allows licenses to be purchased in large blocks and then distributed amongst Gateway Servers, rather than needing to purchase large numbers of small quantities of licenses for each Gateway Server.

It is possible to operate a secondary License Server for backup a purpose, which is capable of allowing a network to continue to operate in the event that the primary license server becomes unavailable.

Part III—Technical Information

Appendix A

Database Table Descriptions

This appendix is intended to provide a description of the database tables used by the Database Server. The purpose of this description is to allow third party applications to be written which interface with the data maintained by the Database Server. Examples of such applications include billing systems, or customer account creation tools.

Each of the tables created in the database are described in the sections that follow. For information about how the Database Server uses the information in these tables, refer to the sections on User Management and CDR Collection.

ACCOUNT_RECORD Table

The account record table is used to store the list of accounts that are available for use on the system. For a description of the interaction between account records and user/group records, see the section on User Management.

Table Definition

| Column Name | Description |
| --- | --- |
| Account_ID | Numeric ID representing this particular account type. (Note: The primary key for the table should be unique.) |
| Account_Info | Account name, label or description. |
| Concurrent_Max | Maximum number of users/groups that can access this account type concurrently (i.e. at the same time). |
| User_ID | This field will contain either one specific user ID or a "0" (zero). If there is only one user associated with this account ID, the corresponding user ID appears in this field. If there are multipleorNO users associated with this account ID, a "0" (zero) displays in this field. (The individual user IDs of users associated with this account ID because of their group association, will not display.) Examples:- If user ID 999 is the ONLY user associated with this account (user ID 999 is not associated with any group), "999" (without quotations) appears in this field. [Although there is only one individual user associated with the account, there may also be groups which are associated with the account as well - see group_ID below.]- If user ID 123 is a member of group ID 456, which is associated with this account (see GROUP_RECORD table), one would NOT enter user ID 123 (or any other member of group ID 456) in this field.- All users/groups associated with an Account ID, SHARE billing - if, in the above example, one wanted to provide INDIVIDUAL billing for user 123 (and all of the members of group ID 456), one would NOT associate the group (456) with any account, but would create a separate account ID for EACH user ID - in which case, in each account (ID) entry, this field would contain the associated user ID. - If there is more than one user ID associated with this account (who are not part of the same group), a 0 would display in this field to indicate multiple user IDs. - If there are NO individual user IDs associated with this account (again, this does not include users who are part of a group associated with this account), a 0 would display in this field to indicate NO individual user IDs. |
| Group_ID | This field will contain either one specific group ID or a "0" (zero). If there is only one group associated with this account ID, the corresponding group ID will appear in this field. If there are multipleorNO groups associated with this account ID, a "0" (zero) displays in this field. Note: If a group is associated with an account, the corresponding account ID appears in the group's entry in the GROUP_RECORD table. Once a group is associated with an account ID, all members (users) of the group automatically become linked to the same account ID. |

-continued

Table Definition

| Column Name | Description |
|---|---|
| | Examples:<br>- If only group ID 111 was associated with this account, "111" (without quotations) appears in this field.<br>- If both group ID 111 and group ID 222 are associated with this account, a 0 displays in this field to indicate multiple group IDs.<br>Remember that ALL users/groups associated with an Account ID, SHARE billing. To provide separate billing for each group (all group members are "lumped together"), create a separate account ID for EACH group ID - in which case, in each account (ID) entry, this field would contain the associated group ID. [To provide separate billing for each member of a group - instead of lumping them together - do NOT associate the group with an account. Instead, create a separate account ID for EACH user ID - see User_ID field above.] |
| Time_Stamp | Leave blank - DB will enter information as required to ensure mutual exclusion on modifications. |
| Has_Debit_Record | A boolean type value where TRUE = account is using an (online) debit plan. FALSE = no associated debit balance. |
| Has_Credit_Record | A boolean type value where TRUE = account is using the credit billing plan. FALSE = not on credit plan. (Speeds up internal DB operation - DB server looks at this field first to determine if it needs to fetch the credit record.) |
| Locking_By | Leave blank - DB will enter information as required to ensure mutual exclusion on modifications. |
| Billing_Flags | Binary data indicating which billing method is used- debit (prepaid), credit (usage-based) or exempted (not charged). This field cannot be edited manually. If entering information DIRECTLY into the SQL/Access database, enter NULL. |

Additional Notes

The "User_ID" and "Group_ID" fields are closely related. These two fields will contain either a specific user/group ID (respectively) or a "0" (zero). The value of zero ("0") means that there isn't one specific user/group ID associated with this account ID—there could be several users/groups associated with this account ID, or there could be none.

In one example, one of these fields ("User_ID" or "Group_ID") should have a value of "0" (zero) at all times. This means one should not have one (individual) user AND one group associated with the account at the same time.

If a user is associated with a group ID which is, in turn, associated with a particular account ID, you do NOT have to enter the individual user ID in the "User_ID" field—the user will be associated with the account by group association. All users/groups associated with a particular account ID are under ONE single billing plan. To provide individual/separate user billing, do NOT associate the group with an account, instead create a separate account ID for each user ID. This does not mean you cannot still associate the user with the group—a user can be associated with a group but have its own account ID for billing purposes. However, a user cannot be a member of a group which IS associated with a particular account ID and have its own account ID at the same time.

AUTHENTICATE_ID Table

The AUTHENTICATE_ID table is used to hold authentication information for both user records and group records. Since a particular user or group record may have multiple authentication entries associated with it, it is not possible to store this information within the user record or group record itself.

Table Definition

| Column Name | Description |
|---|---|
| User_OR_Group_ID | The user ID or group ID which will be authenticated by the information contained in the "Authenticate_ID" field below. If you enter a group ID, all members of the group will share the same authentication information - each member still has their own numeric user ID. If one wishes to assign separate authentication information to each user (in a group), create a separate entry (in this table) for each user ID. A user can be a person, remote Gateway or H.323 user. |
| Authenticate_ID | Enter the information that will be used to authenticate the user or group. This information corresponds to the authentication method indicated in the "Lookup_Type" field below. Examples:- If the user/group is authenticated by entering a numeric code such as 666, this field should contain "666" (no quotations).- If the user/group is authenticated by their ANI information, this field should contain the area code and phone number, no brackets or spaces, from which they are authorized to call, e.g. 4167360901.- If the user (Gateway) is authenticated by its IP address, this field should contain the IP address from which the remote Gateway will be allowed access. Enter the IP address as follows: 255.255.255.255- If the user (Gateway) is authenticated by its IP address plus port, this field should contain the IP address from which the remote Gateway will be allowed access and the port through which the communication will be delivered. Enter the IP address and port as follows: 255.255.255.255 port 0 |
| Is_User_Entry | This field indicates whether or not this entry is for an user (as opposed to a group). A boolean value where "0" (zero) indicates this entry is for a user. "1" indicates this is a group entry. |
| Lookup_Type | This field contains an integer value identifying the authentication method to be used. For example, if this field contains a "0" (zero), the user or group specified in the above "User_OR_Group_ID" field will be authenticated by the ANI information contained in the above "Authenticate_ID" field. |

Additional Notes

The "Lookup_Type" field values are as follows:

0=User authentication based on numeric PIN/code.

1=Authentication based on text password (Note: This authentication method is not available.)

2=User authentication based on ANI information.

3=Gateway authentication based on IP address only.

4=Gateway authentication based on IP address+port.

5=Gateway authentication based on IP address+netmask.

CALL_RECORD Table

The call record table is used to store call records for a number of Gateways. These call records can be used for post-paid billing purposes, and allow custom billing applications to be developed which interface with the system. The CALL_RECORD table is updated continuously as calls are completed.

Table Definition

| Column Name | Description |
|---|---|
| VOIPgate_System | Gateway writing the call record. |
| Session_ID_High | Unique identifier for the call that is consistent between CDRs inserted from both Gateways involved in the actual call. Can be used to correlate call records from the originating and terminating Gateways. Contains the high 32 bits of the 64 bit call ID. |
| Session_ID-Low | Same as above, but contains the low order 32 bits of the 64 bit call ID. |
| Inbound_Intf_Type | Interface used for inbound call (telephony or network). |
| Inbound_Inft_Inst | Instance number of the inbound interface. |
| Inbound_Line_Type | Hardware line type used for inbound call. |
| Inbound_Line_Inst | Instance number of the inbound hardware line. |
| Outbound_Inft_Type | Interface used for outbound call (telephony or network). |
| Outbound_Intf_Inst | Instance number of the outbound interface. |
| Outbound_Line_ Type | Hardware line type used for outbound calls. |
| Outbound_Line_Inst | Instance number of the outbound hardware line. |
| Call_Addr | Phone number dialed/called. |
| User_Connect_Time | Date & time PSTN user contacted the Gateway (to initiate a call). |
| Call_Connect_Time | Date & time call was connected (to called party). |
| Call_Duration (secs) | Duration (length) of the call (in seconds). |
| IVR_Duration (ms) | Length of time required to prompt user through the call. |
| Setup_Duration (ms) | Length of time required to make the call. [This is the time required for the Gateway to answer the user's initial call (call connect), receive the number (entered by user), authenticate user, locate matching network call route, route the call via the IP network, have the second remote Gateway dial the number, until a "call connected" signal indicates call has connected to called party - "User_Connect_Time" to "Call_Connect_Time".] |
| Dial_Duration (ms) | Time required (for second/remote Gateway) to dial outbound number and wait for call to connect. |
| Call_Attempt | Number of consecutive calls made by the user. Example: When called party hangs up, the Gateway returns control to the (initiating) user, prompting the user for another number. If the user enters another number (to make a 2$^{nd}$ call), the call record for the first call will have Call_Attempt = 1 and the 2$^{nd}$ call record will show Call_Attempt = 2. |
| Is_Identified | A boolean value reflecting whether a user ID was entered. TRUE = no user ID entered (typically this displays when call record is written by remote Gateway); 0 = user ID was entered (typically this displays when call record is written by initiating Gateway). |
| Is_Succeed | Indicates whether call was successful or failed. |
| User_Name | User NAME. If the initiating Gateway writes the call record, the user name of the CALLER will display. If the remote Gateway writes the call record, the initiating Gateway's System Name will display. If the user/Gateway was not identified, "unknown" will display. |
| User_ID | User ID of the caller or Gateway (if applicable). If user/Gateway was not identified, "unknown" will display. |
| Caller_ID | ANI information of the caller (IF this service is available on the phone lines connected to the Gateway). This information only displays on call records from the initiating Gateway. |
| Route_Used | Identifies how the Gateway routed the call. If the Gateway routed call out over the network interface (to a remote Gateway), the IP address of the terminating Gateway will display here. If the Gateway dialed the number out over its phone lines (telephony interface), the phone number dialed will display here. |
| Inbound_Info | Additional information about inbound call (e.g. DNIS) |
| Outbound_Info | Additional information about outbound call (e.g. network stats). |
| Call_Type | Identifies type of call: voice or fax. |
| Call_Charge | Indicates the amount the user was charged for the call. |

Additional Notes

The call detail record table is updated continuously as call records are inserted. Ensure that any applications that access this table do not depend on a static database table state between queries.

CREDIT_RECORD Table

The credit record table can be used by the Database Server.

DEBIT_RECORD Table

A debit record table is used to maintain information about accounts on the system that have an associated debit record.

Table Definition

| Column Name | Description |
|---|---|
| Debit_ID | ID representing this online debit balance - this value should be the same as the account ID (whose members will use this balance). |
| Debit_Balance | Amount of the user's online debit balance. |
| Debit_Reserved | For internal use only. Before a call is made, the Database server reserves a number of credits for the call - reserved credit is not available for other calls. At the end of the call, the ACTUAL credit used is deducted from the account's debit balance and the remaining (unused) reserved credits are released - and are available for another call. |
| Debit_Sessions_Num | For internal use only. Indicates number of online debit sessions (under this debit ID) currently in progress. |
| Debit_Max_Negative | This defines the MAXIMUM credit that can be overdrawn from this debit ID balance. This field must have a value that is equal to or greater than zero. For example, if this field has a value of 100, the system will (once the debit balance has been used up) allow $100 worth of calls to be made (overdrawn) before disabling the account. If you do not want to allow ANY calls after the debit balance has been used up, enter "0" (zero). |
| Debit_Reserved_Info | For internal use only. Contains binary information. |

Additional Notes

This table—DEBIT_RECORD—and the ACCOUNT_RECORD table are linked by their "Debit_ID" and "Account_ID" fields respectively. An account is linked to the DEBIT_RECORD entry whose Debit_ID field has the SAME VALUE as that contained in its Account_ID field. To assign an online debit balance to an account, you create a new entry in the DEBIT_RECORD table and enter the account ID in the Debit_ID field. For example, to assign an online debit balance to account ID "1234", one creates a new entry in the DEBIT_RECORD table and enter "1234" in the Debit_ID field. This means that ALL members of account ID "1234" will use the online debit balance defined under the Debit ID "1234".

If entering online debit balance information directly into the SQL/Access database (instead of via the Provisioning System), enter information in the Debit_ID, Debit_Balance and Debit_Max_Negative fields. The remaining fields should be left blank.

All members of an account can SHARE the SAME online debit balance. To assign a separate online debit balance to each user, create a separate account ID and corresponding debit entry for EACH user.

EVENT_LOG Table

The event log table is used to store events logged to the Database Server.

Table Definition

| Column Name | Description |
| --- | --- |
| VOIPgate_System | Name of server writing the event log. |
| Event_Code | Type of event (general, resource warning, state change) |
| Event_Date | Date and time of the event. |
| Event_Info | Description or additional information. |

GROUP_RECORD Table

The group record table allows users to be grouped, and to use default values for certain fields in the user records that are defined by the group record.

Table Definition

| Column Name | Description |
| --- | --- |
| Group_Info | Group name/label. |
| Acct_First_Date | Date and time the group is activated (granted access). |
| Acct_Last_Date | Date and time group access is disabled/removed. Expiration date. |
| Concurrent_Max | Maximum number of users that can access the Gateway under this group name concurrently (i.e. at the same time). If this group is associated with an account, the "Concurrent_Max" field value in the ACCOUNT_RECORD table will be used. |
| Normal_Privilege | Privilege assigned to the user after they enter their numeric user ID (or, when they have been identified by an alternative identification method such as via ANI information). |
| Auth_Privilege | Privilege assigned to the user once they have been identified AND authenticated (by whatever methods the Gateway administrator has defined for the user). Normal and Authenticated privilege level can be the same. |
| Account_ID | If this group is associated with a particular account, the account ID will display here - if there is NO associated account, this field will contain a "0" (zero). |
| Time_Stamp | Leave blank - DB will enter information as required to ensure mutual exclusion on modifications. |
| Locking_By | Leave blank. The DB server sets and unsets this field according to usage - if account is being accessed via the provisional system, the account will be locked. |
| Group_ID | The numeric ID representing this group. |
| Acct_Disabled | Through the provisioning system user interface, administrators can disable access for the group by checking the "disable" box in the Account Status section on the Permissions panel. This field contains a boolean value where "1" or TRUE = account disabled; "0" or FALSE = account active. [If the group record is disabled, the Gateway will not allow calls from members of this group ID.] |
| Force_Auth | Authentication is not always required - it is based on the required privilege of the desired route. Through the provisioning system user interface, administrators can force Gateways to always identify and authenticate users by simply checking a box. This field will display a boolean value where "1" or TRUE = box checked - user MUST be authenticated; "0" or FALSE = box not checked - authentication only when required based on privilege. For example, if using calling card numbers as the user ID, one would want to force the user to also enter their PIN (i.e. authentication). "1" would display in this field. |
| Restrict_Time | This field indicates whether or not, call time restrictions apply to this group, i.e. group members are restricted to making calls during certain time periods. This field contains a boolean value where "1" or TRUE = time restrictions apply - Gateway will check the "Allow_Times" field below; "0" or FALSE = no time restrictions-users can make calls at anytime. |
| Allow_Times | This field contains binary data specifying those times during which members of this group can make calls. |
| User_Flags | This field contains binary data. [There are 64 generic flags defined (available for use) but only 2 flags have been assigned, in one example. The first bit specifies whether group members, when initiating a call, prefer to hear the dollaramount remaining in the online debit account. The second bit specifies whether group members, when initiating a call, prefer to hear how much calling time remains in their online debit account.] |

USER_RECORD Table

The USER_RECORD table is used to store user accounts. Users can actually be added to or removed from the system by modifying this table directly. However, it is important to take care to ensure that references to other tables (such as group and account records)

Table Definition

| Column Name | Description |
| --- | --- |
| User_Name | Real (full) name of the user or company. |
| User_ID | Numeric user ID for this user - enter up to 15 digits. [Users are identified and assigned privileges based on this numeric ID.] |
| User_Auth | Numeric authentication code for the above user. [Users may be required to enter this 2nd code to make a call.] |
| User_Phone | Contact phone number for this account. [This field is informational only - it is not used by the DB server.] |
| User_Email | Contact email address for this account. [This field is informational only - it is not used by the DB server.] |
| Acct_Disabled | Through the provisioning system user interface, administrators can disable access for the user by checking the "disable" box in the Account Status section on the Permissions panel. This field contains a boolean value where "1" or TRUE = account disabled; "0" or FALSE = account active. [If account is disabled, the Gateway will not allow calls using the specified user ID.] |
| Force_Auth | Authentication is not always required - it is based on the required privilege of the desired route. Through the provisioning system user interface, administrators can force Gateways to always |

-continued

Table Definition

| Column Name | Description |
|---|---|
| | identify and authenticate users by simply checking a box. This field will display a boolean value where "1" or TRUE = box checked - user MUST be authenticated; "0" or FALSE = box not checked - authentication only when required based on privilege. For example, if are using calling card numbers as the user ID, one would want to force the user to also enter their PIN (i.e. authentication). "1" would display in this field. |
| Acct_First_Date | Date and time user ID is activated (granted access). |
| Acct_Last_Date | Date and time user access is disabled/removed. |
| Restrict_Time | This field indicates whether or not, call time restrictions apply to this user, i.e. user is restricted to making calls during certain time periods. This field contains a boolean value where "1" or TRUE = time restrictions apply - Gateway will check the "Allow_Times" field below; "0" or FALSE = no time restrictions - users can make calls at anytime. |
| Allow_Times | This field contains binary data specifying those times during which members of this group can make calls. |
| Concurrent_Max | Maximum number of users that can access the Gateway under this user ID concurrently (i.e. at the same time). If this user ID is associated with an account, the "Concurrent_Max" field value in the ACCOUNT_RECORD table will be used. |
| Normal_Privilege | Privilege assigned to the user after they enter their numeric user ID (or, when they have been identified by an alternative identification method such as via ANI information). |
| Auth_Privilege | Privilege assigned to the user once they have been identified AND authenticated (by whatever methods the Gateway administrator has defined for the user). Normal and Authenticated privilege level can be the same. |
| Time_Stamp | Leave blank - DB will enter information as required to ensure mutual exclusion on modifications |
| Locking_By | Leave blank. The DB server sets and unsets this field according to usage - if account is being accessed via the provisional system, the account will be locked. |
| Group_ID | If this user is associated with a particular group, the group ID will display here - if there is NO associated group type, this field will contain a zero (O). |
| Account_ID | If this user is associated with a particular account, the account ID will display here - if there is NO associated account type, this field will contain a zero (O). |
| User_Flags | This field contains binary data. [There are 64 generic flags defined (available for use) but only 2 flags have been assigned, in one example. The first bit specifies whether the user, when initiating a call, prefers to hear the dollaramount remaining in their online debit account. The second bit specifies whether the user, when initiating a call, prefers to hear how much callingtime they have left in their online debit account.] |
| User_Lang_Pref | This field indicates the language of choice for online debit prompt, e.g. "English". |

Appendix B

Network Design Information

This section provides information to assist in designing and organizing a network in order to improve performance. It also provides some information and suggestions with regard to how the components of the present invention s could be organized.

Network Requirements

Three main components are used in the present invention: the Gateway server, Database server, and Routing server. This section explains the network requirements of each of the components, so that the appropriate network bandwidth and performance can be allocated to achieve the desired degree of performance. Each component, and the type of communication used by that component, is described separately.

Gateway Server

The Gateway Server runs on UDP/IP port 6789 for control data. Additional UDP/IP ports are used for media data. These additional ports can be allocated anywhere within a specified range. By default, the range of ports that can be used is 1025 to 65535. However, the port range can be specified to match a user's requirements.

The main kind of communication made by the Gateway Server is communication to other Gateway Servers, for the purpose of completing a call. A small amount of control traffic is exchanged to set up the call. After this point, actual media data is exchanged throughout the call. Because the present invention employs silence compression to reduce the required bandwidth during periods of silence, the media data is not a continuous stream. However, with the default frame size of 60 ms per packet, one 66 byte frame will be sent every 60 ms during active conversation. During silence, no data will be transmitted. In addition, a UDP/IP header of 28 bytes will also be present on each transmitted frame. Overall, this results in a data rate of 94 bytes per 60 ms, or 1,557 bytes per second. Expressed in bits per second, this is 12,533 bits per second, or 12.5 kbps. In addition, the underlying network (frame relay, ATM, etc.) may add additional framing data, further increasing the actual data rate that must be allowed for on the network. Note that this is the transmission capability required from the sender to the receiver. When both the sender and the receiver are talking simultaneously, this much bandwidth must be available in both directions. Often, network bandwidth is symmetric. A 33.6 kbps modem can carry 33.6 kbps of data in both directions simultaneously; similarly, a T-1 can carry 1.544 Mbit/s in both directions at the same time. However, in the case that asymmetric bandwidth is available, it is important to be aware that the bandwidth requirements of the system are bi-directional.

Another critically important aspect of network performance on the communication between two Gateway Servers is that of latency, and jitter. Latency, the delay introduced on packets from one Gateway Server to another, will be perceived by the end users of the system as a delay in the response of a remote user. Some latency is introduced by the Gateway Server itself in processing and decoding the media data. However, network latency should be kept to a minimum to ensure that the conversation between end users is a natural one.

Even more serious than latency is the problem of jitter. Jitter is the variation in latency from one packet to another. For example, if packets always arrived 50 ms after being transmitted, then there would be a 50 ms latency and no jitter. As another example however, if packet #1 arrived 100 ms after transmission, packet #2 arrived 50 ms after transmission, and packet #3 arrived 150 ms after transmission, there would be an average jitter of +/−33 ms. The reason that jitter is more critical than latency is because it can cause a packet to arrive too late to be useful. The effect is that the packet may be delayed enough that the end user will hear a pause in the voice that is talking to them, which is very unnatural if it occurs during the middle of a word or sentence. Jitter typically occurs when the network utilization is too high, and packets are being queued, causing delivery times to become unpredictable. The Internet, because of it's complex structure, is often subject to varying degrees of jitter. The present invention software compensates for network jitter. Furthermore, handling jitter comes at the expense of latency, since the only way to handle jitter is to buffer additional data so that when the data arrives exceptionally late, continuous playback to the end user can be maintained.

In addition to Gateway Server to Gateway Server traffic, the Gateway Server also communicates with the Routing and Database Servers, and is managed by the Management System. Network factors related to these components are discussed below.

Routing Server

The Routing Server is involved in routing calls between Gateway Servers. However, the Routing Server is optional; routing information can be configured statically on individual Gateways.

When Routing Server is used, there are two modes that it can be used in. Depending on which mode is used, the networking requirements between Routing and Gateway servers will vary. Routing modes are explained in detail in the call routing section, however, there are two basic modes of operation from a network standpoint Served-based Static Routing and Dynamic Routing. In these modes, each time a Gateway need to make a call, it will query the routing server for a route. This occurs once, at the beginning of a conversation. Routes are typically quite small, and do not require additional bandwidth to be allocated (since the bandwidth during the call will be higher than during the call routing stage). However, it is important nonetheless since network latency will add to the call setup time, and the end user will be waiting for the system to initiate the call. Normally, this latency is not a problem. However, if the latency is on the order of 500 ms, and call setup time is critical, then this may be a consideration. An important aspect of dynamic routing is the caching of routes. With dynamic route caching, not all calls will require a query to the server. However, there will still be calls which require the server to be queried, and these calls will incur the latency penalty.

Disseminated Routing. With disseminated routing, the Routing Server distributes the necessary routing data to each Gateway Server when it firsts connects. This is typically when the system is starting up. In this model, the Gateway will use a large amount of bandwidth during the initial connection, as the routes are disseminated from the server. However, after this point, there will be no subsequent queries, and no latency will be added on a per-call basis.

The selection of a routing model will be explained in more detail in the section on call routing. However, it is useful to keep the network requirements in mind when considering what routing model to use.

Database Server

There are two principal kinds of network traffic that interact with the Database Server.

The first kind of traffic is due to communication with the Gateway Servers. There are two reasons for this traffic; user management, and call detail record collection, both of which are described in this manual. On a call-by-call basis; this traffic is not very significant. However, when a single Database Server is used to provide service to a large number of Gateways, this traffic will be concentrated to a single point. Therefore, if a single centralized Database Server will be used, it is sensible to locate it at a network hub, so that the traffic from all Gateway Servers will not overload a single network link.

The second kind of traffic is that between the Database Server and the underlying Database implementation. The Database Server is capable of running on a different machine than the one that runs the database. From a network standpoint, there may be motivation to do this if a Database Server needs to be exposed to the Internet for the purpose of CDR insertion, with the actual database (which might hold other, sensitive data) not accessible directly via the Internet. If, however, the Database Server and underlying database are not run on the same machine, then there will be network communication between the two machines. The volume of this traffic will depend directly on the load placed on the database server, but it will be similar in volume to the aggregated database-related traffic of all the Gateway Servers that the Database Server supports. Therefore, if possible, without violating security requirements, it is recommended that the Database Server be run on the same machine as the underlying database, or in a LAN environment. Using an underlying database connected in a WAN environment with low available bandwidth may cause performance problems.

Management System

Using the management system to administer any of the other components of the system does not typically require a significant amount of bandwidth. The only exceptions to this are when large lists of routes are being manipulated, in which case the initial query of the routing database may require the routes to be downloaded to the Management system. Although this should not normally be a problem, using a Routing Server that is connected to the Management System either locally or via a LAN connection can alleviate the problem. Even if the Routing Server is operated remotely, the use of a Routing Server allows only one connection (the one between the Routing Server and Management System) to become heavily utilized during the start of routing table administration.

Provisioning System

The provisioning system interfaces exclusively with database servers. The network requirements of this interaction depend on the types of operations being performed. Clearly, obtaining and modifying a user record do not require significant amounts of bandwidth since the amount of data contained in a single user record is relatively small. However, when doing bulk record fetching, such as fetching one hundred user records for summary display, or several hundred call records, the amount of data transferred between the database server and provisioning system may be large. If one will be using the provisioning system to interact with large amounts of data, then it is recommended that the Database Server be located on the same LAN (or even the same machine) as the Provisioning System. If it is necessary to locate the Database Server and Provisioning System across a WAN connection, then care should to be taken to ensure sufficient capacity, and to prevent a conflict with time-sensitive voice data.

Traffic Prioritization

The network requirements of the present invention components were explained above in order to guide the formation of a network topology. However, regardless of the network topology selected, additional information can be used by capable routers in order to prioritize the different kinds of traffic. The following table shows the various port numbers that can be used to prioritize traffic in one example:

| Traffic Type | Source -> Destination Port Number/Range |
| --- | --- |
| Gateway -> Gateway Control data | 6789 -> 6789 |
| Gateway -> Gateway Media data | User configurable range |

-continued

| Traffic Type | Source -> Destination Port Number/Range |
|---|---|
| Gateway -> Routing data | 6789 -> 6791 |
| Gateway -> Database data | 6789 -> 6792 |
| GW/RT/DB -> Management Info | 6789/6791/6792 -> 6790 |
| Routing -> Provisioning data | 6791 -> xxx |

From the above table, it can be observed that control oriented data originating from a particular component always originates from a single UDP/IP port. All components of a VoIP system in the present invention can have a single unique port number, as follows:

| Component | UDP/IP Port Number |
|---|---|
| Gateway Server | 6789 |
| Management System | 6790 |
| Routing Server | 6791 |
| Database Server | 6792 |
| Provisioning System | xxxx |

This information can be used to prioritize traffic, if the underlying routers are capable. Typically, it is desirable to ensure that Gateway to Gateway media data has the highest priority, time-sensitive control data (Gateway to Database/Routing Servers) has medium priority, and management/provisioning traffic has the lowest priority. This policy may of course need to be combined with the policies for other types of traffic on the same network.

Example Computer System

Figure 5:
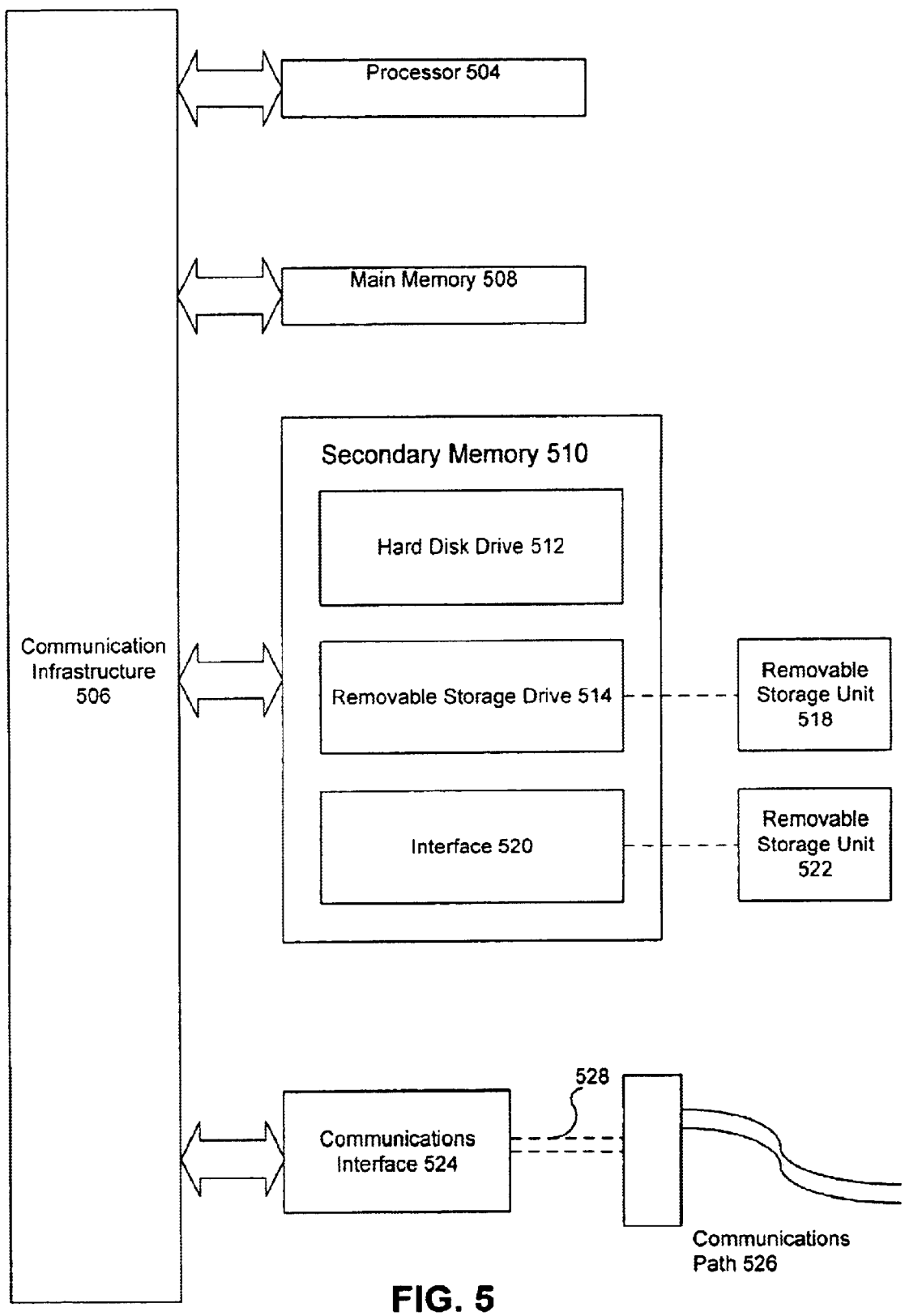
FIG. 5 is an example computer system in one example implementation of the present invention.

An example of a computer system 500 is shown in FIG. 5. Computer system(s) 500 can execute software to carry out any of the functionality described above with respect to VoIP system 200, including any of the servers 210–240 and 280, and management system 250, provisioning system 260, and network manager 270.

Computer system 500 represents any single or multi-processor computer. Single-threaded and multi-threaded computers can be used. Unified or distributed memory systems can be used.

Computer system 500 includes one or more processors, such as processor 504. One or more processors 504 can execute software implementing all or part of VoIP system 200 as described above. Each processor 504 is connected to a communication infrastructure 502 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 500 also includes a main memory 508, preferably random access memory (RAM), and can also include secondary memory 510. Secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc., which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 524 can include a modem, a network interface (such as Ethernet card), a communications port, etc. Software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

The present invention can be implemented using software running (that is, executing) in an environment similar to that described above with respect to FIG. 5. In this document, the term "computer program product" is used to generally refer to removable storage unit 518, a hard disk installed in hard disk drive 512, or a carrier wave or other signal carrying software over a communication path 526 (wireless link or cable) to communication interface 524. A computer useable medium can include magnetic media, optical media, or other recordable media, or media that transmits a carrier wave. These computer program products are means for providing software to computer system 500.

Computer programs (also called computer control logic) are stored in main memory 508 and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. Alternatively, the computer program product may be downloaded to computer system 500 over communications path 526. The control logic (software), when executed by the one or more processors 504, causes the processor(s) 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for providing voice communications over a packet-switched network, comprising:
    a gateway server that handles calls received from a public switched telephone network and a packet-switched network;
    a routing server;
    a plurality of database servers, wherein messages can be sent between each of the gateway server, routing server, and each of said plurality of database servers over the packet-switched network; and
    a call detail record application that gathers call details from said gateway server, records call details and provides call detail record concurrence and fallback procedures, wherein concurrence and fallback procedures include providing a copy of a call detail record to each database server within a group of said plurality of database servers, and when each database server within said group of said plurality of database servers is unable to receive call detail records, providing a copy of the call detail record to each database server within a second group of said plurality of database servers.

2. The system of claim 1, further comprising:
    a provisioning system coupled to each database server within said plurality of database servers.

3. The system of claim 1, further comprising:
    a management system; wherein messages can be sent between each of the gateway server, routing server, each of said plurality of database servers, and management system over the packet-switched network.

4. The system of claim 3, further comprising:
    a network manager that automatically queries a client database to determine an update, and sends a message representative of the update to at least one of the gateway server, routing server, a database server within said plurality of database servers, and management system over the packet-switched network.

5. The system of claim 1, further comprising:
    a licensing server.

6. The system of claim 1, wherein said concurrence and fallback procedures further include when call detail records can not be stored on a database server within said plurality of database servers, storing call detail records in a queue within said gateway server until call detail records can be stored on at least one database server among said plurality of database servers and call detail records stored in said queue are transmitted to at least one database server.

* * * * *